United States Patent
Kodama et al.

(10) Patent No.: US 7,498,935 B2
(45) Date of Patent: *Mar. 3, 2009

(54) POWER-LINE CARRIER COMMUNICATION APPARATUS

(75) Inventors: Nobutaka Kodama, Fukuoka (JP); Hisao Koga, Fukuoka (JP)

(73) Assignee: Panasonic Corporation, Osaka (JP)

(*) Notice: Subject to any disclaimer, the term of this patent is extended or adjusted under 35 U.S.C. 154(b) by 90 days.

This patent is subject to a terminal disclaimer.

(21) Appl. No.: 11/362,502

(22) Filed: Feb. 27, 2006

(65) Prior Publication Data

US 2006/0203897 A1    Sep. 14, 2006

Related U.S. Application Data

(63) Continuation-in-part of application No. 10/349,648, filed on Jan. 23, 2003, now Pat. No. 7,023,324.

(30) Foreign Application Priority Data

Jan. 24, 2002   (JP) .............................. P2002-015058
Mar. 7, 2002    (JP) .............................. P2002-061454

(51) Int. Cl.
G05B 11/01   (2006.01)
H04B 1/38    (2006.01)
H04B 1/66    (2006.01)

(52) U.S. Cl. ............. 340/538; 340/310.11; 340/310.12; 375/219; 375/220; 375/240.18; 375/240.19

(58) Field of Classification Search ................ 340/538, 340/310.11, 310.12; 375/219, 220, 240.18, 375/240.19

See application file for complete search history.

(56) References Cited

U.S. PATENT DOCUMENTS

5,448,593 A    9/1995   Hill (Continued)

FOREIGN PATENT DOCUMENTS

CA         2 311 376         3/2000

(Continued)

OTHER PUBLICATIONS

M. C. Sun, et al., "Power-Line Communications using DWMT Modulation," 2002 IEEE International Symposium on Circuits and Systems, vol. 4, XP002271367, pp. 493-496, May 26-29, 2002.

(Continued)

*Primary Examiner*—John A Tweet, Jr.
(74) *Attorney, Agent, or Firm*—Dickinson Wright, PLLC

(57) ABSTRACT

The invention provides a power-line carrier communication apparatus including a transmission unit with a signal point mapping device for mapping a plurality of bit streams produced from transmission data, a wavelet inverse transforming device for modulating the respective sub-carriers by wavelet waveforms which are orthogonal to each other for producing temporal waveform series data, and a D/A converter for converting the temporal waveform series data into an analog temporal waveform series signal; and a reception unit with an A/D converter for obtaining sampling-series waveform data from a power-line communication signal, a wavelet transforming device for wavelet-transforming the sampling-series waveform data into signal point data of the respective sub-carriers, and a symbol judging device for judging bit streams mapped by the signal point mapping device by inverse-mapping a plurality of these signal point data, and for synthesizing the judged bit streams with each other as a reception data series.

20 Claims, 31 Drawing Sheets

U.S. PATENT DOCUMENTS

| | | | |
|---|---|---|---|
| 5,497,398 | A | 3/1996 | Tzannes et al. |
| 5,631,610 | A | 5/1997 | Sandberg et al. |
| 5,636,246 | A | 6/1997 | Tzannes et al. |
| 5,784,285 | A * | 7/1998 | Tamaki et al. ............ 702/66 |
| 5,870,425 | A | 2/1999 | Piaget et al. |
| 5,995,539 | A | 11/1999 | Miller |
| 6,067,177 | A | 5/2000 | Kanazawa |
| 6,532,256 | B2 | 3/2003 | Miller |
| 6,549,520 | B1 | 4/2003 | Gross et al. |
| 6,944,232 | B2 | 9/2005 | Koga et al. |
| 6,952,441 | B2 | 10/2005 | Peeters |
| 2003/0156014 | A1 | 8/2003 | Kodama et al. |
| 2004/0057529 | A1 | 3/2004 | Koga et al. |
| 2005/0008086 | A1 | 1/2005 | Koga et al. |
| 2005/0031048 | A1 | 2/2005 | Koga et al. |
| 2005/0037722 | A1 | 2/2005 | Koga et al. |
| 2007/0043982 | A1 * | 2/2007 | Arivoli et al. ............ 714/701 |

FOREIGN PATENT DOCUMENTS

| | | |
|---|---|---|
| FR | 2797130 | 2/2001 |
| JP | 59050627 | 3/1984 |
| JP | 62-092526 | 4/1987 |
| JP | 62-219724 | 9/1987 |
| JP | 03-265314 | 11/1991 |
| JP | 04-054034 | 2/1992 |
| JP | 06-303170 | 10/1994 |
| JP | 07-288484 | 10/1995 |
| JP | 09-289489 | 11/1997 |
| JP | 10-022930 | 1/1998 |
| JP | 10322246 | 12/1998 |
| JP | 11252031 | 9/1999 |
| JP | 11275165 | 10/1999 |
| JP | 2000-101623 | 4/2000 |
| JP | 2000165304 | 6/2000 |
| JP | 2000-216752 | 8/2000 |
| JP | 2001298439 | 10/2001 |
| JP | 2001-333053 | 11/2001 |
| JP | 04-044109 | 2/2002 |
| JP | 2002-044045 | 2/2002 |
| JP | 2002-044109 | 2/2002 |
| JP | 2002374190 | 12/2002 |
| JP | 2003218831 | 7/2003 |
| JP | 2003264485 | 9/2003 |
| TW | 159313 | 6/1991 |
| TW | 353841 | 3/1999 |
| WO | 98-58456 | 12/1998 |

OTHER PUBLICATIONS

Maivar, Henrique, "Signal Processing with Lapped Transforms," ISBN 089006-467-9, pp. 204-219, 1992.

Stephen G. Mallat, "A Theory for Multiresolution Signal Decomposition: The Wavelet Representation," Machine Intelligence, Jul. 1989, pp. 674-693.

Japanese Office Action dated Nov. 22, 2006 with English translation.

Japanese Office Action dated Jan. 4, 2008 with English translation thereof.

Taiwanese Office Action dated Jan. 11, 2008 with English translation thereof.

Japanese Office Action dated Oct. 6, 2008 with English translation thereof.

* cited by examiner

TEMPORAL WAVEFORM

FREQUENCY SPECTRUM

FOURIER TRANSFORMATION (IN CASE OF DIVISION NUMBER = 2)

WAVELET TRANSFORMATION
(IN CASE OF DIVISION NUMBER = 2, OVERLAPPING DEGREE = 2)

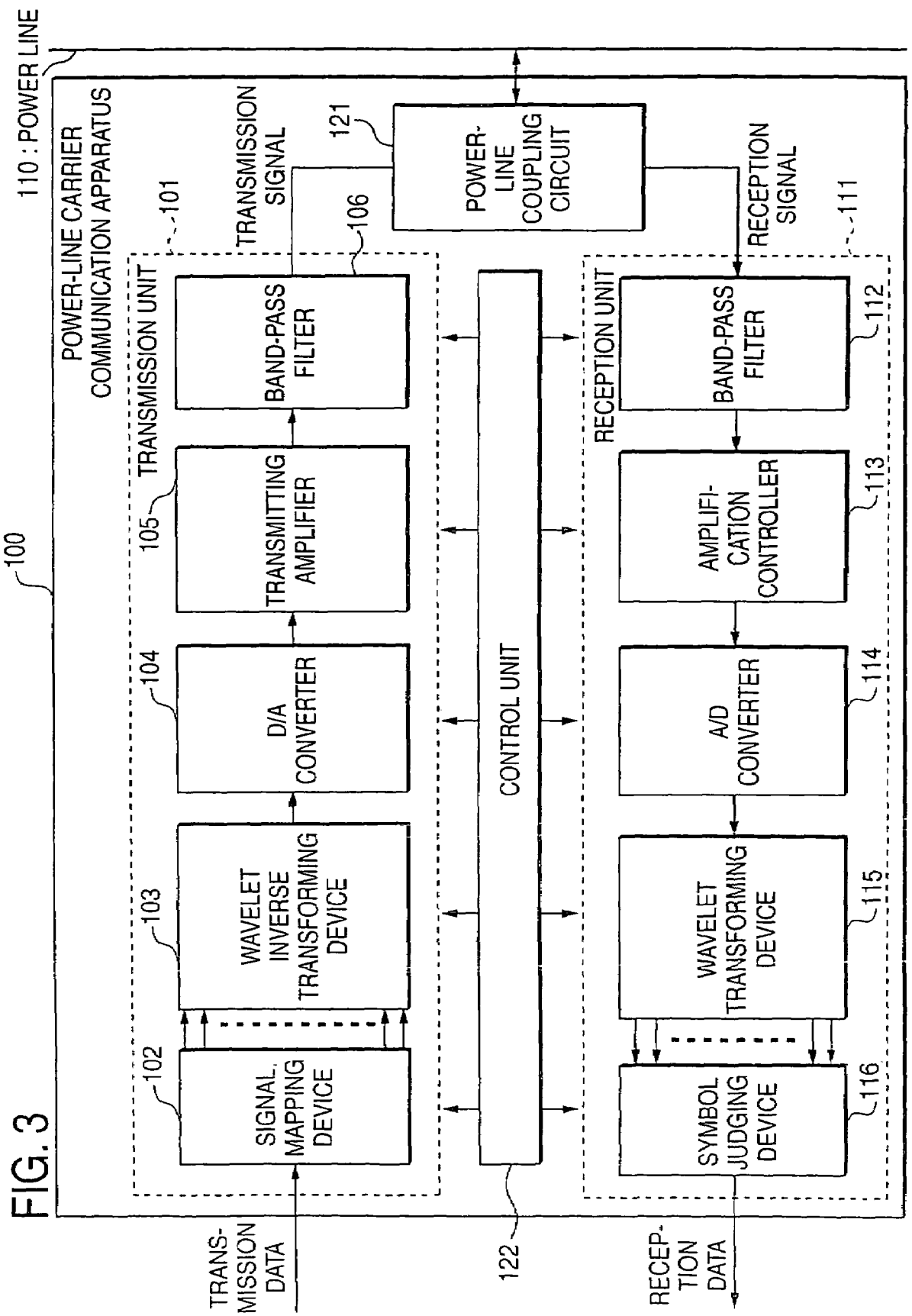

IN CASE THAT INPUT SIGNALS ARE ALLOCATED BY 2 BITS
TO 4 CARRIERS BY 4-DIVISION FILTER BANK

IN CASE THAT INPUT SIGNALS ARE ALLOCATED BY 2 BITS
TO 4 CARRIERS BY 4-DIVISION FILTER BANK

IN CASE THAT INPUT SIGNALS ARE ALLOCATED BY 2 BITS
TO 4 CARRIERS BY 4-DIVISION FILTER BANK

IMPULSE RESPONSE EXAMPLE OF GLT FILTER BANK (4 DIVISION)

FREQUENCY RESPONSE EXAMPLE OF GLT FILTER BANK (4 DIVISION)

IMPULSE RESPONSE EXAMPLE OF ELT FILTER BANK (4 DIVISION)

FREQUENCY RESPONSE EXAMPLE OF ELT FILTER BANK (4 DIVISION)

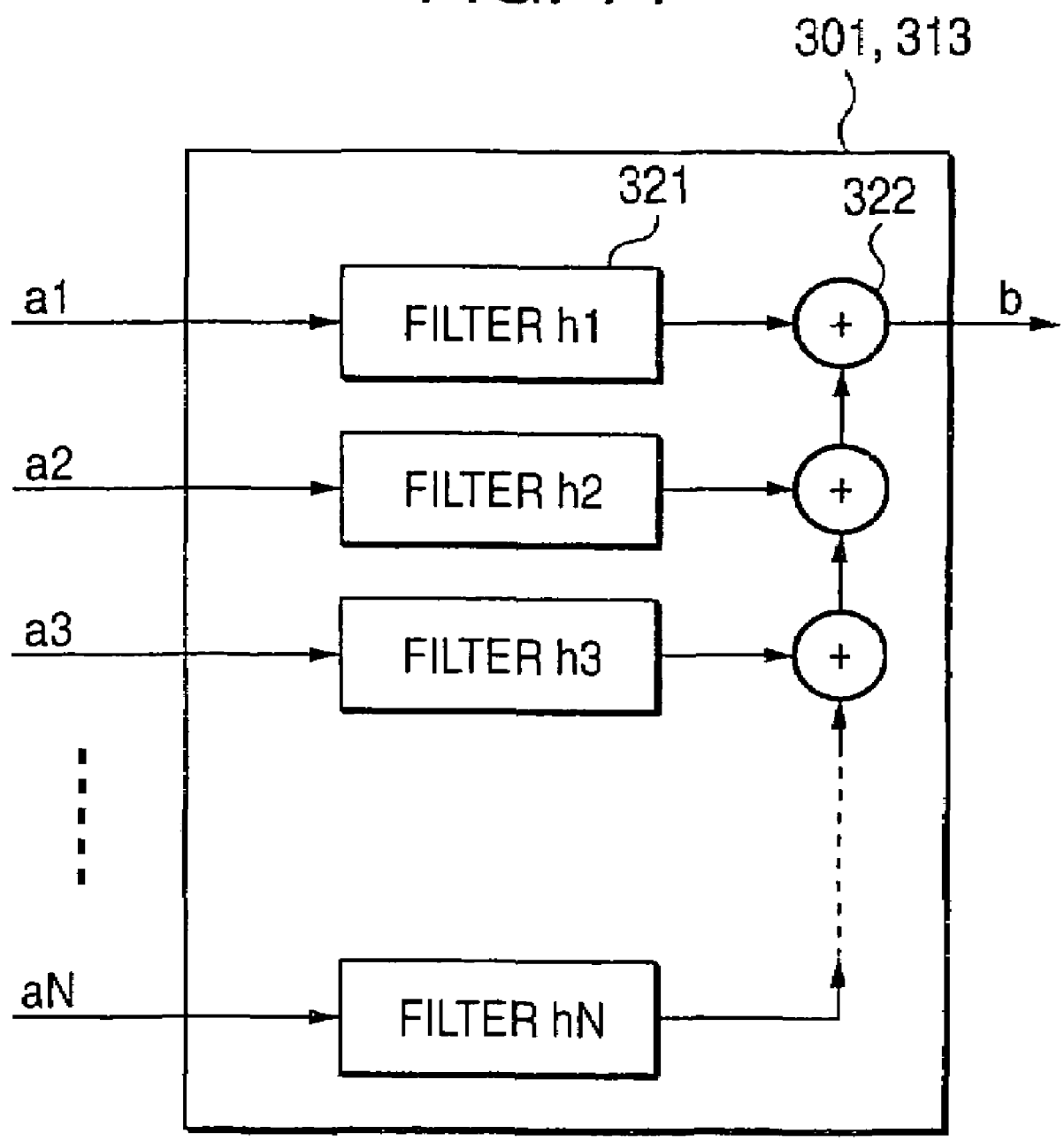

GUARD INTERVAL

EFFECTIVE SYMBOL TERM
(ORIGINALLY-USED 1 OFDM WAVEFORM SYMBOL)

COPY OF SAME WAVEFORM

OFDM FILTER BANK CHARACTERISTIC

POWER-LINE CARRIER COMMUNICATION APPARATUS

This is a continuation-in-part of U.S. application Ser. No. 10/349,648, filed Jan. 23, 2003 now U.S. Pat. No. 7,023,324.

BACKGROUND OF THE INVENTION

1. Field of the Invention

The present invention is related to a power-line carrier communication apparatus for performing a data transmission by using a power line.

2. Description of the Related Art

Power-line carrier communication apparatus own a major feature such that in-home communication networks can be immediately established by utilizing as network transmission paths, power lines which have already been installed in the respective homes. However, since these power-line carrier communication apparatus transmit/receive signals by employing such power lines having deteriorated balancing degrees as communication media, high electric power is leaked from these power lines. Also, in frequency bands required for highspeed power-line carrier communications, amateur radio communications and shortwave broadcasting programs have already utilized these frequency bands. As a result, there is a problem of interference caused by these power-line carrier communication apparatus with respect to these existing communication systems. With respect to restriction aspects ruled by radio laws and radio communication laws regulated in respective countries, various types/sorts of legal restrictions are given as to such items as usable frequency bands (ranges) and allowable electric field strengths. Accordingly, a certain limitation is necessarily required for frequency bands which are utilized for power-line carrier communications in the light of these laws. Also, since various types/sorts of electric appliances are connected to general-purpose power lines which constitute communication media of power-line carrier communication apparatus, there are many differences in impedances of power lines, noise appeared on power lines, and signal attenuation amounts during signal transmissions, which may give great influences to communication performance, depending upon wiring conditions of respective household power lines. Also, these impedances, noise, and signal attenuation amounts are changed, depending upon electric appliances connected to these power lines, and furthermore, characteristics thereof are largely varied by frequencies.

As previously explained, in such power-line carrier communications using power lines as communication media, the following risks may be conceived. That is, communication trouble and interference given to other existing communication systems may be caused by impedance changes, noise, and signal attenuation of power lines. As a result, systems capable of avoiding use of frequency bands having communication trouble should be clearly discriminated from systems flexibly adaptable to law regulations of the individual countries. In other words, frequency bands usable in communications must be clearly distinguished from frequency bands which are not in communications. Furthermore, these system changes should be readily and necessarily available. As to this problem, a large number of technical ideas using a multi-carrier transfer system have been conventionally proposed.

As a conventional power-line carrier communication apparatus in which a power line is used as a communication medium, for instance, there is such a power-line carrier communication apparatus disclosed in Japanese Laid-open Patent Application No. 2000-165304.

FIG. 25 is a block diagram for indicating the power-line carrier communication apparatus described in Japanese Laid-open Patent Application No. 2000-165304.

In FIG. 25, reference numeral 600 shows a power-line carrier communication apparatus, reference numeral 601 indicates a data divider, reference numeral 602 represents a QAM (Quadrature Amplitude Modulation) encoder, reference numeral 603 denotes an inverse Fourier transforming device, reference numeral 604 is a parallel-to-serial converter, and reference numeral 605 shows a D/A converter. Also, reference numeral 606 represents a low-pass filter, reference numeral 607 denotes a power-line coupling circuit, reference numeral 608 denotes a power line, reference numeral 609 is another low-pass filter, and reference numeral 610 indicates an A/D converter. Further, reference numeral 611 shows a serial-to-parallel converter, reference numeral 612 represents a Fourier transforming device, reference numeral 613 shows a QAM decoder, and reference numeral 614 indicates a data synthesizer.

As apparent from the apparatus arrangement of FIG. 25, in the power-line carrier communication apparatus described in Japanese Laid-open Patent Application No. 2000-165304, the orthogonal frequency division multiplexing transmission system (will be referred to as "OFDM transmission" system hereinafter) utilizing the Fourier transformation is applied to the power-line carrier communication.

Next, as to the power-line carrier communication apparatus of FIG. 25, operations thereof will now be described.

With respect to transmission operation to the power line 608, transmission data is first entered into the data divider 601 so as to produce a bit stream which is used to be allocated to a plurality of sub-carriers. Next, this bit stream is converted into complex signals by the QAM encoder 602, and then, a time sample series which has been frequency-division-multiplexed is produced by processing the complex signals via the inverse Fourier transforming device 603 and the parallel-to-serial converter 604. This time sample series is transmitted via the D/A converter 605, the low-pass filter 606, and the power-line coupling circuit 607 to the power line 608. Conversely, in reception operation from the power line 608, the A/D converter 610 converts an analog signal (power-line communication signal) into a digital signal, while this analog signal is received via the power-line coupling circuit 607 and the low-pass filter 609 from the power line 608. Next, this digital signal is converted via the serial-to-parallel converter 611 and the Fourier transforming device 612 into a QAM code with respect to each of the frequencies. Then, the respective QAM codes are demodulated by the QAM decoder 613, and these demodulated data are synthesized with each other by the data synthesizer 614.

As previously explained, in accordance with this power-line carrier communication apparatus, the transmission signal is constructed of the sub-carriers having the plural frequency spectrums by the OFDM transmission system, and the amount of information which is superimposed on these respective sub-carriers is adaptively changed in accordance with the noise of the power line and the frequency characteristic of the attenuation amount. As a result, there is such an advantage that while the frequency is utilized in a higher efficiency, the data communication can be performed by improving the transmission speed. Also, since the circuits provided on the transmission side are controlled in such a manner that an arbitrary sub-carrier is not used, such a data communication within the frequency band where the environment of the transmission path is the worst may be avoided, and since the multi-value modulation is actively carried out within the frequency band where the condition of the transmission path is better, the data communication may be carried out under stable condition. Further, under this control operation, this power-line carrier communication apparatus may output signals which are properly adapted to laws/regulations effective to the individual countries.

However, in the above-explained conventional power-line carrier communication apparatus, the below-mentioned problems occur, which will now be explained with reference to FIG. 26 and FIG. 27. FIG. 26 is a graph for graphically showing a system of a guard interval, and FIG. 27 is another graph for graphically indicating a filter band characteristic of the OFDM transmission system.

In this conventional power-line carrier communication apparatus, the OFDM transmission operation using the Fourier transformation is carried out in the data communication with employment of the power line. In this OFDM transmission operation using the Fourier transformation, such a guard interval section as shown in FIG. 26 must be provided in a signal section so as to mitigate an adverse influence by multipath aspects. In view of information transmission operation, this guard interval section becomes redundant, and therefore, reduces the frequency utilizing efficiency. The shorter the guard interval section becomes, the higher the transmission efficiency is increased. However, the adverse influence by the multipath aspects is easily given to the reception side, so that the error rate characteristic is deteriorated. Under power-line communication environment, since the delay time of the delayed wave caused by the multipath aspects is especially increased, the guard interval section must be increased. As a result, the ratio of sacrificing the transmission speed becomes extremely large. As to avoiding of the interference given to the existing system, as the conventional system, such a system has been conducted. That is, since the data is not allocated (masked) with respect to the sub-carrier, the amplitudes of the signal in the frequency band used in the existing system are theoretically reduced to zero. FIG. 19 shows an example that a frequency band which is not used in the OFDM transmission system is masked (will be explained later). Actually, amplitudes of masked sub-carriers do not appear. However, since side lobes of adjacent sub-carriers are leaked, nothing but only such an attenuation of approximately 13 dB could be obtained. In the case of the OFDM transmission system, since the Fourier transformation is carried out by using the rectangular wave as the window function, as indicated in FIG. 27, nothing but only approximately 13 dB could be obtained as to the attenuation of the side lobes with respect to the main lobe. As a consequence, the interference given to the existing communication systems cannot be sufficiently reduced. More specifically, in the frequency bands which are used in the highspeed power-line carrier communications, there are provided a large number of radio systems having higher reception sensitivities such as the amateur radio system and the shortwave broadcasting systems. To avoid the adverse influence given to these existing systems, there is such a necessity that any signals are not transmitted with respect to the frequency bands which are used by the existing systems. To this end, the band-block filter must be newly installed in the conventional method. This band-block filter may cause the circuit scale to be increased. Also, since the band-block filter must be operated in high speeds, this highspeed operation requirement may cause one of major factors for increasing power consumption.

SUMMARY OF THE INVENTION

In this conventional power-line carrier communication apparatus, the following aspects are required. That is, even when the guard interval is eliminated which constitutes the factor of deteriorating the transmission speed, the data communication may be carried out. While the frequency band used in the communication is limited in correspondence with the radio laws/regulations of the respective countries, the sufficiently large attenuation amounts may be obtained in the frequency bands used in the existing communication systems without installing the band-block filter which causes the factor of increasing the circuit scale.

To meet such a requirement, an object of the present invention is to provide a power-line carrier communication apparatus operable as follows: That is, even when the guard interval is eliminated which constitutes the factor of deteriorating the transmission speed, data communications can be carried out. While frequency bands used in the data communications are limited in correspondence with the radio laws/regulations of the respective countries, sufficiently large attenuation amounts can be obtained in the frequency bands used in the existing communication systems without installing a band-block filter which causes a factor of increasing a circuit scale.

To solve the above-described problem, a power-line carrier communication apparatus, according to an aspect of the present invention, is featured by such a power-line carrier communication apparatus comprising a transmission unit, a reception unit, a power-line coupling unit for superimposing a signal derived from the transmission unit with respect to a power line as a power-line communication signal and also for extracting only a power-line communication signal from the power line, and a control unit for controlling respective structural elements of the transmission unit and of the reception unit, by which a communication operation is carried out by employing a plurality of sub-carriers, in which the transmission unit is comprised of: a signal point mapping device for producing a plurality of bit streams from inputted transmission data so as to map the bit streams to signal points of the respective sub-carriers; a wavelet inverse transforming device for modulating the respective sub-carriers by wavelet waveforms which are orthogonal to each other based upon signal point data of the respective sub-carriers mapped by the signal point mapping device so as to produce temporal waveform series data; and a D/A converter for converting the temporal waveform series data produced by the wavelet inverse transforming device into an analog temporal waveform series signal; in which the reception unit is comprised of: an A/D converter for digitally converting the power-line communication signal extracted from the power line by the power-line coupling circuit to obtain sampling-series waveform data; a wavelet transforming device for wavelet-transforming the sampling-series waveform data obtained by the A/D converter into signal point data of the respective sub-carriers; and a symbol judging device for judging the bit streams mapped by the signal point mapping device by inverse-mapping a plurality of the signal point data outputted from the wavelet transforming device, and for synthesizing the judged bit streams with each other as a reception data series.

As a consequence, such a power-line carrier communication apparatus can be obtained. That is, even when the guard interval is eliminated which constitutes the factor of deteriorating the transmission speed, data communications can be carried out. While frequency bands used in the data communications are limited in correspondence with the radio laws/regulations of the respective countries, sufficiently large attenuation amounts can be obtained in the frequency bands used in the existing communication systems without installing a band-block filter which causes a factor of increasing a circuit scale.

BRIEF DESCRIPTION OF THE DRAWINGS

FIG. 3 is a block diagram for representing a power-line carrier communication apparatus according to an embodiment mode 1 of the present invention;

FIG. 14 is a block diagram for representing the poly-phase filters of FIGS. 13A and 13B;

DETAILED DESCRIPTION OF THE PREFERRED EMBODIMENTS

Referring now to FIG. 1A to FIG. 24, embodiment modes of the present invention will be described.

Embodiment Mode 1

Figure 1A:
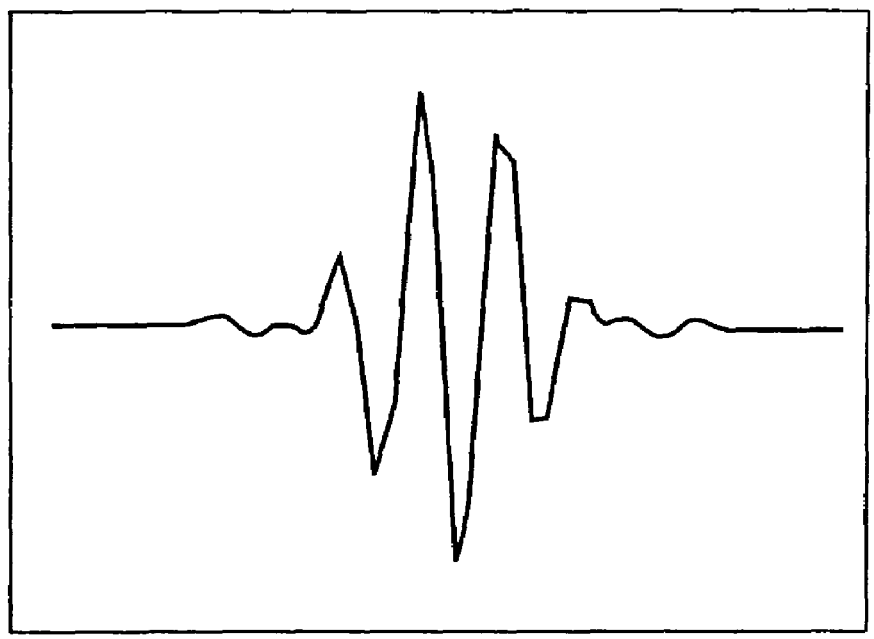
FIG. 1A shows a graph for explaining a conceptional idea as to a temporal waveform of a wavelet, and FIG. 1B indicates a graph for explaining a conceptional idea as to a frequency spectrum of a wavelet.
Figure 1B:
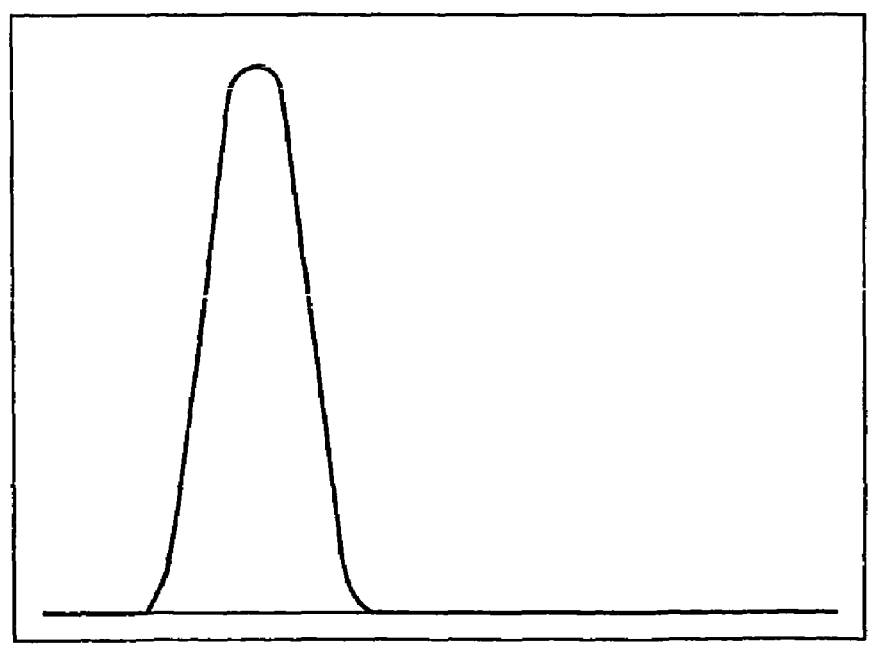
Figure 2A:
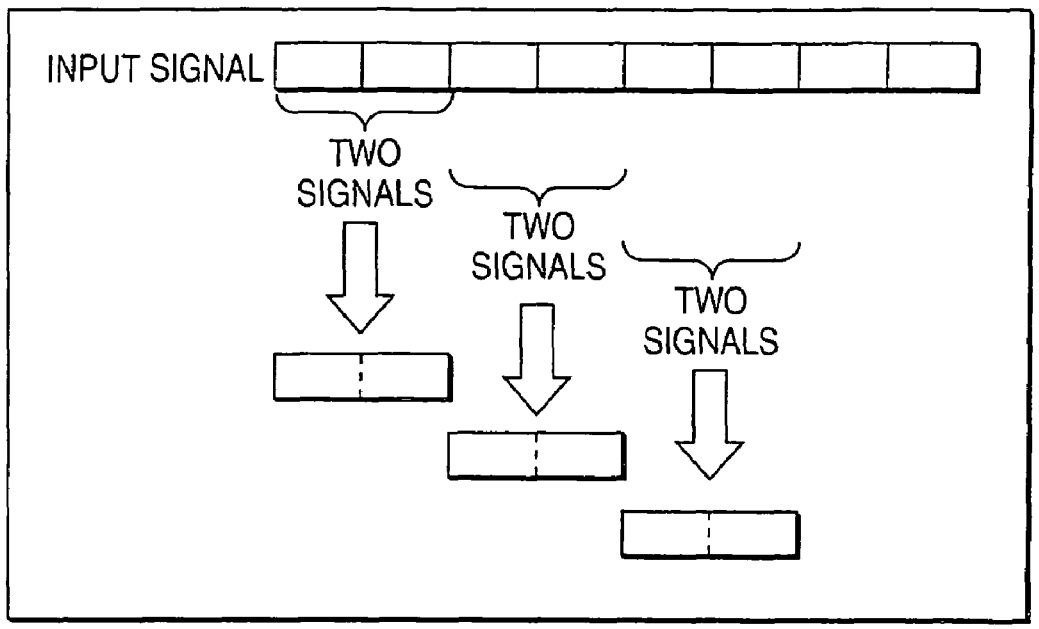
FIG. 2A is an explanatory diagram for explaining a data flow in orthogonal transforming operation.
Figure 2B:
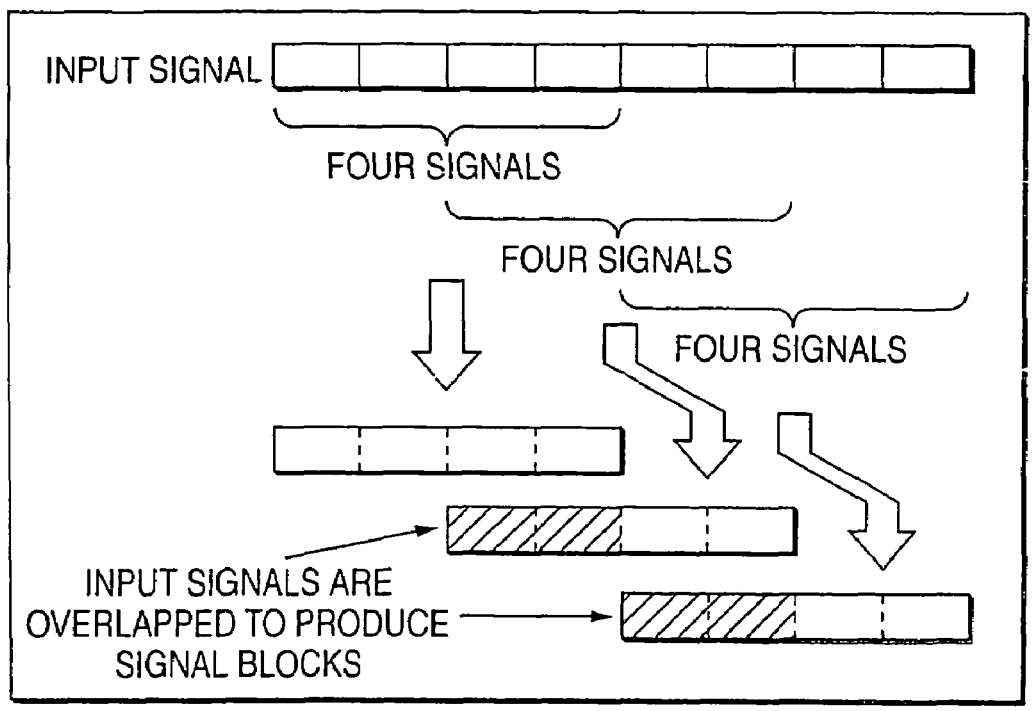
FIG. 2B is an explanatory diagram for explaining a data flow in overlapped orthogonal transforming operation.

First, different points of modulating/demodulating operations executed by the Fourier transformation and the wavelet transformation will now be described with reference to FIGS. 1A, 1B, 2A, and 2B. FIG. 1A shows a graph for explaining a conceptional idea as to a temporal waveform of a wavelet, and FIG. 1B indicates a graph for explaining a conceptional idea as to a frequency spectrum of a wavelet. FIG. 2A is an explanatory diagram for explaining a data flow in orthogonal transforming operation, and FIG. 2B is an explanatory diagram for explaining a data flow in overlapped orthogonal transforming operation.

In the modulating/demodulating operations using the Fourier transformation, a plurality of trigonometric functions which are orthogonally intersected with each other are multiplied by a window function of a rectangular wave to constitute each of sub-carriers. At this time, a frequency characteristic becomes Sinc function (Sinx/x function). On the other hand, in the modulating/demodulating operation using the wavelet transformation, each of sub-carriers is constituted by a plurality of wavelets which are orthogonally intersected with each other. In this case, the expression "wavelet" corresponds to such a waveform which is localized even in a time domain as well as in a frequency domain, as represented in FIGS. 1A and 1B.

Also, as shown in FIG. 2A, in the Fourier transformation, sample values of an input signals are processed to form sample blocks without any overlapping operation in transforming steps. The transforming example of FIG. 2A illustratively represents a flow operation of block-forming the input signal in the case that a dividing number is equal to 2. On the other hand, in the wavelet transformation, as shown in FIG. 2B, sample values of an input signal are processed to form sample blocks in such a manner that these sample values are overlapped with each other by shifting a certain number of sample values in each of transforming steps. The transforming sample of FIG. 2B illustratively shows a flow operation of block-forming the input signal in the case that a dividing number is equal to 2 and an overlapping degree is selected to be 2. As apparent from the comparison result between the Fourier transformation and the wavelet transformation, even when the same dividing numbers are employed, filter lengths in one transforming step are different from each other. In other words, both a shape and a time length of a sub-carrier wave are exclusively determined with respect to a dividing number in the Fourier transformation, whereas both a shape and a time length of a sub-carrier may be changed based upon an overlapping degree of an input signal in the wavelet transformation (wavelet transformation owns freedom degree).

FIG. 3 is a block diagram for indicating a power-line carrier communication apparatus 100 according to an embodiment mode 1 of the present invention.

In FIG. 3, reference numeral 101 shows a transmission unit, and reference numeral 111 indicates a reception unit. The transmission unit 101 is provided with a signal point mapping device 102, a wavelet inverse transforming device 103, a D/A converter 104, a transmission amplifier 105, and a band-pass filter 106. Also, the reception unit 111 is equipped with a band-pass filter 112, an amplification controller 113, an A/D converter 114, a wavelet transforming device 115, and a symbol judging device 116. The power-line carrier communication apparatus 100 is arranged by the transmission unit 101, the reception unit 111, a power-line coupling circuit 121, and a control unit 122.

Figure 4:
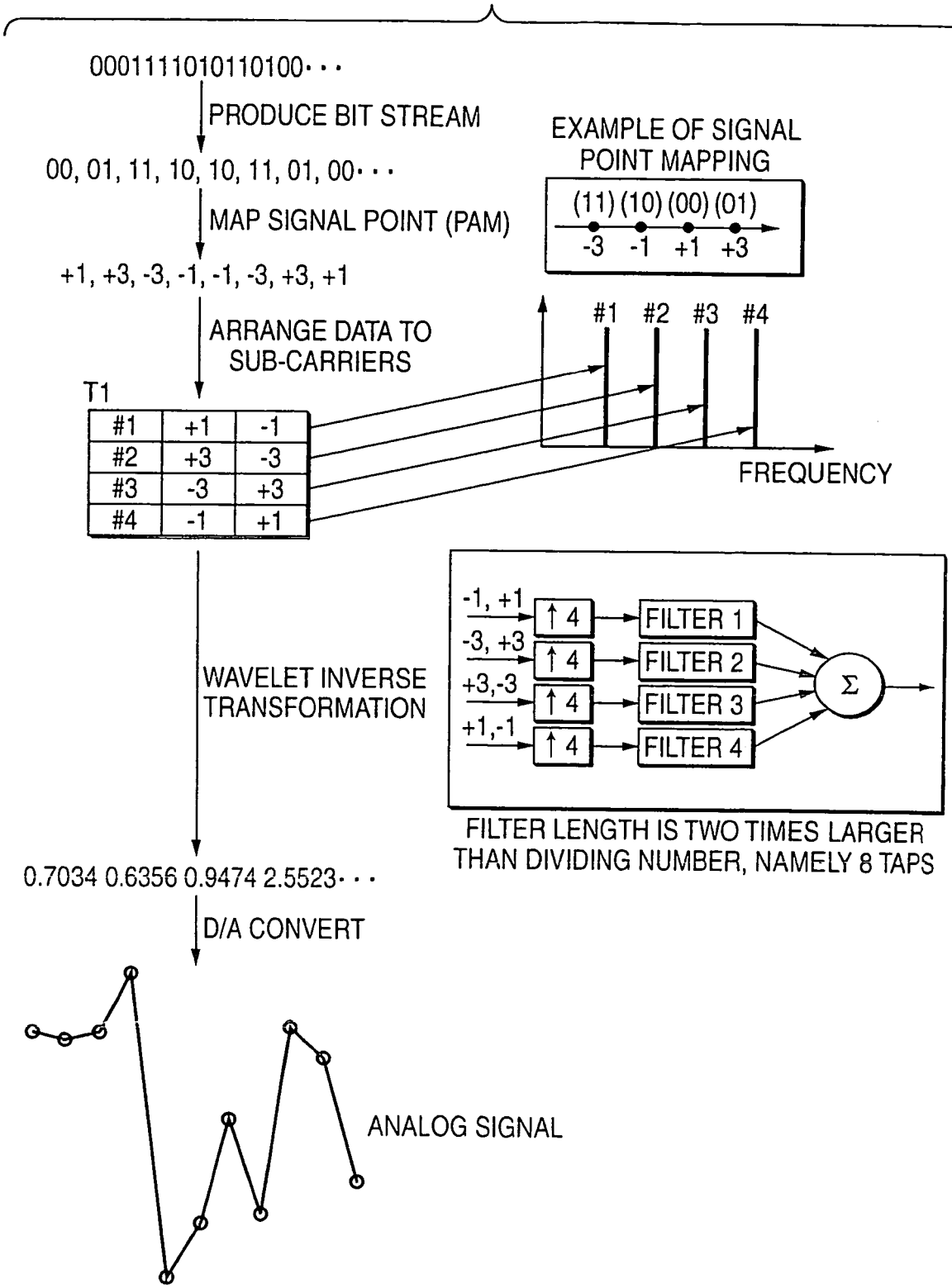
FIG. 4 is an explanatory diagram for explaining operations of a transmission unit of the power-line carrier communication apparatus shown in FIG. 3.
Figure 5:
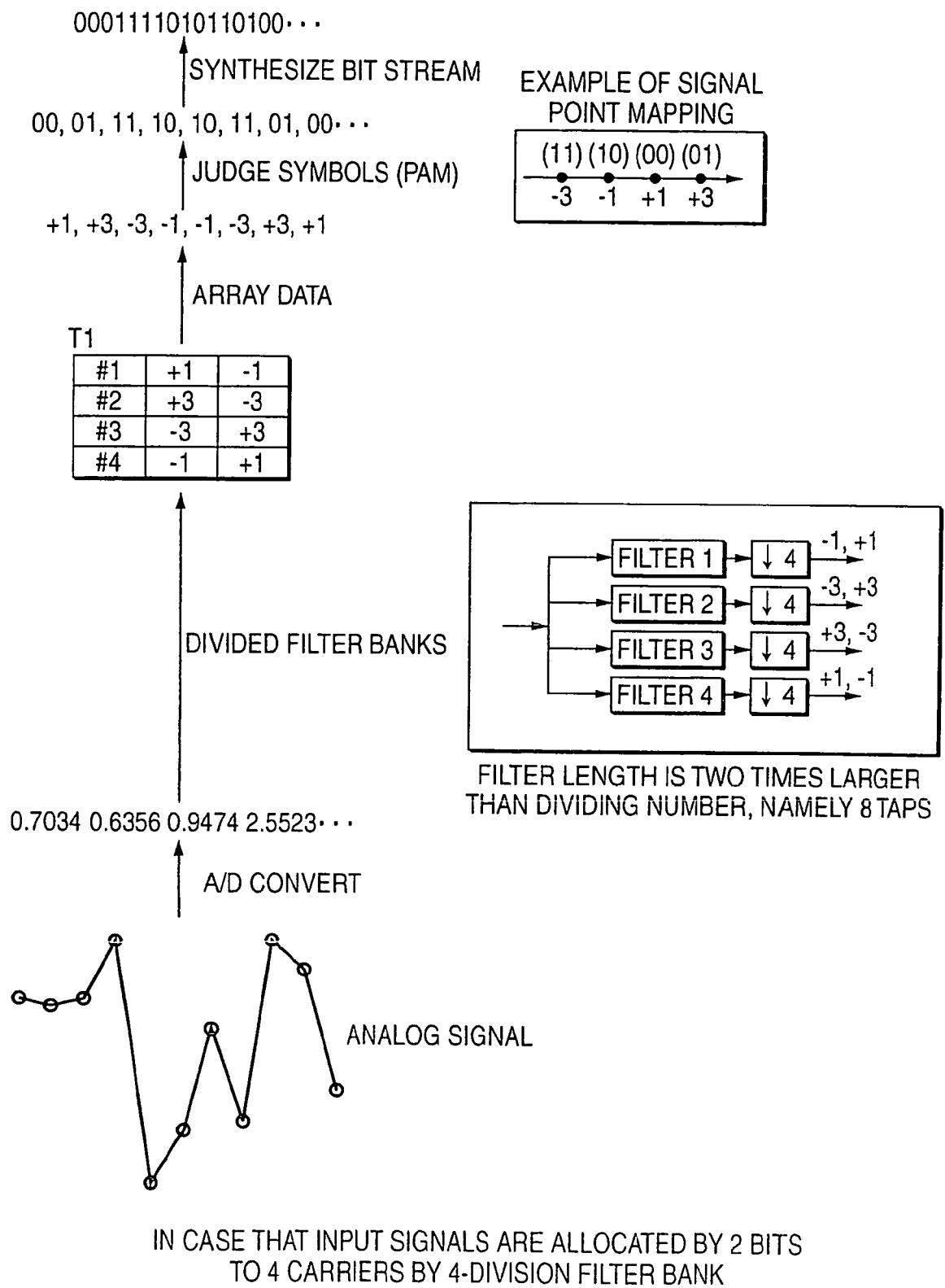
FIG. 5 is an explanatory diagram for explaining operations of a reception unit of the power-line carrier communication apparatus indicated in FIG. 3.

Operations of the power-line carrier communication apparatus 100 with employment of the above-described arrangement will now be explained with reference to FIG. 4 and FIG. 5. FIG. 4 is an explanatory diagram for explaining operations of the transmission unit 101 of the power-line carrier communication apparatus 100. FIG. 5 is an explanatory diagram for explaining operations of the reception unit 111 of the power-line carrier communication apparatus 100. It should be noted that there are degrees of freedom as to both a number "N" of sub-carriers and a filter length "M" in a wavelet transforming step. The number "N" of sub-carriers is equal to a power of 2, and the filter length "M" is equal to such a value obtained by multiplying the number "N" of sub-carriers by an arbitrary integer. However, in this embodiment mode 1, for the sake of simple explanations, a wavelet transformation for dividing a use frequency band by 4 is used. In other words, the following description is made of such a condition that the number "N" of sub-carriers used in a communication is selected to be 4. Also, each of filters which constitute a wavelet transformation owns such a filter length which is two times larger than the number "N" of sub-carriers, and the wavelet transforming operation is carried out by employing two sets of signal point data.

First, a description will now be made of data flow of the transmission unit 101 with employment of FIG. 4.

The signal point mapping device 102 firstly produces a plurality of bit streams having proper lengths by subdividing data to be transmitted (transmission bit series). For instance, the signal point mapping device 102 subdivides such data (transmission bit series) of "0001111010110100" into 2-bit data streams of "00", "01", "11", "10", "10", "11", "01", and "00" so as to produce a bit stream which is allocated to the respective sub-carriers. Next, the signal point mapping device 102 maps the respective bit streams of these produced "00", "01", "11", and "10" to signal points corresponding to PAM (Pulse Amplitude Modulation) signal points such as "+1", "+3", "−3", "−1." Then, the signal point mapping device 102 allocates these PAM signal point data as "T1" to the input unit of the wavelet inverse transforming device 103. The wavelet inverse transforming device 103 performs the wavelet inverse transforming operation by employing two sets of PAM signal point data allocated as "T1" so as to output sample values of a transmission waveform on the time axis during one symbol term. The D/A converter 104 outputs this temporal sample value (temporal waveform series data) at constant sampling time. The transmission amplifier 105 amplifies this transmission waveform up to a transmission signal level, and then, the band-pass filter 106 removes an unnecessary frequency component from the amplified transmission signal. The power-line coupling circuit 121 outputs the signal which has been waveform-shaped by the band-pass filter 106 as a signal used for a power-line communication to the power line 110. The above-described operations correspond to the description of the data flow operation during transmission operation.

Next, data flow operations of the reception unit 111 will now be explained with reference to FIG. 5.

Firstly, the power-line coupling circuit 121 extracts a power-line communication signal from the power line 110. The band-pass filter 112 removes a noise signal located outside the use frequency band from the extracted power-line communication signal, and then outputs the filtered communication signal to the amplification controller 113. The amplification controller 113 controls a signal level of this filtered communication signal in order to be covered into a dynamic range of the A/D converter 114. Then, the A/D converter 114 samples this analog signal waveform at the same timing as the sampling timing of the transmission side to obtain digital waveform data. The wavelet transforming device 115 wavelet-transforms this waveform data so as to acquire signal point data every sub-carrier. The symbol judging device 116 inverse-maps this signal point data so as to recover this signal point data as the most likelihood bit stream, so that reception data may be obtained. The above-described operations are the explanations of the data flow operations during the reception.

It should be understood that in this embodiment mode 1, since the transmission data are sequentially allocated to a plurality of sub-carriers, the highspeed data communication can be realized. Since the same data are simultaneously allocated to a plurality of different sub-carriers to be transmitted, such a data communication with higher reliability may be realized.

Since the above-described arrangement of the power-line carrier communication apparatus 100 is employed, such a redundant signal portion as the guard interval required in the OFDM transmission system is no longer required, so that the transmission efficiency can be improved. Also, since the Fourier transforming operation which requires the complex number calculation may be realized by such a wavelet transforming operation by executing the calculation of the real part, a total calculation amount can be reduced, and also, a circuit scale can be reduced.

Embodiment Mode 2

Figure 6:
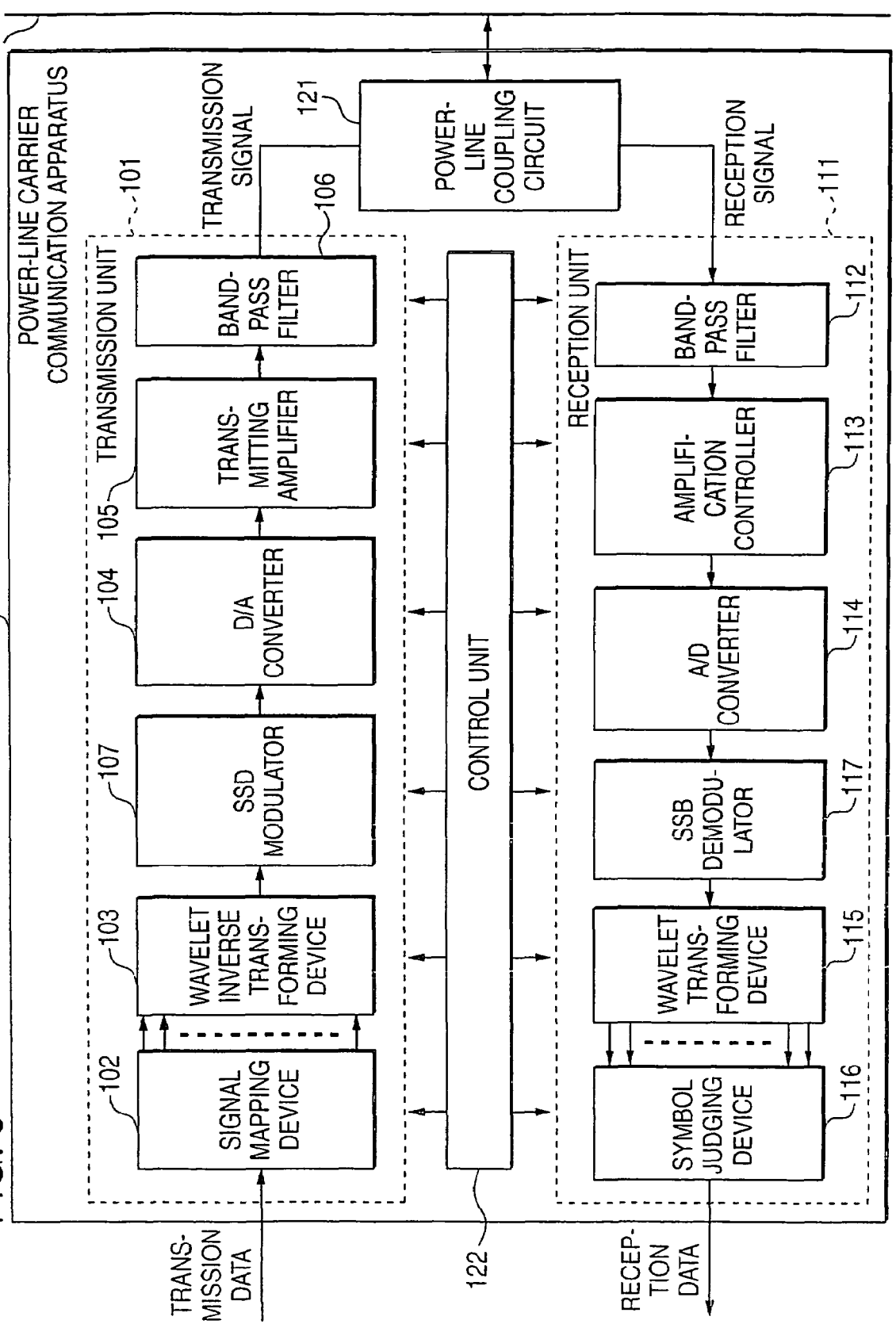
FIG. 6 is a block diagram for indicating a power-line carrier communication apparatus according to an embodiment mode 2 of the present invention.

FIG. 6 is a block diagram for indicating a power-line carrier communication apparatus according to an embodiment mode 2 of the present invention. In this embodiment mode 2, a description is made of such a case that a baseband signal in the embodiment mode 1 is expanded to a band signal in which an arbitrary carrier is set to a center thereof.

In FIG. 6, reference numeral 101 shows a transmission unit, and reference numeral 111 indicates a reception unit. The transmission unit 101 is provided with a signal point mapping device 102, a wavelet inverse transforming device 103, an SSB (Single SideBand) modulator 107 functioning as a transmitting frequency converter, a D/A converter 104, a transmitting amplifier 105, and a band-pass filter 106. Also, the reception unit 111 is equipped with a band-pass filter 112, an amplification controller 113, an SSB demodulator 117 functioning as a receiving frequency converter, a wavelet transforming device 115, and a symbol judging device 116. The power-line carrier communication apparatus 100 is arranged by the transmission unit 101, the reception unit 111, a power-line coupling circuit 121, and a control unit 122.

Operations of the power-line carrier communication apparatus 100 with employment of the above-described arrangement will now be explained with reference to FIG. 4 and FIG. 5. For the sake of simple explanations, in this embodiment mode 2, it is so assumed that while a wavelet transformation for subdividing a use frequency band into four frequency bands is employed, each of filters which constitute the wavelet transforming device owns such a filter length obtained by multiplying the number "N" of sub-carriers by 2. Also, it should be understood that operations executed in this embodiment mode 2 are similar to those of the embodiment mode 1 except for frequency shift operation.

First, a description will now be made of data flow of the transmission unit 101 with employment of FIG. 4. The signal point mapping device 102 firstly produces a plurality of bit streams having proper lengths by subdividing data to be transmitted (transmission bit series). For instance, the signal point mapping device 102 subdivides such data (transmission bit series) of "0001111010110100" into 2-bit data streams of "00", "01", "11", "10", "10", "11", "01", and "00" so as to produce a bit stream which is allocated to the respective sub-carriers. Next, the signal point mapping device 102 maps the respective bit streams of these produced "00", "01", "11", and "10" to signal points corresponding to PAM (Pulse Amplitude Modulation) signal points such as "+1", "+3", "−3", "−1." Then, the signal point mapping device 102 allocates these PAM signal point data as "T1" to the input unit of the wavelet inverse transforming device 103. The wavelet inverse transforming device 103 performs the wavelet inverse transforming operation by employing two sets of PAM signal point data allocated as "T1" so as to output sample values of a transmission waveform on the time axis during one symbol term. The SSB modulator 107 frequency-shifts this transmission sample series. The D/A converter 104 outputs this temporal sample value (temporal waveform series data) at constant sampling time. The transmission amplifier 105 amplifies this transmission waveform up to a transmission signal level, and then, the band-pass filter 106 removes an unnecessary frequency component from the amplified transmission signal. The power-line coupling circuit 121 outputs the signal which has been waveform-shaped by the band-pass filter 106 as a signal used for a power-line communication to the power line 110. The above-described operations correspond to the description of the data flow operation during transmission operation.

Next, data flow operations of the reception unit 111 will now be explained with reference to FIG. 5.

Firstly, the power-line coupling circuit 121 extracts a power-line communication signal from the power line 110. The band-pass filter 112 removes a noise signal located outside the use frequency band from the extracted power-line communication signal, and then outputs the filtered communication signal to the amplification controller 113. The amplification controller 113 controls a signal level of this filtered communication signal in order to be covered into a dynamic range of the A/D converter 114. Then, the A/D converter 114 samples this analog signal waveform at the same timing as the sampling timing of the transmission side to obtain digital waveform data. The SSB demodulator 117 down-converts this digital signal into digital data in a baseband range. The wavelet transforming device 115 wavelet-transforms this waveform data so as to acquire signal point data every sub-carrier. The symbol judging device 116 inverse-maps this signal point data so as to recover this signal point data as the most likelihood bit stream, so that reception data may be obtained. The above-described operations are the explanations of the data flow operations during the reception.

Since the above-described arrangement of the power-line carrier communication apparatus 100 is employed, similar to the embodiment mode 1, such a redundant signal portion as the guard interval required in the OFDM transmission system is no longer required, so that the transmission efficiency can be improved. Also, since the Fourier transforming operation which requires the complex number calculation may be realized by such a wavelet transforming operation by executing the calculation of the real part, a total calculation amount can be reduced, and also, a circuit scale can be reduced. Furthermore, since the shifting operation to the arbitrary frequency can be carried out, the power-line carrier communication apparatus of this embodiment mode 2 may be readily applied to such a case that, for example, frequency bands which are different in indoor use and outdoor use are made different from each other in the individual countries. As a result, a circuit scale may be furthermore reduced, as compared with such a case that the power-line carrier communication apparatus is available only in the baseband transmission system.

Embodiment Mode 3

Figure 7:
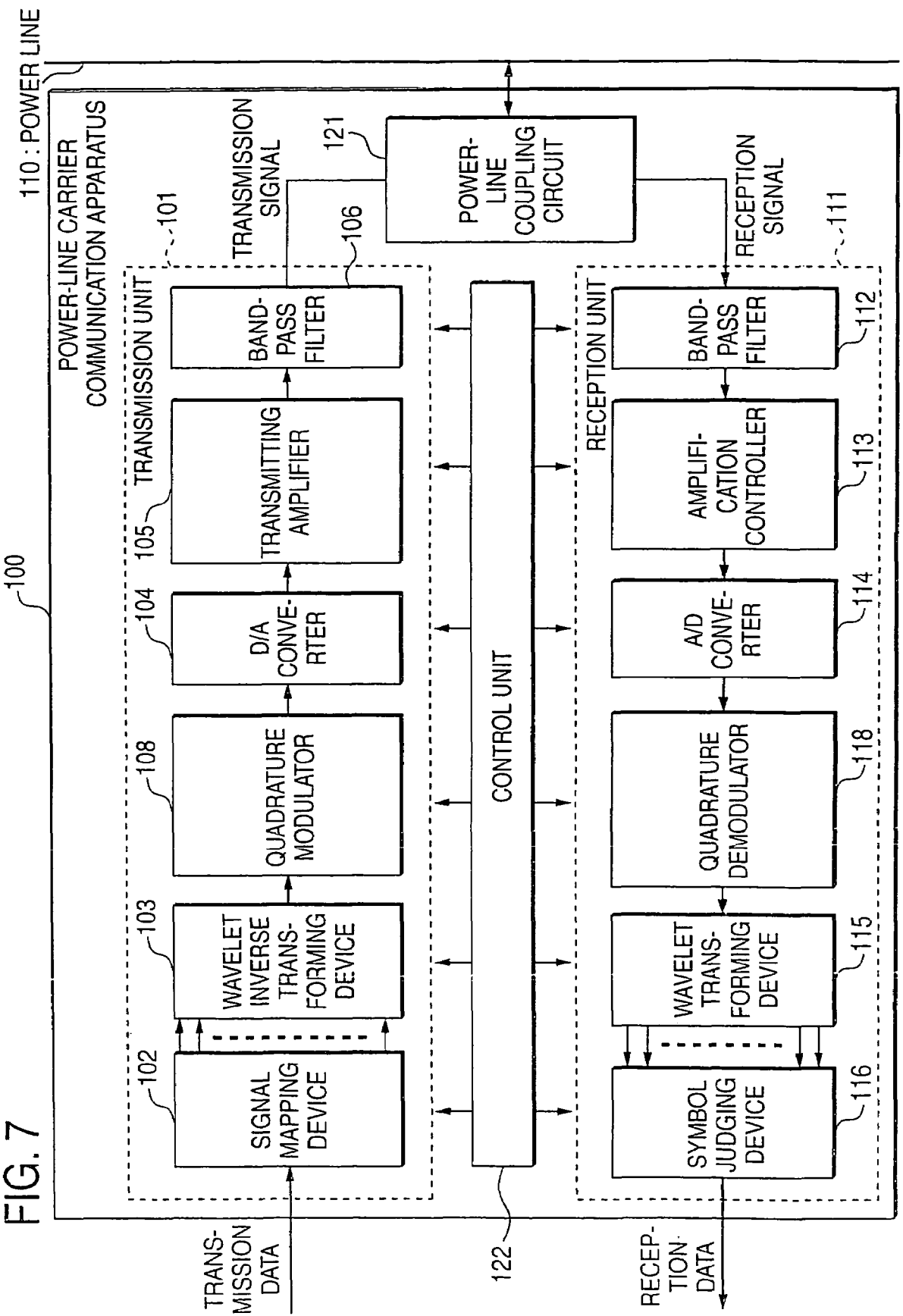
FIG. 7 is a block diagram for representing a power-line carrier communication apparatus according to an embodiment mode 3 of the present invention.

FIG. 7 is a block diagram for indicating a power-line carrier communication apparatus 100 according to an embodiment mode 3 of the present invention.

In FIG. 7, reference numeral 101 shows a transmission unit, and reference numeral 111 indicates a reception unit. The transmission unit 101 is provided with a signal point mapping device 102, a wavelet inverse transforming device 103, a D/a converter 104, a quadrature modulator 108, a transmission amplifier 105, and a band-pass filter 106. Also, the reception unit 111 is equipped with a band-pass filter 112, an amplification controller 113, an A/D converter 114, a quadrature demodulator 118, a wavelet transforming device 115, and a symbol judging device 116. The power-line carrier communication apparatus 100 is arranged by the transmission unit 101, the reception unit 111, a power-line coupling circuit 121, and an overall control unit 122.

Figure 8:
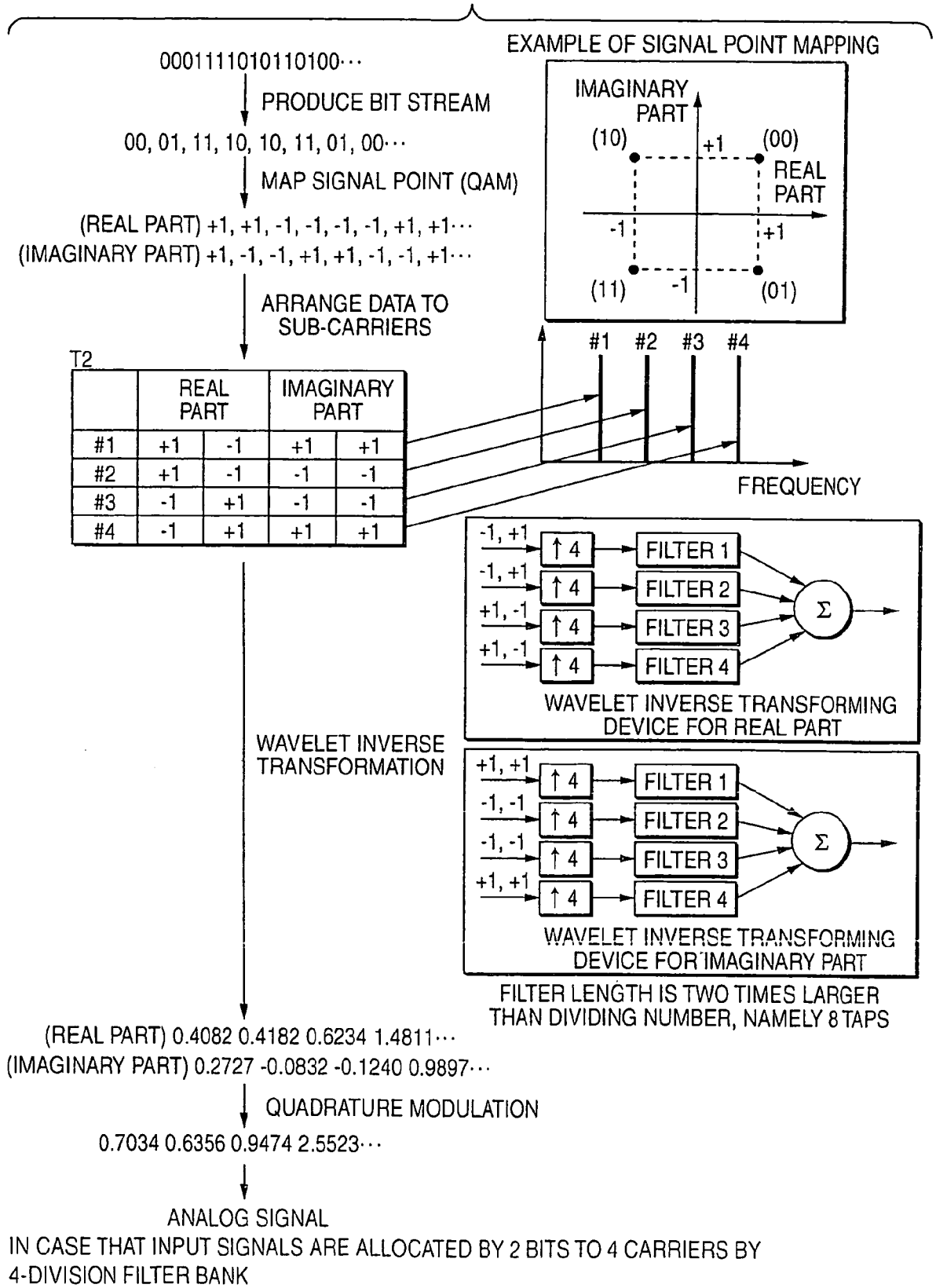
FIG. 8 is an explanatory diagram for explaining operations of a transmission unit of the power-line carrier communication apparatus shown in FIG. 7.
Figure 9:
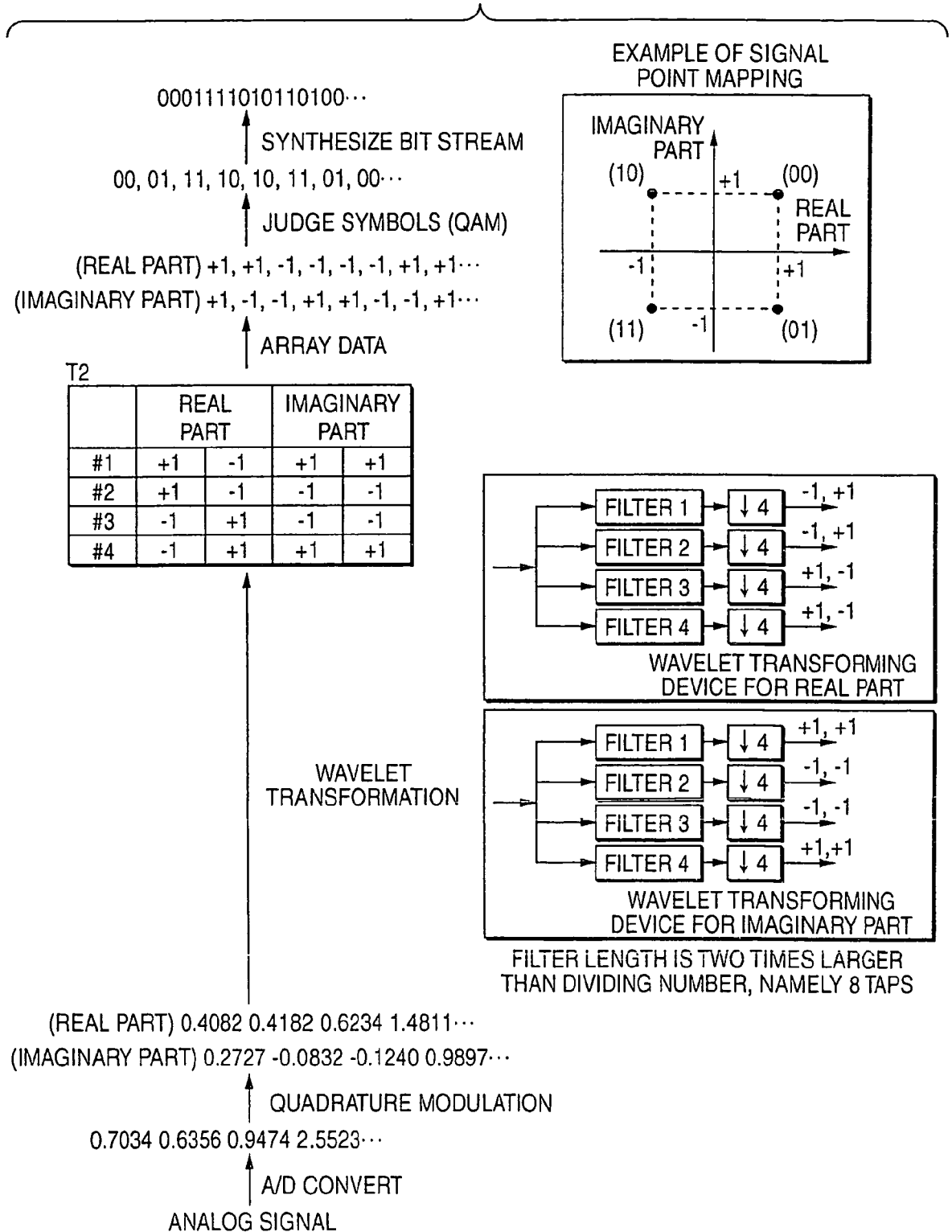
FIG. 9 is an explanatory diagram for explaining operations of a reception unit of the power-line carrier communication apparatus indicated in FIG. 7.

Operations of the power-line carrier communication apparatus 100 with employment of the above-described arrangement will now be explained with reference to FIG. 8 and FIG. 9. FIG. 8 is an explanatory diagram for explaining operations of the transmission unit 101 of the power-line carrier communication apparatus 100. FIG. 9 is an explanatory diagram for explaining operations of the reception unit 111 of the power-line carrier communication apparatus 100. For the sake of simple explanations, in this embodiment mode 3, it is so assumed that while a wavelet transformation for subdividing a use frequency band into four frequency bands is employed, each of filters which constitute the wavelet transforming device owns such a filter length obtained by multiplying the number "N" of sub-carriers by 2.

First, a description will now be made of data flow of the transmission unit 101 with employment of FIG. 8.

The signal point mapping device 102 firstly produces a plurality of bit streams having proper lengths by subdividing data to be transmitted (transmission bit series). For instance, the signal point mapping device 102 subdivides such data (transmission bit series) of "0001111010110100" into 2-bit data streams of "00", "01", "11", "10", "10", "11", "01", and "00" so as to produce a bit stream which is allocated to the respective sub-carriers. Next, the signal point mapping device 102 maps the respective bit streams of these produced "00", "01", "11", and "10" to signal points of a complex domain corresponding to a quadrature amplitude modulation (QAM) system. At this time, the complex signal point data is allocated to a real part and an imaginary part. The wavelet inverse transforming device 103 executes the wavelet inverse transforming operation with respect to the real part and the imaginary part respectively by employing two sets of signal point data allocated as "T2" so as to output sample values of a transmission waveform on the time axis during one symbol term. At this time, the sample value of the transmission waveform remains in the form of the complex number. The quadrature modulator 108 quadrature-modulates this complex signal so as to frequency-shift the complex signal to an arbitrary carrier band. The D/A converter 104 outputs the temporal sample value which has been frequency-shifted at constant sampling time. The transmission amplifier 105 amplifies this transmission waveform up to a proper signal level, and then, the band-pass filter 106 removes an unnecessary frequency component from the amplified transmission signal. The power-line coupling circuit 121 outputs the signal which has been waveform-shaped by the band-pass filter 106 as a signal used for a power line communication to the power line 110. The above-described operations correspond to the description of the data flow operation during transmission operation.

Next, data flow operations of the reception unit 111 will now be explained with reference to FIG. 9.

Firstly, the power-line coupling circuit 121 extracts a power-line communication signal from the power line 110. The band-pass filter 112 removes a noise signal located outside the use frequency band from the extracted power-line communication signal, and then outputs the filtered communication signal to the amplification controller 113. The amplification controller 113 controls a signal level of this filtered communication signal in order to be covered into a dynamic range of the A/D converter 114. Then, the A/D converter 114 samples this analog signal waveform at the same timing as the sampling timing of the transmission side to obtain digital waveform data. The quadrature demodulator 118 down-converts the waveform data into a baseband range so as to be converted into a complex baseband signal. The wavelet transforming device 115 wavelet-transforms this complex waveform data so as to acquire complex signal point data every sub-carrier. The symbol judging device 116 inverse-maps this complex signal point data so as to recover this signal point data as the most likelihood bit stream, so that reception data may be obtained. The above-described operations are the explanations of the data flow operations during the reception.

Since the above-described arrangement of the power-line carrier communication apparatus 100 is employed, such a redundant signal portion as the guard interval required in the OFDM transmission system is no longer required, so that the frequency utilizing efficiency can be improved. Also, since the signal point data of the complex domain can be used by performing the quadrature modulating/demodulating operations, the frequency utilizing efficiency can be furthermore improved.

Embodiment Mode 4

An arrangement of a power-line carrier communication apparatus according to an embodiment mode 4 of the present invention corresponds to such an arrangement indicated in FIG. 3, FIG. 6, or FIG. 7. In this embodiment mode 4, a description is made of such a case that both the wavelet inverse transferring device 103 and the wavelet transforming device 15 are arranged by a generalized lapped orthogonal transformation (GLT). The GLT corresponds to such a fact that a structure of a lapped orthogonal transformation (LOT) is generalized as to the tap number of filters.

Figure 10A:
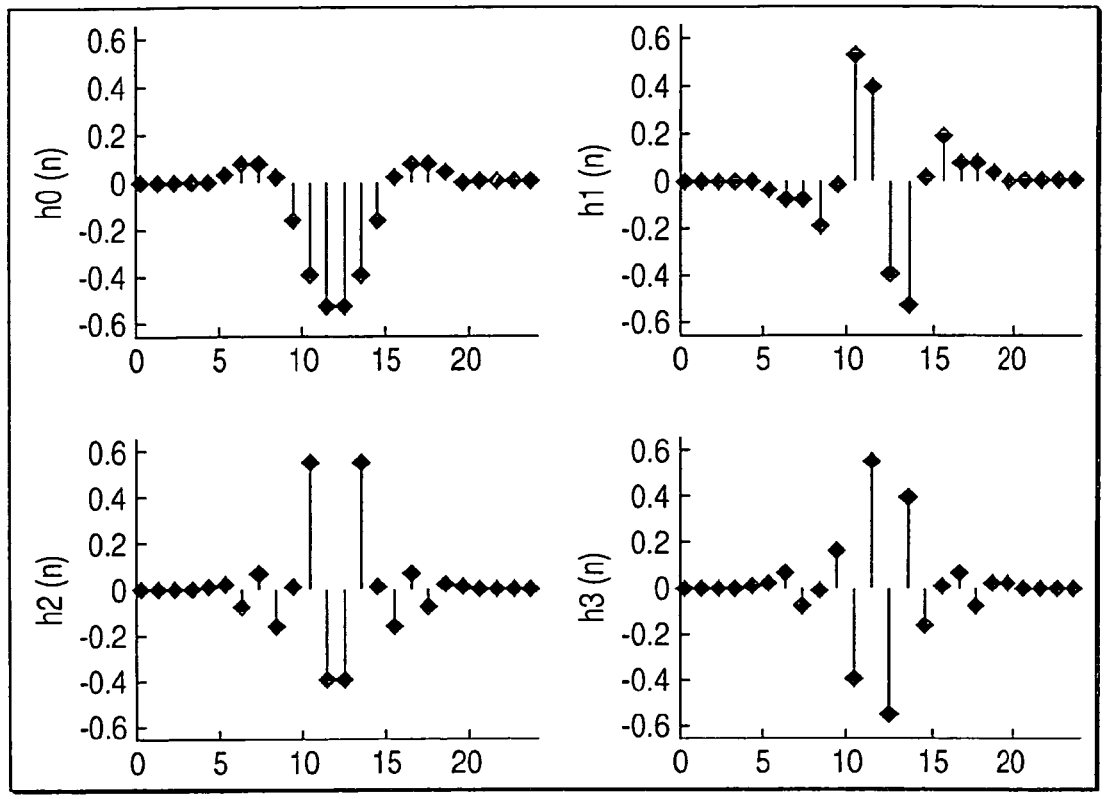
FIG. 10A is a graph for graphically showing an example of impulse responses of respective filters employed in a filter bank circuit for realizing a 4-divided complete reconstruction of GLT.
Figure 10B:
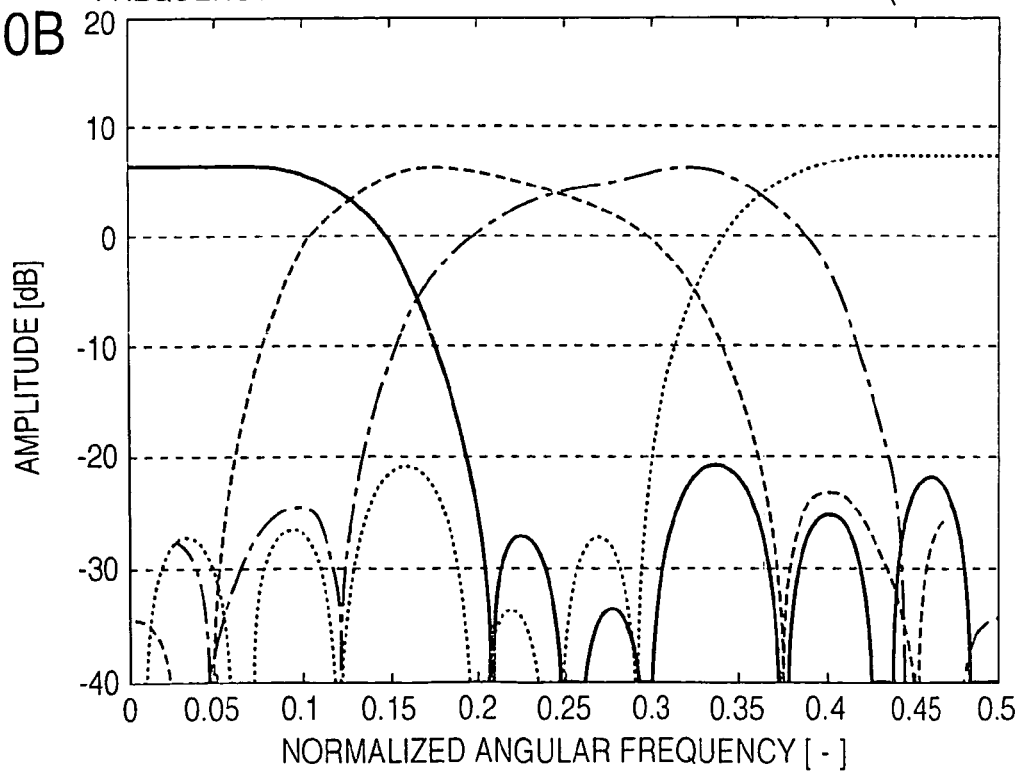
FIG. 10B is a graph for graphically showing an example of frequency responses of the respective filters employed in the filter bank circuit for realizing the 4-divided complete reconstruction of GLT.

FIG. 10A is a graph for graphically indicating an example of an impulse response of each of filters employed in a filter bank circuit which realizes a GLT having 4-divided complete reconstructions, and FIG. 10B is a graph for graphically showing an example of a frequency response of each of the filters employed in the filter bank circuit which realizes the GLT having the 4-divided complete reconstructions.

It should be understood that in this embodiment mode 4, the filter bank circuit which realizes the GLT is constituted by an FIR filter group. Alternatively, this filter bank circuit may be constituted by either a poly-phase filter or a lattice structure. Also, this embodiment mode 4 has represented the example of the filter bank circuit which realizes the GLT having the complete reconstruction. Alternatively, a filter bank circuit having a quasi-complete reconstruction may be applied. Since the filter bank circuit is constituted by the quasi-complete reconstruction, side lobes in the respective sub-carriers may be furthermore reduced, as compared with in such a case that the filter bank circuit is constituted by the complete reconstruction.

Since the filter bank circuit having such a filter coefficient as indicated in FIGS. 10A and 10B is constructed, linear phase characteristics can be given to all of the filters employed in the filter bank circuit which realizes the wavelet transformation. Since all of the filters own the linear phase characteristics, a total number of multipliers required in the filter bank circuit can be reduced by ½, so that the circuit scale can be reduced. Also, since the frequency characteristic of each of these sub-carriers can be designed to be made steep while the main lobe is located at a center, the adverse influences caused by interference given from other sub-carriers and noise produced outside the use frequency band can be reduced during the reception operation.

Embodiment Mode 5

An arrangement of a power-line carrier communication apparatus according to an embodiment mode 5 of the present invention corresponds to such an arrangement indicated in FIG. 3, FIG. 6, or FIG. 7. In this embodiment mode 5, a description is made of such a case that both the wavelet inverse transforming device 103 and the wavelet transforming device 115 are arranged by an extended modulated lapped transformation (ELT). The ELT corresponds to such a fact that a structure of a modulated lapped transformation (MLT) is generalized as to the tap number of filters.

Figure 11A:
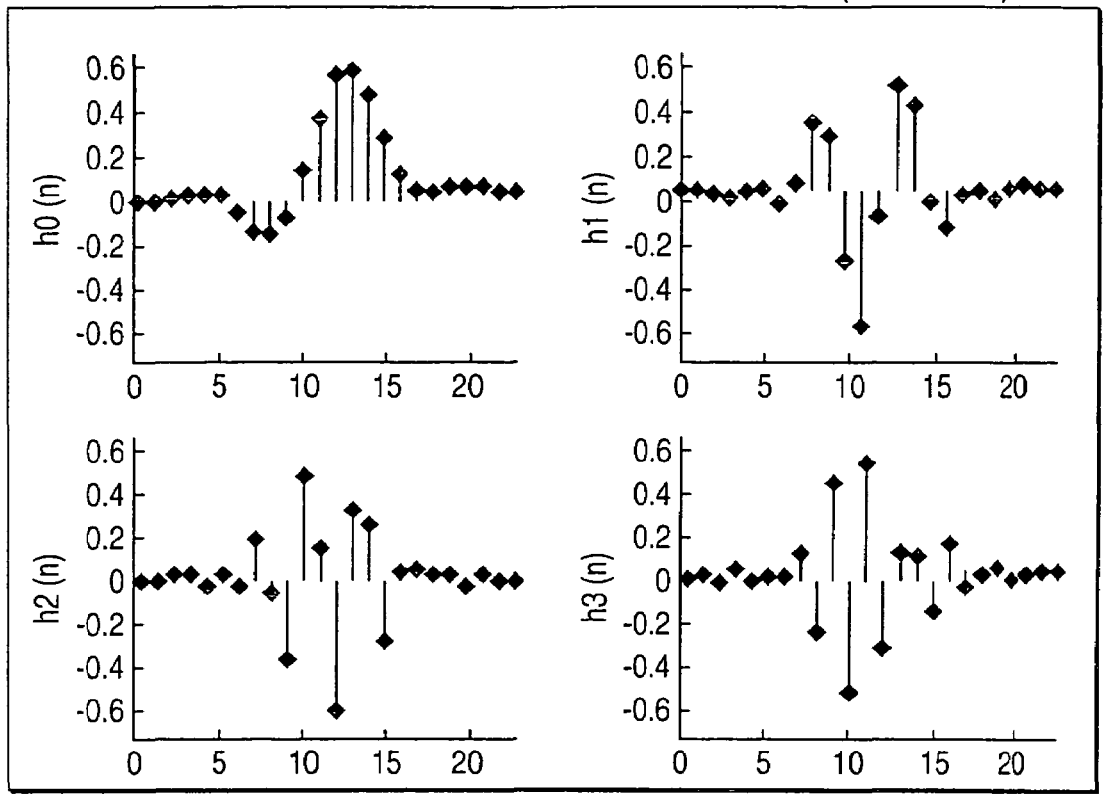
FIG. 11A is a graph for graphically showing an example of impulse responses of respective filters employed in a filter bank circuit for realizing a 4-divided ELT.
Figure 11B:
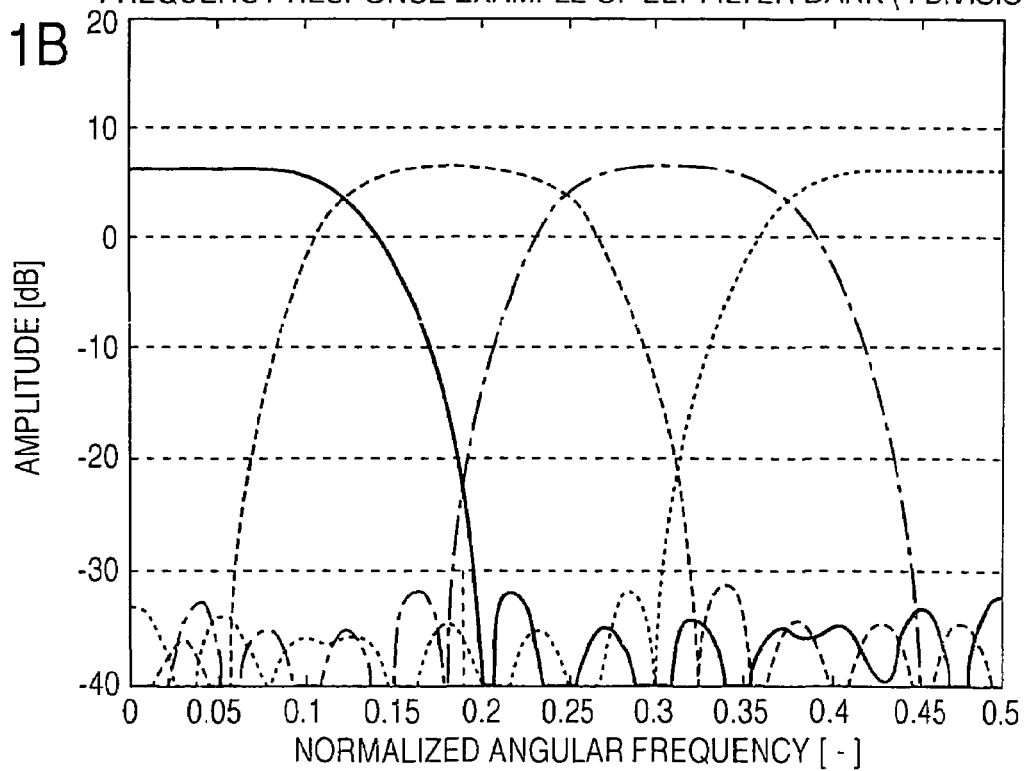
FIG. 11B is a graph for graphically showing an example of frequency responses of the respective filters employed in the filter bank circuit for realizing the 4-divided ELT.

FIG. 11A is a graph for graphically indicating an example of an impulse response of each of filters employed in a filter bank circuit which realizes a 4-division ELT structure and FIG. 11B is a graph for graphically showing an example of a frequency response of each of the filters employed in the filter bank circuit which realizes the 4-division ELT structure.

It should be understood that in this embodiment mode 5, the filter bank circuit which realizes the ELT structure is constituted by an FIR filter group. Alternatively, this filter bank circuit may be constituted by either a poly-phase filter or a lattice structure.

Since the filter bank circuit having such a filter coefficient as indicated in FIGS. 11A and 11B is arranged, side lobes of the sub-carriers can be furthermore reduced, as compared with either the LOT structure or the GLT structure as explained in the embodiment mode 4. Also, since the frequency characteristic of each of these sub-carriers can be designed to be made steep while the main lobe is located at a center, the adverse influences caused by interference given from other sub-carriers and noise produced outside the use frequency band can be reduced during the reception operation without requiring the band-block filter. This band-block filter is required in the conventional system in order not to give the adverse influence to the existing system in the power-line carrier communication apparatus 100.

Embodiment Mode 6

Figure 12A:
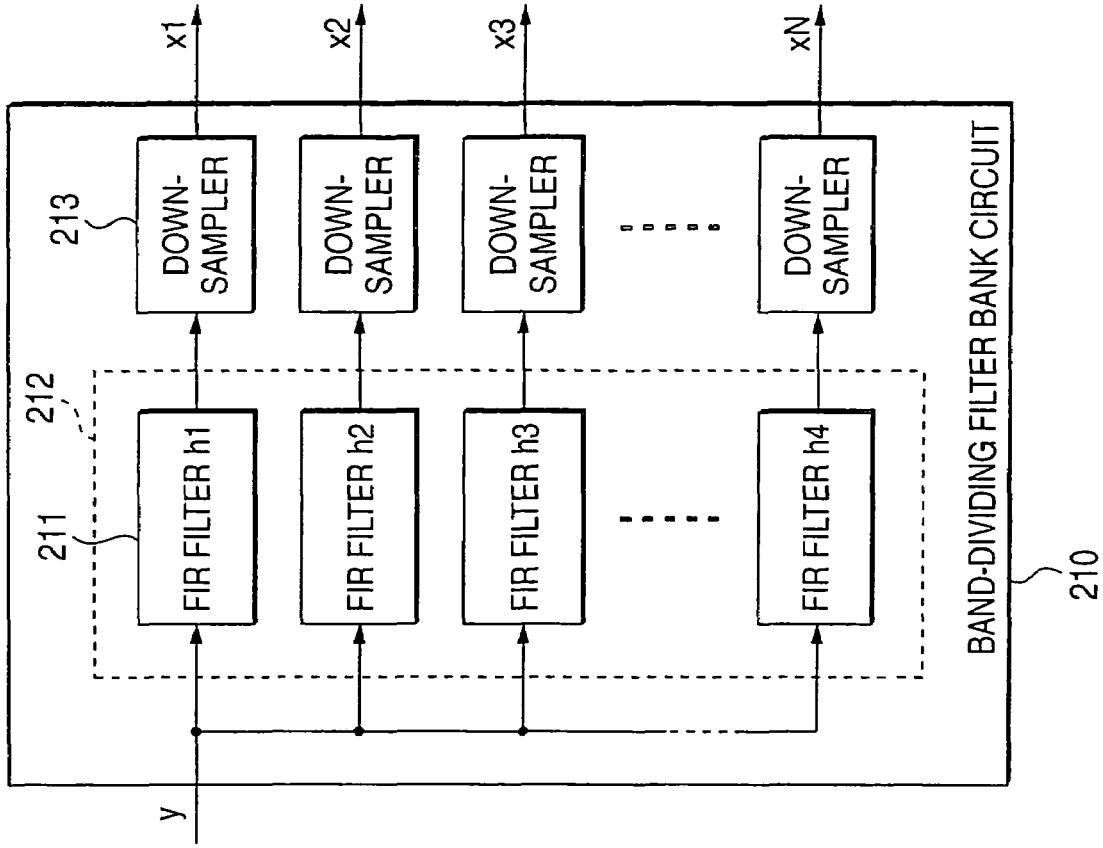
FIG. 12A is a block diagram for indicating a band-synthesizing filter bank circuit constructed of general-purpose FIR filters.
Figure 12B:
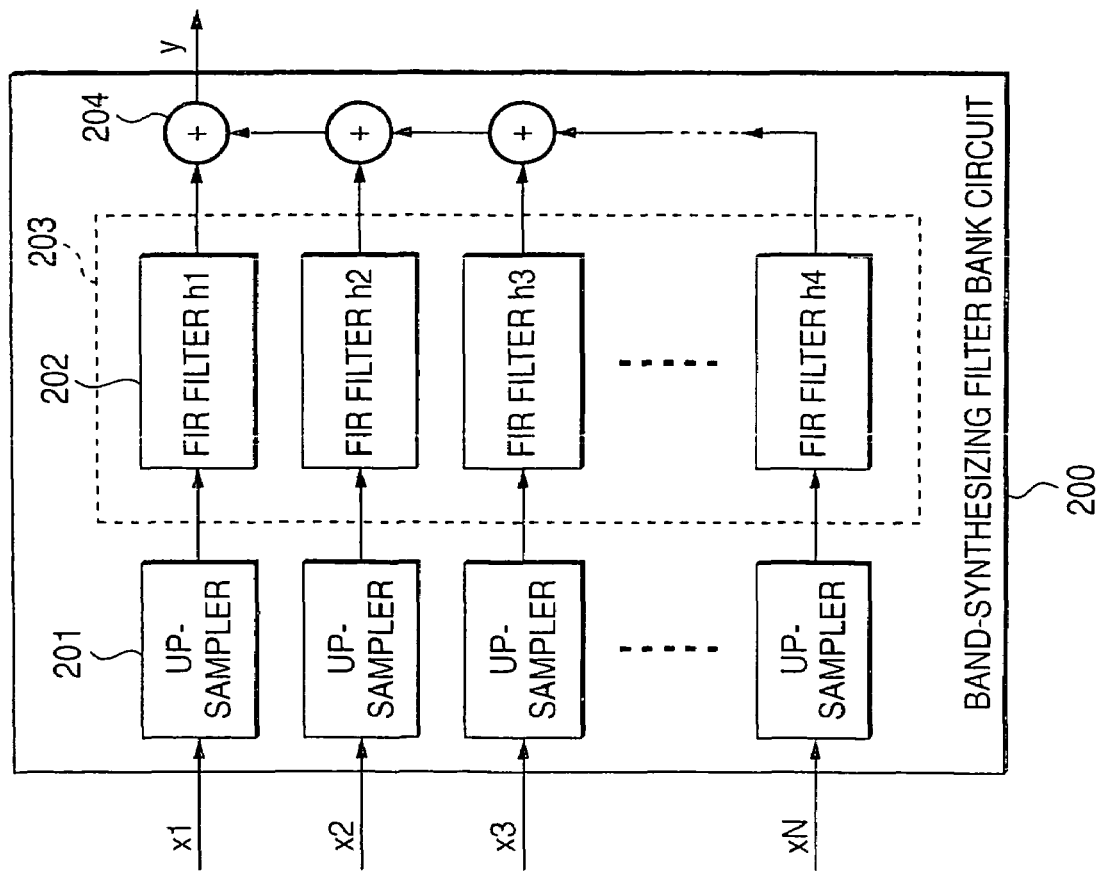
FIG. 12B is a block diagram for showing a band-dividing filter bank circuit constituted by the general-purpose FIR filters.
Figure 13A:
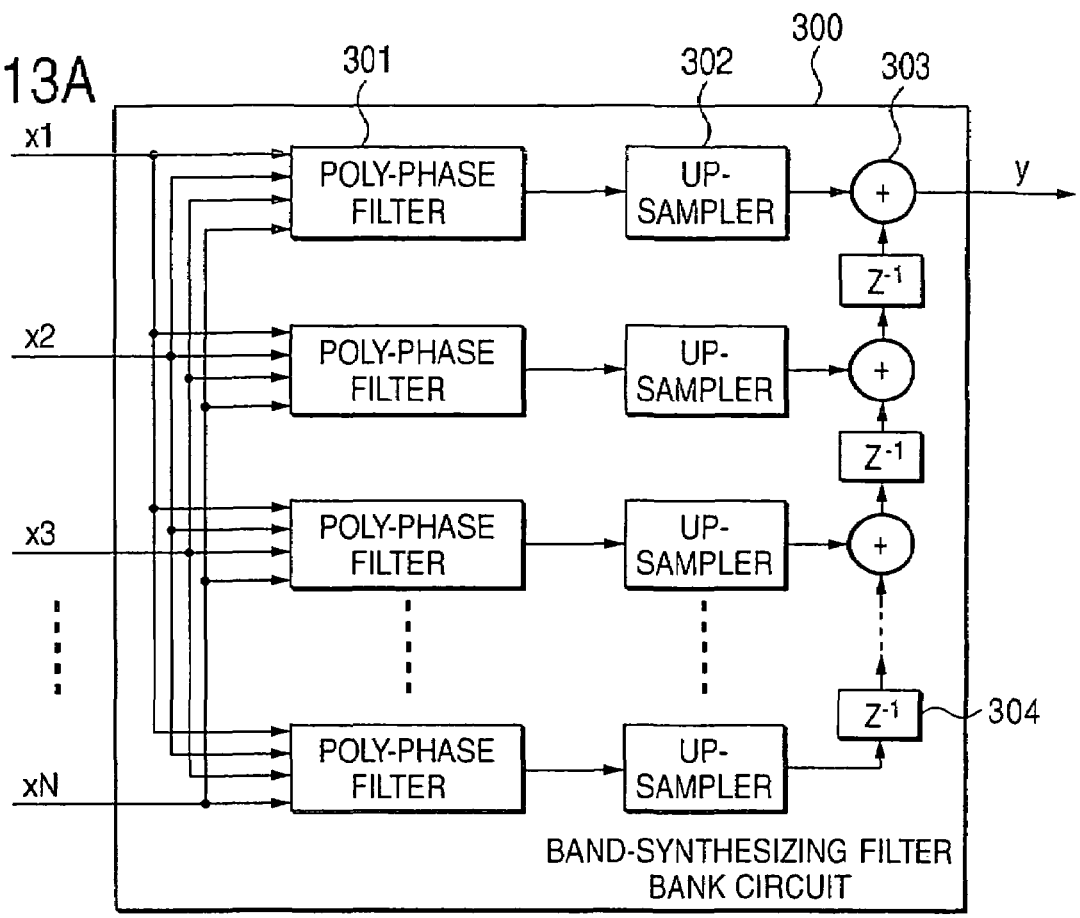
FIG. 13A is a block diagram for indicating a band-synthesizing filter bank circuit constructed of poly-phase filters.
Figure 13B:
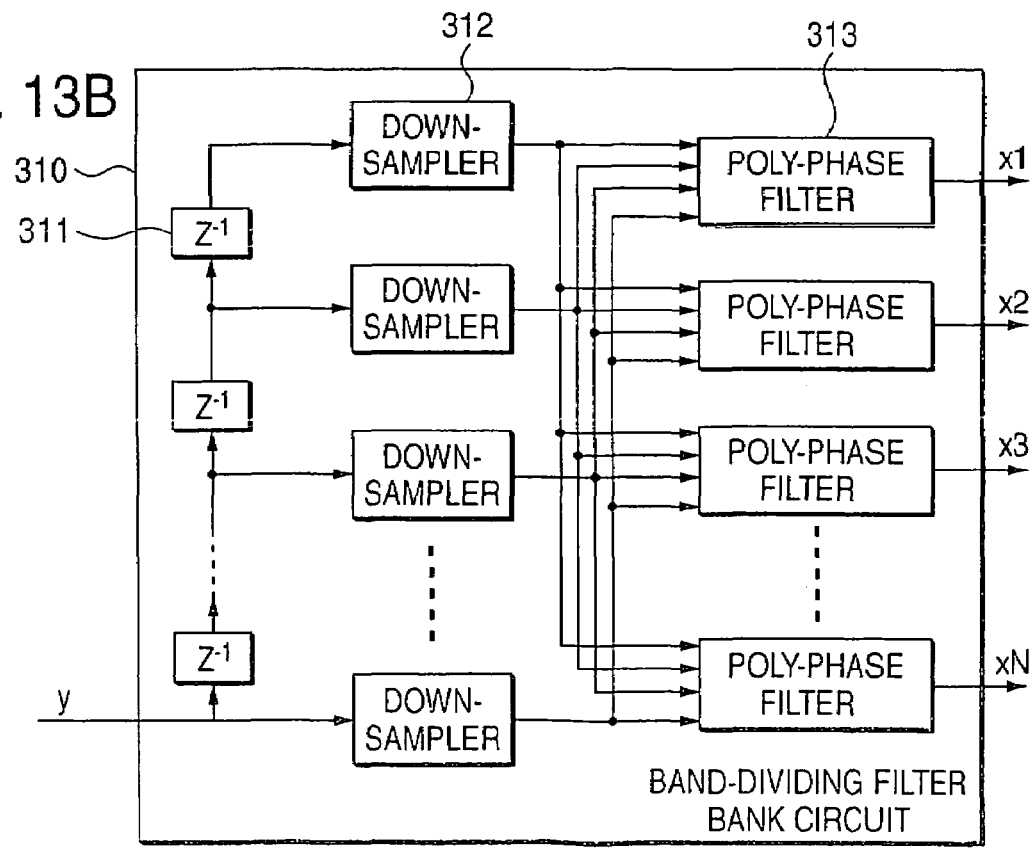
FIG. 13B is a block diagram for showing a band-dividing filter bank circuit constituted by the poly-phase filters.

In an embodiment mode 6 of the present invention, a description will now be made of such a case that both the wavelet inverse transforming device 103 and the wavelet transforming device 115, which constitute the power-line carrier communication apparatus 100 of FIG. 3, FIG. 6, FIG. 7, are constituted by a poly-phase filter with reference to FIGS. 12A, 12B, FIGS. 13A, and 13B. FIG. 12A is a block diagram for representing a band-synthesizing filter bank circuit which is constituted by general-purpose FIR filters, and FIG. 12B is a block diagram for showing a band-dividing filter bank circuit which is constituted by general-purpose FIR filters. FIG. 13A is a block diagram for representing a band-synthesizing filter bank circuit which is constituted by poly-phase filters, and FIG. 13B is a block diagram for showing a band-dividing filter bank circuit which is constituted by poly-phase filters.

First, the arrangement of the filter bank circuit which is arranged by employing the general-purpose FIR filters will now be explained with reference to FIGS. 12A and 12B. In FIGS. 12A and 12B, reference numeral 201 indicates an up-sampler for multiplying a sampling rate of a signal by "N" times, reference numeral 202 shows an FIR filter, reference numeral 203 denotes an FIR filter group formed by combining a plurality of FIR filters 202 which are orthogonal to each other, and reference numeral 204 indicates a two-input adder. With employment of the above-described circuit arrangement, a band-synthesizing filter bank circuit 200 functioning as the wavelet inverse transforming device 103 may be arranged.

Also, reference numeral 211 represents FIR filters, reference numeral 212 shows an FIR filter group formed by combining a plurality of FIR filters 211 which are orthogonal to each other, and reference numeral 113 denotes a down-sampler for decreasing a sampling rate by 1/N. With employment of the above-explained circuit arrangement, the band-dividing filter bank circuit 210 functioning as the wavelet transforming device 115 may be arranged.

It should also be noted that the respective FIR filters 202 and 211 which constitute both the FIR filter group 203 of the wavelet inverse transforming device 103 and the FIR filter group 212 of the wavelet transforming unit 210 are arranged in such a manner that an input signal with respect to the wavelet transforming device 115 is made coincident with an output signal with respect to this wavelet transforming device 115 except for a signal delay. For example, as a filter coefficient capable of satisfying this condition, the following (table 1) and (table 2) may be conceived:

TABLE 1

Example of Filter Coefficients of Wavelet Inverse Transforming Device (Band-synthesizing Filter Bank Circuit)

|    | tap 1 | tap 2 | tap 3 | tap 4 | tap 5 | tap 6 | tap 7 | tap 8 |
|----|-------|-------|-------|-------|-------|-------|-------|-------|
| h1 | $\alpha 18$ | $\alpha 17$ | $\alpha 16$ | $\alpha 15$ | $\alpha 14$ | $\alpha 13$ | $\alpha 12$ | $\alpha 11$ |
| h2 | $\alpha 28$ | $\alpha 27$ | $\alpha 26$ | $\alpha 25$ | $\alpha 24$ | $\alpha 23$ | $\alpha 22$ | $\alpha 21$ |
| h3 | $\alpha 38$ | $\alpha 37$ | $\alpha 36$ | $\alpha 35$ | $\alpha 34$ | $\alpha 33$ | $\alpha 32$ | $\alpha 31$ |
| h4 | $\alpha 48$ | $\alpha 47$ | $\alpha 46$ | $\alpha 45$ | $\alpha 44$ | $\alpha 43$ | $\alpha 42$ | $\alpha 41$ |

TABLE 2

Example of Filter Coefficients of Wavelet Transforming Device (Band-synthesizing Filter Bank Circuit)

|    | tap 1 | tap 2 | tap 3 | tap 4 | tap 5 | tap 6 | tap 7 | tap 8 |
|----|-------|-------|-------|-------|-------|-------|-------|-------|
| h1 | $\alpha 11$ | $\alpha 12$ | $\alpha 13$ | $\alpha 14$ | $\alpha 15$ | $\alpha 16$ | $\alpha 17$ | $\alpha 18$ |
| h2 | $\alpha 21$ | $\alpha 22$ | $\alpha 23$ | $\alpha 24$ | $\alpha 25$ | $\alpha 26$ | $\alpha 27$ | $\alpha 28$ |
| h3 | $\alpha 31$ | $\alpha 32$ | $\alpha 33$ | $\alpha 34$ | $\alpha 35$ | $\alpha 36$ | $\alpha 37$ | $\alpha 38$ |
| h4 | $\alpha 41$ | $\alpha 42$ | $\alpha 43$ | $\alpha 44$ | $\alpha 45$ | $\alpha 46$ | $\alpha 47$ | $\alpha 48$ |

The filter coefficients indicated in (table 1) and (table 2) correspond to one example of a filter bank circuit which divides a range by 4. In this example, symbol "h" shows a general-purpose FIR filter. This FIR filter is constituted by 7 delay elements, 8 multipliers, and 7 adders. These 7 delay elements are cascade-connected to each other and delay input data. The 8 multipliers multiply both output data of this delay element and the above-described input data by coefficients. The 7 adders sequentially add output data of the multipliers to each other from the input side thereof to obtain an accumulated value. Symbol "tap" shows the above-explained multipliers, and symbol "α" indicates the coefficients of the above-explained 8 multipliers. Also, symbol "M" contained in symbol "αMN" shows a filter number, and symbol "N" represents a tap number.

Next, a filter bank circuit which is arranged by poly-phase filters will now be explained with reference to FIGS. 13A and 13B. In FIGS. 13A and 13B, reference numeral 301 shows poly-phase filters, reference numeral 302 indicates up-samplers for multiplying a sampling rate of a signal by N, reference numeral 303 represents 2-input adders, and also reference numeral 304 indicates delay elements (registers) for delaying input data by 1 sampling time. With employment of the above-explained circuit elements, the band-synthesizing filter bank circuit 300 functioning as the wavelet inverse transforming device 103 may be arranged.

Also, reference numeral 311 shows delay elements for delaying input data by 1 sampling time, reference numeral 312 represents down-samplers for reducing a sampling rate by 1/N, and reference numeral 313 indicates poly-phase filters. With employment of the above-explained circuit elements, the band-dividing filter bank circuit 310 functioning as the wavelet transforming device 115 may be arranged.

FIG. 14 is a block diagram for indicating the poly-phase filters 301 and 313 of FIGS. 13A and 13B. In FIG. 14, reference numeral 321 indicates filters, and reference numeral 322 shows 2-input adders. The respective filters which constitute both the poly-phase filter 301 and the poly-phase filter 313 are arranged in such a manner that an input signal with respect to the band-synthesizing filter bank circuit 300 is made coincident with an output signal of the band-dividing filter bank circuit 310 except for a signal delay. In order to make the calculation results obtained by (table 1) and (table 2) identical to each other, the respective poly-phase filters may be arranged as shown in (table 3) to (table 10).

TABLE 3

Filter Coefficients of Poly-phase Filter_1 of Band-synthesizing Filter Bank Circuit

|    | tap 1 | tap 2 |
|----|-------|-------|
| h1 | α15   | α11   |
| h2 | α25   | α21   |
| h3 | α35   | α31   |
| h4 | α45   | α41   |

TABLE 4

Filter Coefficients of Poly-phase Filter_2 of Band-synthesizing Filter Bank Circuit

|    | tap 1 | tap 2 |
|----|-------|-------|
| h1 | α16   | α12   |
| h2 | α26   | α22   |
| h3 | α36   | α32   |
| h4 | α46   | α42   |

TABLE 5

Filter Coefficients of Poly-phase Filter_3 of Band-synthesizing Filter Bank Circuit

|    | tap 1 | tap 2 |
|----|-------|-------|
| h1 | α17   | α13   |
| h2 | α27   | α23   |
| h3 | α37   | α33   |
| h4 | α47   | α43   |

TABLE 6

Filter Coefficients of Poly-phase Filter_4 of Band-synthesizing Filter Bank Circuit

|    | tap 1 | tap 2 |
|----|-------|-------|
| h1 | α18   | α14   |
| h2 | α28   | α24   |
| h3 | α38   | α34   |
| h4 | α48   | α44   |

TABLE 7

Filter Coefficients of Poly-phase Filter_1 of Band-dividing Filter Bank Circuit

|    | tap 1 | tap 2 |
|----|-------|-------|
| h1 | α11   | α15   |
| h2 | α12   | α16   |
| h3 | α13   | α17   |
| h4 | α14   | α18   |

TABLE 8

Filter Coefficients of Poly-phase Filter_2 of Band-dividing Filter Bank Circuit

|    | tap 1 | tap 2 |
|----|-------|-------|
| h1 | α21   | α25   |
| h2 | α22   | α26   |
| h3 | α23   | α27   |
| h4 | α24   | α28   |

TABLE 9

Filter Coefficients of Poly-phase Filter_3 of Band-dividing Filter Bank Circuit

|    | tap 1 | tap 2 |
|----|-------|-------|
| h1 | α31   | α35   |
| h2 | α32   | α36   |
| h3 | α33   | α37   |
| h4 | α34   | α38   |

TABLE 10

Filter Coefficients of
Poly-phase Filter_4 of Band-
dividing Filter Bank Circuit

|  | tap 1 | tap 2 |
|---|---|---|
| h1 | α41 | α45 |
| h2 | α42 | α46 |
| h3 | α43 | α47 |
| h4 | α44 | α48 |

A difference point between the filter bank circuits of FIGS. 12A and 12B and the filter bank circuits of FIGS. 13A and 13B is such a technical point that circuit positions for changing the sampling rates are different from each other. In the band-synthesizing filter bank circuits 200 and 300, the signal is up-sampled before the signal is inputted to the FIR filter in FIGS. 12A and 12B, whereas the signal is up-sampled after the filter calculation by the poly-phase filter in FIGS. 13A and 13B. On the other hand, in the band-dividing filter bank circuits 210 and 310, the signal is down-sampled after the filter calculation by the FIR filter in FIGS. 12A and 12B, whereas the signal is down-sampled before the filter calculation by the poly-phase filter. In other words, the filter calculation in FIGS. 13A and 13B may be executed at a slower speed than that of the filter calculation in FIGS. 12A and 12B.

In this embodiment mode 6, the timing control unit for the filter output of the band-synthesizing filter bank circuit is constituted by employing the up-samplers 302, the 2-input adders 303, and the delay elements 304. Alternatively, this timing control unit may be arranged by a multiplexer.

As a consequence, with employment of this circuit arrangement, the calculations during the lapped orthogonal transformation can be carried out at the low rates when the modulation and the demodulation are performed. In other words, since the operation clock frequency can be lowered, the power consumption of the circuit can be reduced. Also, when this fact is considered from such a view point that the calculation amount per unit time can be lowered, the calculators may be employed as substitution purposes, so that the circuit scale may be reduced.

Embodiment Mode 7

Figure 15A:
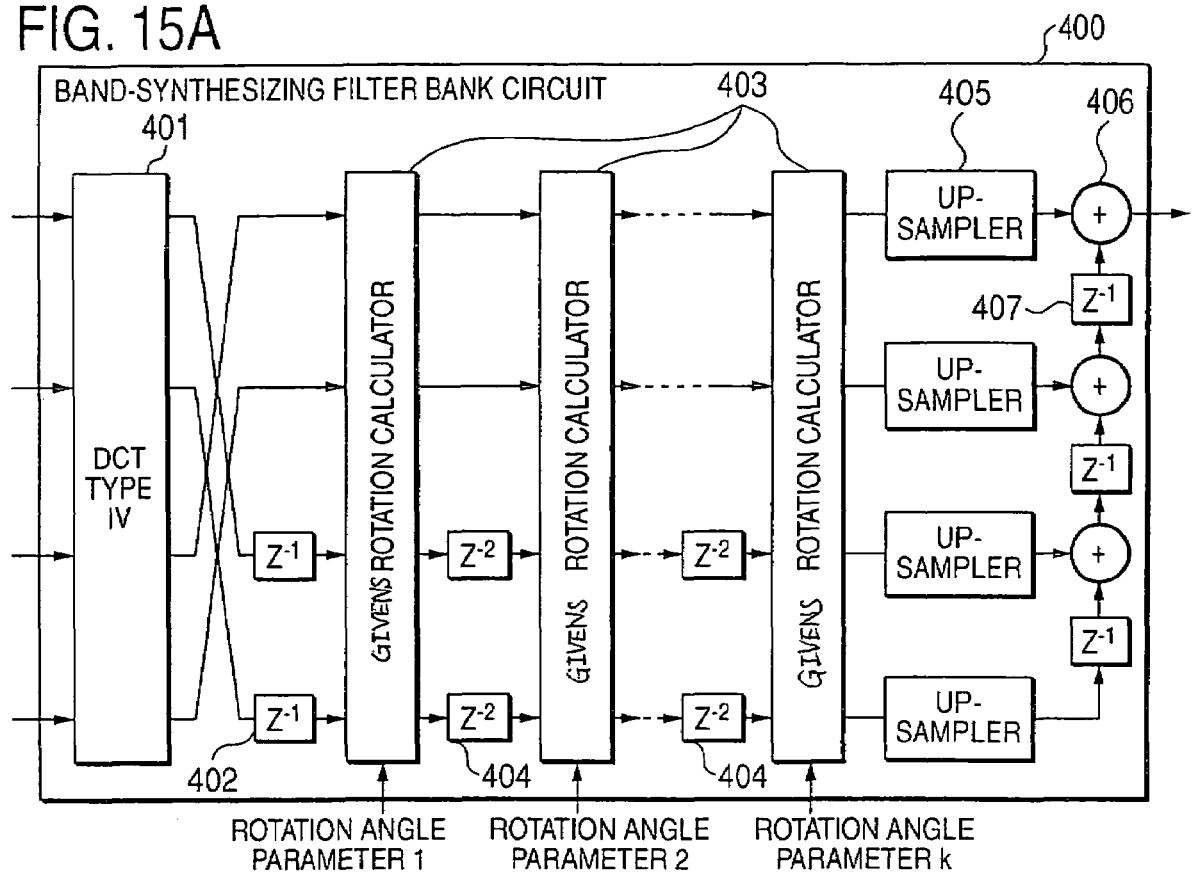
FIG. 15A is a block diagram for representing band-synthesizing filter bank circuit as wavelet inverse transformation of the power-line carrier communication apparatus shown in FIG. 3, FIG. 6, FIG. 7.
Figure 15B:
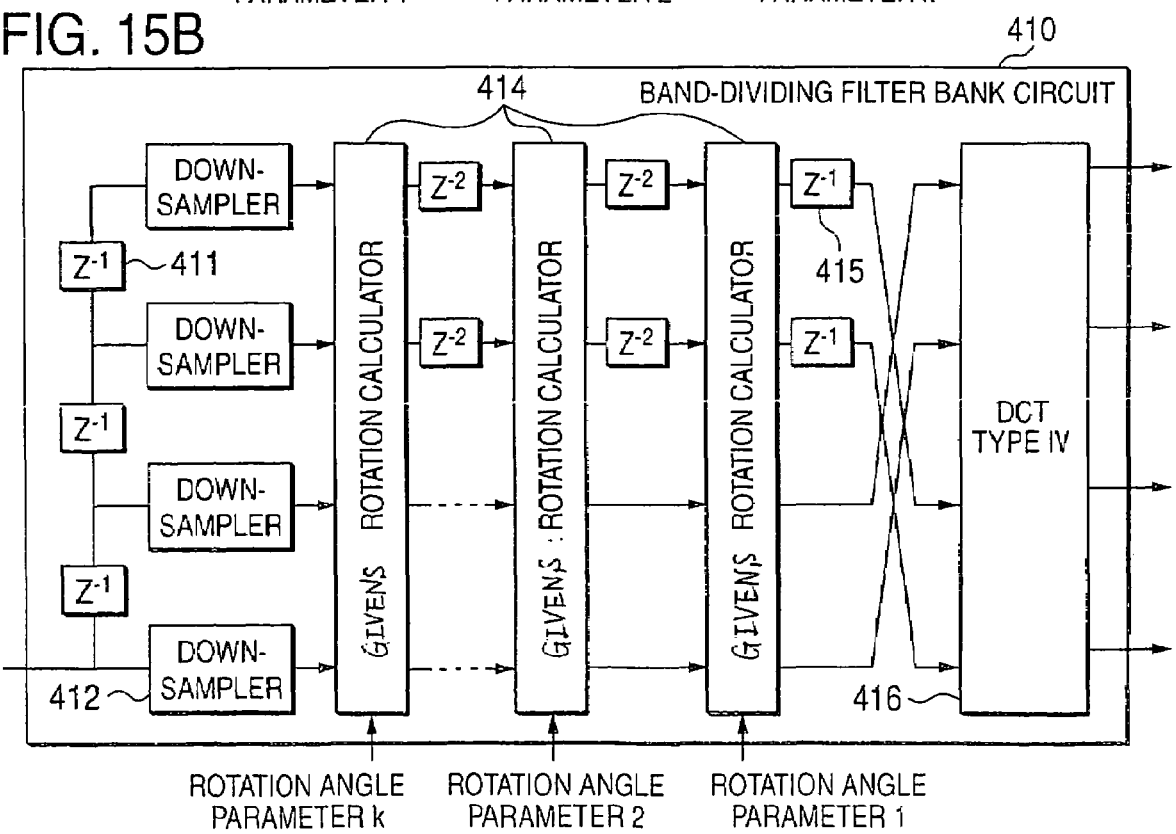
FIG. 15B is a block diagram for representing a band-dividing filter bank circuit as wavelet transformation of the power-line carrier communication apparatus shown in FIG. 3, FIG. 6, FIG. 7.

FIG. 15A is a block diagram for representing a band-synthesizing filter bank circuit 400 functioning as the wavelet inverse transforming device 103 of the power-line carrier communication apparatus 100 of FIG. 3, FIG. 6, and FIG. 7. FIG. 15B is a block diagram for indicating a band-dividing filter bank circuit 410 functioning as the wavelet transforming unit 115 of the power-line carrier communication apparatus 100 shown in FIG. 3, FIG. 6, and FIG. 7. As the filter bank circuit, an ELT filter bank circuit having a lattice structure is indicated. In other words, in this embodiment mode 7, a description is made of such a case that both the wavelet inverse transforming device 103 and the wavelet transforming device 115 are arranged by such a filter bank circuit having the lattice structure.

Figure 16:
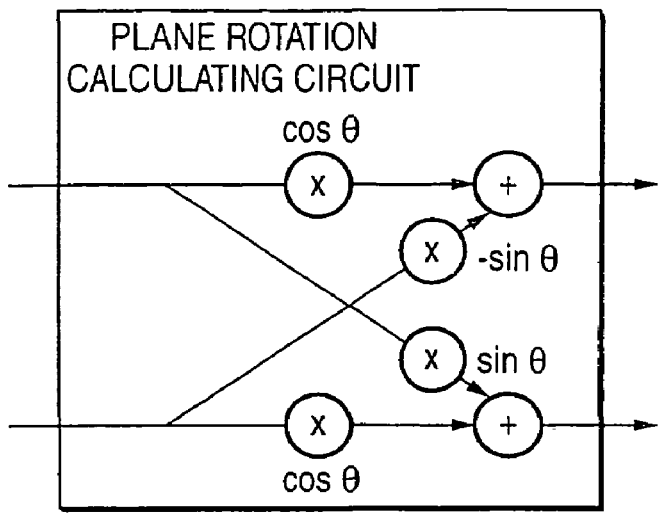
FIG. 16 is a functional block diagram for indicating a plane rotation calculating circuit.

In FIGS. 15A and 15B, reference numeral 401 shows a discrete cosine transforming (DCT) device of the type IV, reference numeral 402 indicates a delay element for delaying input data by 1 sampling time, reference numeral 403 represents a givens rotation calculator, reference numeral 404 denotes another delay element for delaying input data by 2 sampling times, and reference numeral 405 represents an up-sampler for multiplying a sampling rate of a signal by N. Also, reference numeral 406 shows a two-input adder, and reference numeral 407 represents a delay element for delaying input data by 1 sampling time. With employment of the above-described circuit elements, the band-synthesizing filter bank circuit 400 is arranged. On the other hand, reference numeral 411 shows a delay element for delaying input data by 1 sampling time, reference numeral 412 shows a down-sampler for reducing a sampling rate by 1/N, reference numeral 413 indicates a delay element for delaying input data by 2 sampling times, reference numeral 414 represents a givens rotation calculator, reference numeral 404 denotes another delay element for delaying input data by 1 sampling time, and reference numeral 416 indicates a discrete cosine transforming device of the type IV. With employment of the above-described circuit elements, the band-dividing filter bank circuit 410 is arranged. It should also be noted that both the givens rotation calculators 403 and 414 are constituted by combining plural sets of such a plane rotation calculating circuit shown in FIG. 16 with each other. FIG. 16 is a functional block diagram for representing the plane rotation calculating circuit.

Similar to the above case that the filter bank circuit is arranged by employing the poly-phase filters as explained in the embodiment mode 6, with employment of this circuit arrangement, the calculation rates during the lapped orthogonal transformation can be reduced when the modulation and the demodulation are performed. Furthermore, since the highspeed DCT and the like are combined with this circuit arrangement, the calculation amount can also be reduced, so that the power consumption of the circuit and the circuit scale can be lowered.

Embodiment Mode 8

In an embodiment mode 8 of the present invention, the following method will now be explained. That is, in both the wavelet inverse transforming device 103 of the power-line carrier communication apparatus 100 of FIG. 3, FIG. 6, FIG. 7, and also the wavelet transforming device 115 of the power-line carrier communication apparatus 100 of FIG. 3, FIG. 6, FIG. 7, while plural patterns of filter coefficients in correspondence to overlapped coefficients are prepared, the method for changing these filter coefficients will now be described.

First, plural patterns of filter coefficients having different filter lengths are prepared in correspondence with the overlapped coefficients with respect to both the wavelet inverse transforming device 103 of the transmission unit 101 and the wavelet transforming device 115 of the reception unit 111. Then, pattern numbers of filters are designated by the respective control units 122 of the transmission unit 101 and of the reception unit 111, so that filter coefficients within the filter bank circuit are changed in accordance with the pattern number. At this time, the pattern number of the filter on the transmission side must be made coincident with the pattern number of the filter on the reception side by using the control signal and the like. Also, as a reference for changing the filter coefficient, a power-line communication signal transmitted from the transmission unit 101, a variation of a transmission path, and a reception level are conceivable. For instance, in the case that an S/N ratio (namely, ratio of signal power to noise power) is employed, when the S/N ratio is large during the reception operation, since the noise appeared outside the use frequency band is low, as viewed from the respective sub-carriers, the demodulating operation is carried out by employing a filter having a short filter length, whereas when the S/N ratio is small, a filter coefficient having a long filter length is used in order not to be readily influenced by the noise appeared from other bands.

Since this control operation is carried out, the calculation amount in the case that the noise condition of the transmission path is better can be reduced, and thus, the power consumption during the reception operation can be decreased. Also, even in such a case that the noise condition is worse, the stable reception operation can be carried out.

Embodiment Mode 9

In an embodiment mode 9 of the present invention, the following method is explained. That is, in such a case that both the wavelet inverse transforming unit 103 and the wavelet transforming unit 115 of FIG. 3, FIG. 6, FIG. 7 are arranged by employing lattice structures, while plural patterns of plane rotation angle parameters are prepared in correspondence with overlapped coefficients, the method for changing these plane rotation angle parameters will now be described.

First of all, both the wavelet inverse transforming unit 103 of the transmission unit 101 and the wavelet transforming unit 115 of the reception unit 111 are constituted by way of the lattice structures as explained in the embodiment mode 7. Then, plural patterns of plane rotation angle parameters are prepared in correspondence with the overlapped coefficients with respect to both the wavelet inverse transforming device 103 of the transmission unit 101 and the wavelet transforming device 115 of the reception unit 111. Then, pattern numbers of plane rotation angle parameters are designated by the respective control units 122 of the transmission unit 101 and of the reception unit 111, so that plane rotation angle parameters within the filter bank circuit are changed in accordance with the pattern number. At this time, the pattern number of the plane rotation angle parameter on the transmission side must be made coincident with the pattern number of the plane rotation angle parameter on the reception side by using the control signal and the like. Also, as a reference for changing the plane rotation angle parameter, a power-line communication signal transmitted from the transmission unit 101, a variation of a transmission path, and a reception level are conceivable. For instance, in the case that an S/N ratio is employed, when the S/N ratio is large during the reception operation, since the noise appeared outside the use frequency band is low, as viewed from the respective sub-carriers, the demodulating operation is carried out by employing a plane rotation angle parameter having a small overlapped coefficient, whereas when the S/N ratio is small, a plane rotation angle parameter having a large overlapped coefficient is used in order not to be readily influenced by the noise appeared from other bands.

Since this control operation is carried out, the calculation amount in the case that the noise environment of the transmission path is better can be reduced, and thus, the power consumption during the reception operation can be decreased. Also, even in such a case that the noise condition is worse, the stable reception operation can be carried out. Furthermore, the storage capacity can be reduced, as compared with that of the embodiment mode 8 in which the plural patterns of the filter coefficients are prepared.

Embodiment Mode 10

Figure 17:
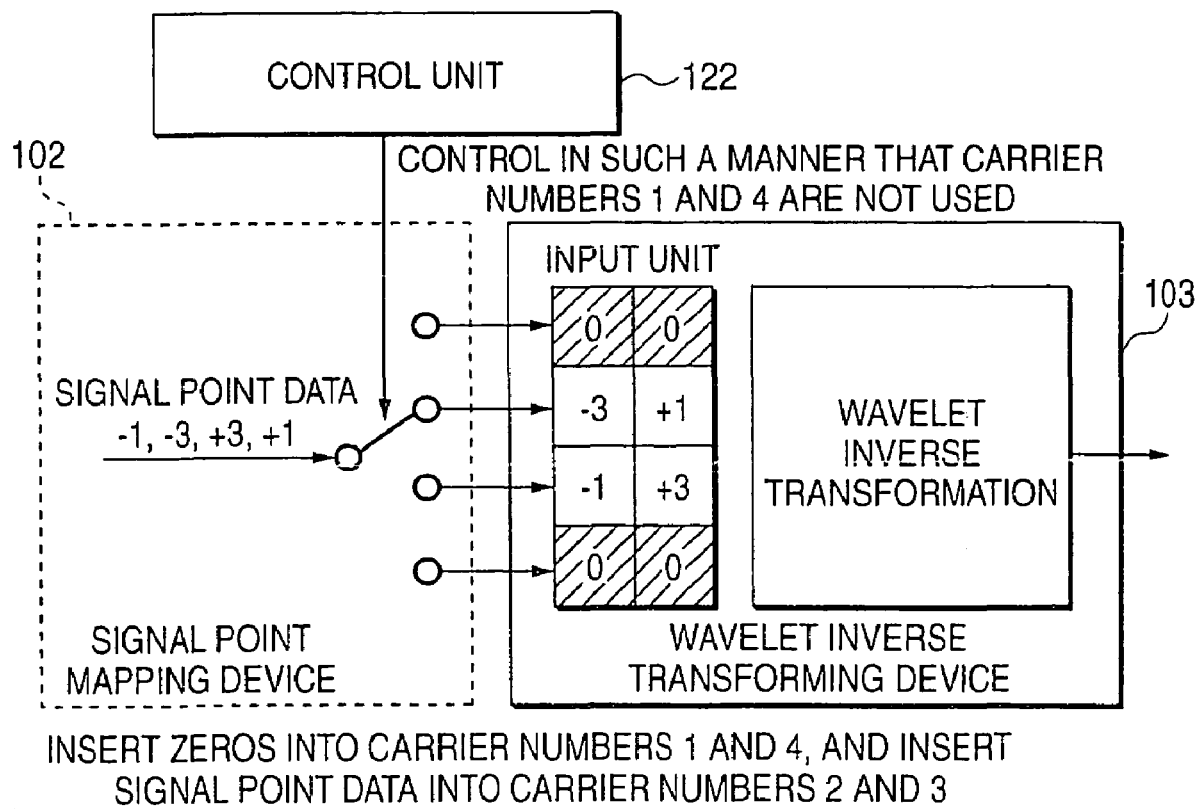
FIG. 17 is an explanatory diagram for explaining a control method of a power-line carrier communication apparatus according to an embodiment mode 10 of the present invention.

FIG. 17 is an explanatory diagram for explaining a control method of a power-line carrier communication apparatus according to an embodiment mode 10 of the present invention, namely a control operation by the control unit 122 of FIG. 3, FIG. 6, or FIG. 7. In this embodiment mode 10, a description is made of such a case that only a specific carrier is outputted. For the sake of simple explanations, a total number of sub-carriers is selected to be four.

In FIG. 17, reference numeral 102 shows a signal mapping device, reference numeral 103 indicates a wavelet inverse transforming device, and reference numeral 122 represents a control unit.

First, in the signal point mapping device 102, it is so assumed that such data are outputted in which signal points have been mapped in this order of "+1", "+3", "−3", "−1", "+1", "+3", "−3", and "−1." At this time, since the control unit 122 designates a sub-carrier number which is not used with respect to the signal point mapping device 102, data is not inputted with respect to a sub-carrier portion of the designated number. In other others, a zero is inserted. For instance, in the case that both a first sub-carrier and a fourth sub-carrier are not outputted, zeros are inserted into input portions of a filter which outputs both the first sub-carrier and the fourth sub-carrier, and also mapped signal point data are entered into input portions of both a second sub-carrier and a third sub-carrier. Then, the wavelet inverse transforming device 103 executes the wavelet inverse transforming operation based upon the respective input data.

Since the control operation is carried out in this manner, the sub-carriers to be outputted can be easily selected, and the signals can be outputted only at the specific frequency. In other words, even in such a case that usable frequency bands are different from each other every individual countries due to legal restrictions of these individual countries, this control method of the power-line carrier communication apparatus can be readily adapted thereto.

Figure 18:
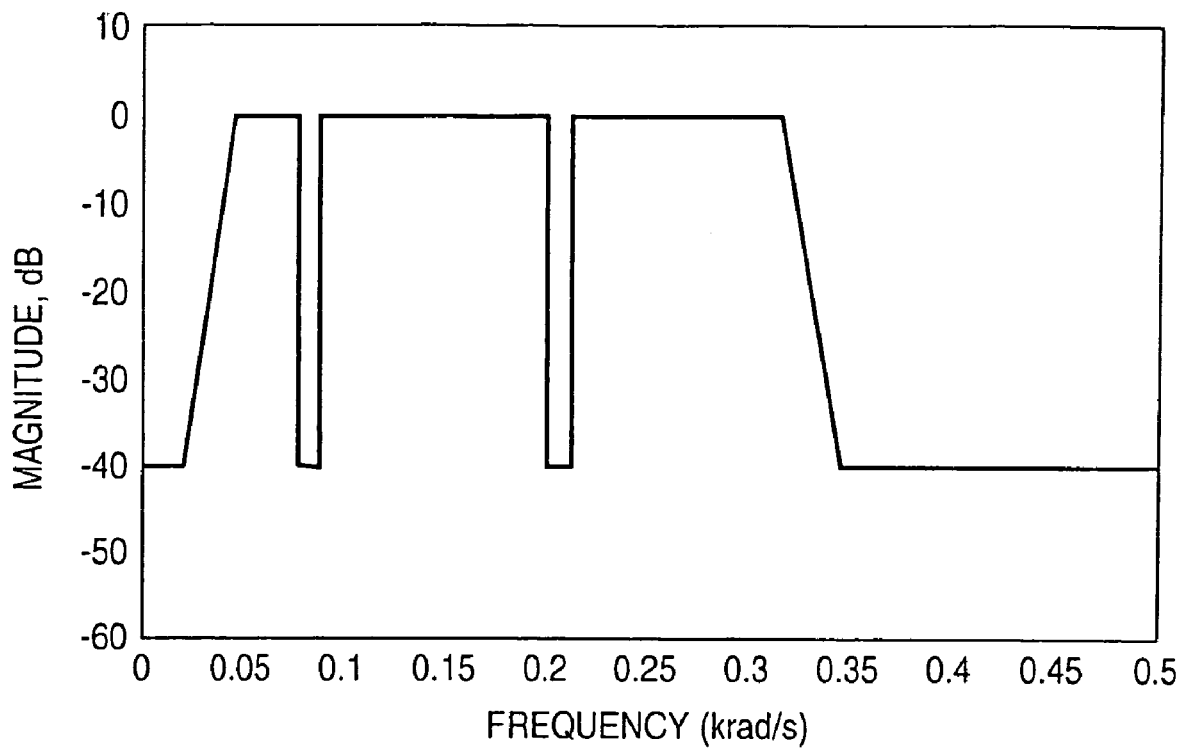
FIG. 18 is a graph for graphically indicating an example of a frequency spectrum permitted to power-line carrier communications.
Figure 19:
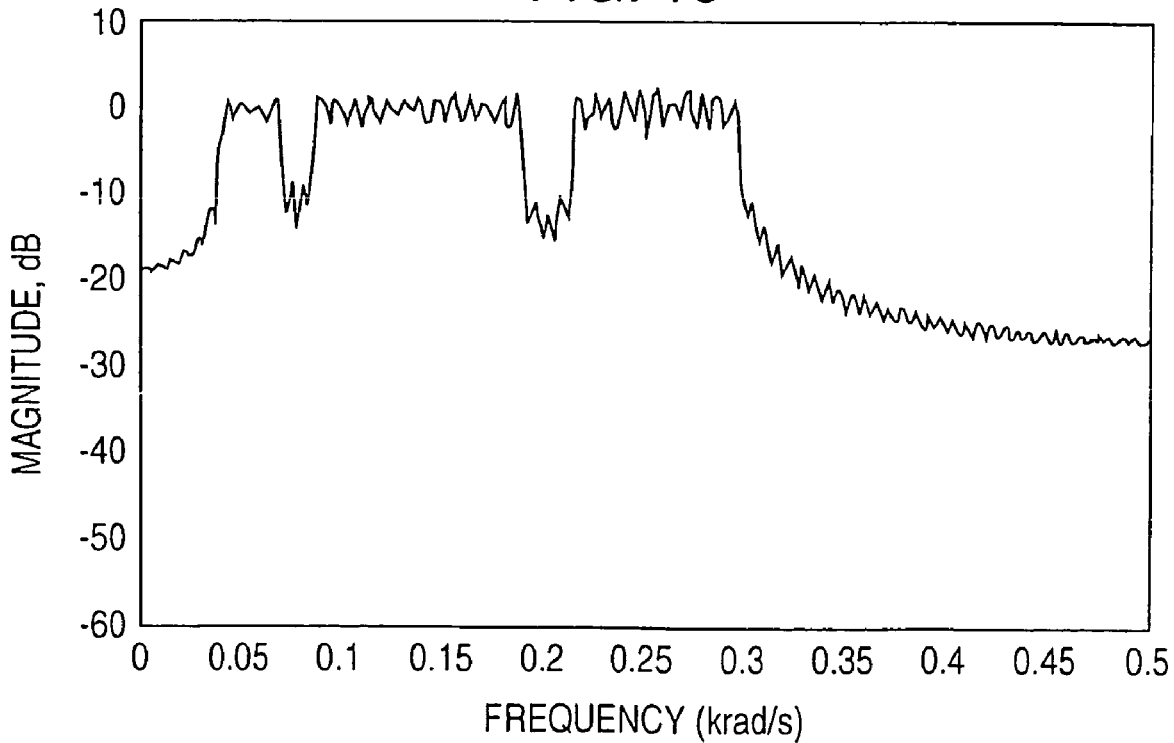
FIG. 19 is a graph for graphically showing a transmission frequency spectrum in the case that the OFDM transmission is employed.
Figure 20:
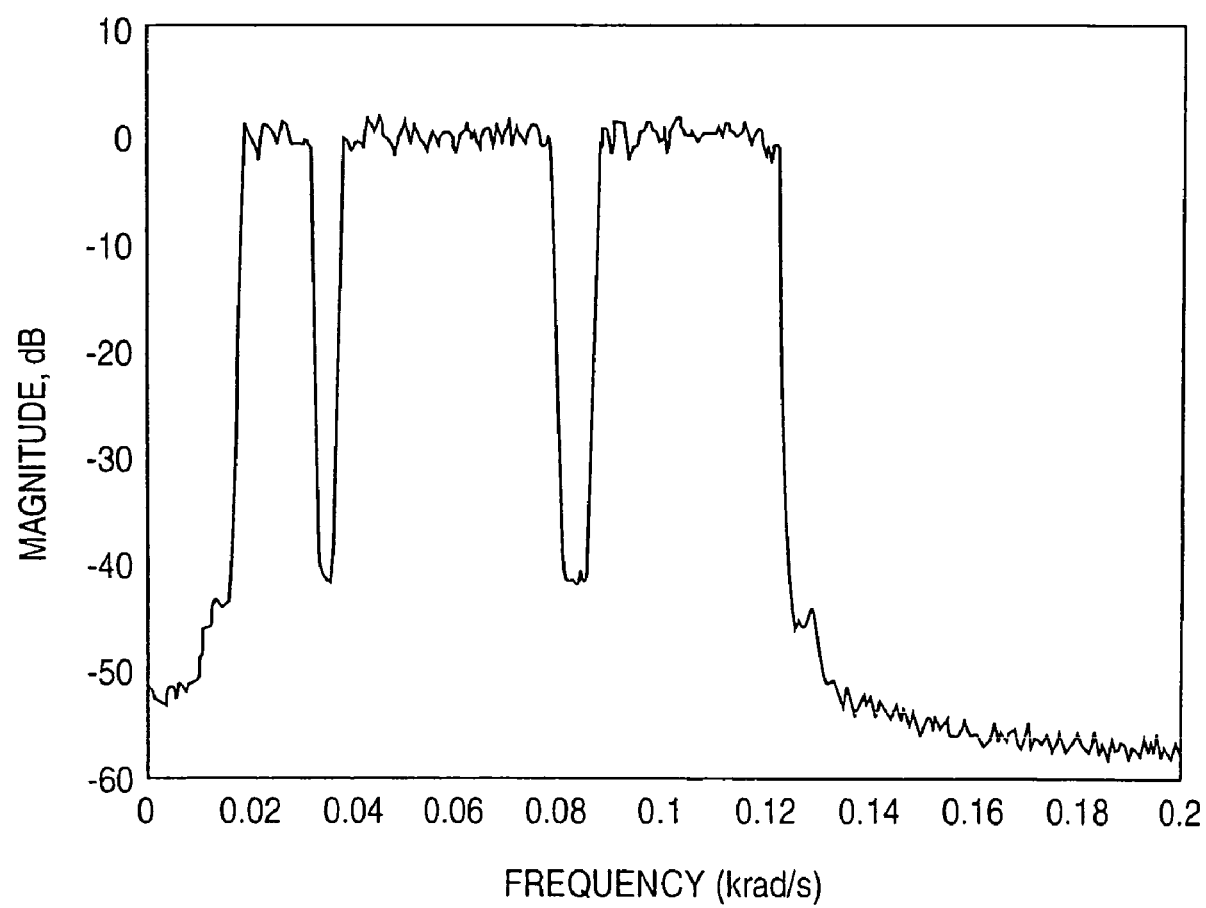
FIG. 20 is a graph for graphically indicating a transmission frequency spectrum of the power-line carrier communication apparatus.

Furthermore, validity characteristics of the power-line carrier communication apparatus according to this embodiment mode 10 will now be understandably explained with reference to FIG. 18, FIG. 19, and FIG. 20. That is, FIG. 18 is a graph for representing an example of a frequency spectrum which is allowed to a power-line carrier communication. FIG. 19 is a graph for indicating a transmission frequency spectrum in the case that the OFDM transmission system is employed. FIG. 20 is a graph for indicating a transmission frequency spectrum of the power-line carrier communication apparatus.

For instance, it is so assumed that a frequency allocation controlled by legal restrictions of a certain country is given as illustrated in FIG. 18. The transmission signal produced by the conventional power-line carrier communication apparatus using the OFDM transmission system is defined as shown in FIG. 19. As a result, a band-block filter is additionally required in order to meet with the legal restrictions (frequency allocation) indicated in FIG. 18. In other words, filter coefficients of band-block filters must be prepared which are different from each other every countries. On the other hand, in accordance with the power-line carrier communication apparatus of this embodiment mode 10, such a transmission signal spectrum as shown in FIG. 20 can be obtained only based upon the above-explained control operation. As a result, such a band-block filter is no longer required. As a consequence, the power-line carrier communication apparatus according to this embodiment mode 10 can be flexibly adapted to various legal restrictions different from each other which are effective in various countries.

Embodiment Mode 11

Figure 21:
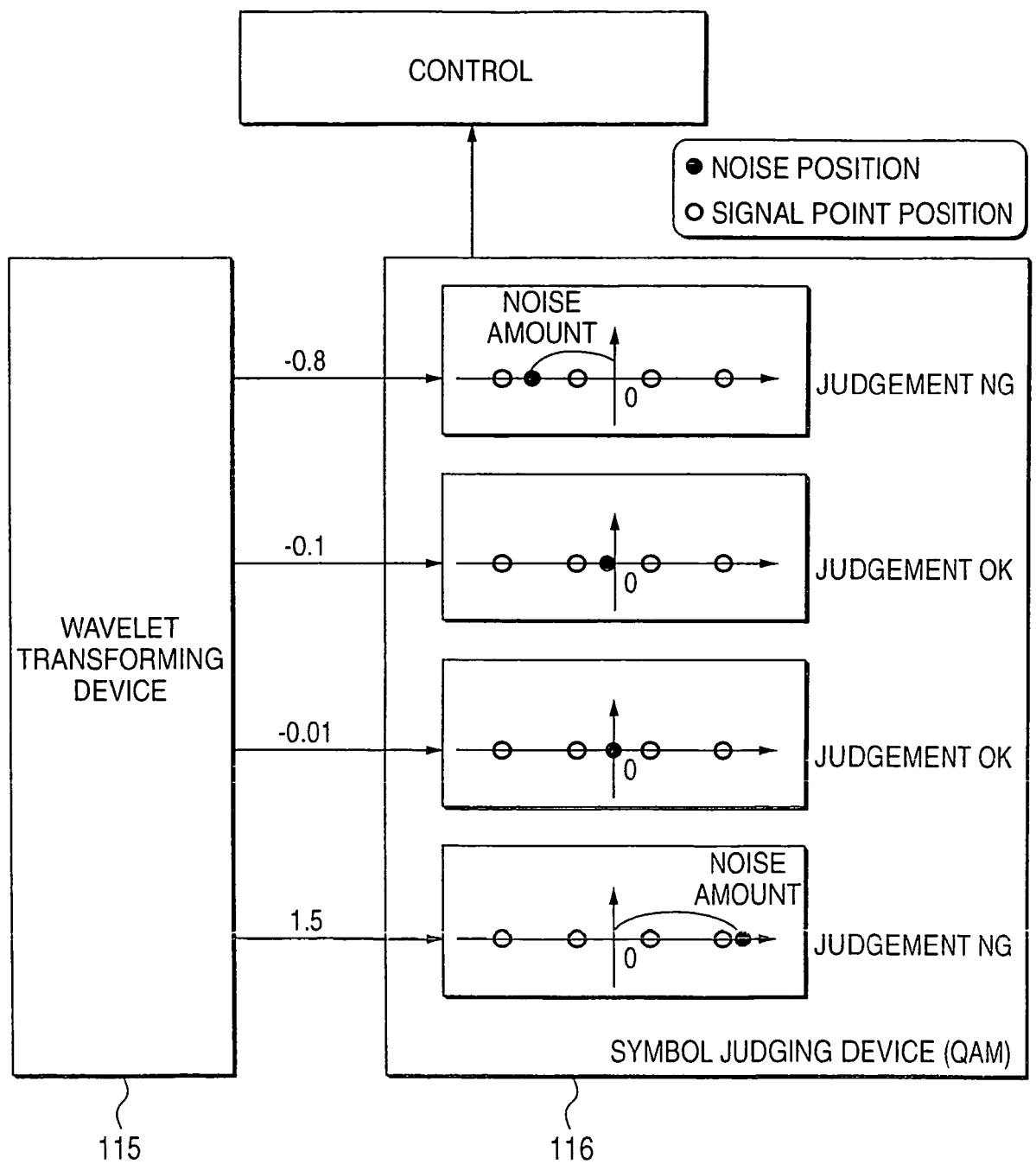
FIG. 21 is an explanatory diagram for explaining a control method of the power-line carrier communication apparatus shown in FIG. 3, FIG. 6, FIG. 7.

FIG. 21 is an explanatory diagram for explaining a control method of a power-line carrier communication apparatus according to an embodiment mode 11 of the present invention, namely a control operation by the control unit 122 of FIG. 3, FIG. 6, or FIG. 7. In this embodiment mode 11, a description is made of a method for detecting a noise level on a power line.

In FIG. 21, reference numeral 116 shows a symbol judging device, reference numeral 115 indicates a wavelet transforming device, and reference numeral 122 represents a control unit.

Next, a description will now be made of a noise level detecting operation on a power line.

First, the wavelet transforming device 115 demodulates input data to obtain signal point data every sub-carrier in order to sense a frequency distribution of noise appeared on the power line 110. Next, the symbol judging device 116 measures as to whether or not a noise component existing near which signal point is large based upon the signal point data every sub-carrier. At this time, in the case that noise is not completely present, all of the signal point data in each of the sub-carriers become 0. As a consequence, the symbol judging device 116 predicts a noise amount by checking how degree the value of this data is shifted. Then, the symbol judging device 116 judges such a sub-carrier whose noise level is larger than a predetermined value, and notifies the sub-carrier number thereof to the control unit 122 in order that this notified sub-carrier cannot be used by the control unit 122.

It should be noted that in this embodiment mode 11, the noise level detecting method executed under such a condition that the signal is not superimposed on the power line 110 has been described. Alternatively, even when the known signal is used between the transmission side and the reception side, the noise level may be detected based upon a similar noise level detecting method. In other words, the noise detection may be carried out even under communication condition.

Since such a control operation is carried out, the noise condition on the power line 110 can be grasped, and the usable sub-carrier can be selected. In the control unit 122, the sub-carrier is selected in such a manner that the frequency position where the large noise component is present may be previously avoided, so that the communication having higher reliability can be realized.

Embodiment Mode 12

As a control method executed in a power-line carrier communication apparatus according to an embodiment mode 12 of the present invention, a description will now be made of a control method for changing a transfer speed into a designated speed with reference to FIG. 3 and FIG. 4.

First, the control unit 122 calculates both a total number of signal points and a total number of sub-carriers, which are required to realize an externally designated transfer speed, and then, selects a sub-carrier based upon these calculation result and the judgement result of the usable sub-carrier according to the embodiment mode 11. Next, the control unit 122 designates both a sub-carrier number to be used and a total number of signal points with respect to the signal point mapping device 102. The signal point mapping device 102 maps signal points in accordance with this set value in correspondence with data arranging process operation to the sub-carriers.

For instance, it is assumed that the necessary transfer speed is externally designated, and the results calculated so as to be fitted to the transfer speed which is designated by the control unit 122 are defined by that the quantity of sub-carriers is 2 and the quantity of signal points is 4. Also, it is so assumed that in the judgement made according to the embodiment mode 11, the usable sub-carriers are equal to 3 other than the second sub-carrier. At this time, the control unit 122 may select, for instance, both the first sub-carrier and the third sub-carrier. Also, another sub-carrier which is not used (namely, fourth carrier in this example) may be utilized in another communication.

Since such a control operation is carried out, the transfer speed can be readily changed into the designated speed. Also, since such a sub-carrier other than the sub-carriers for realizing the designated transfer speed can be used in another communication, the use efficiency of the band can be improved.

Embodiment Mode 13

Figure 22:
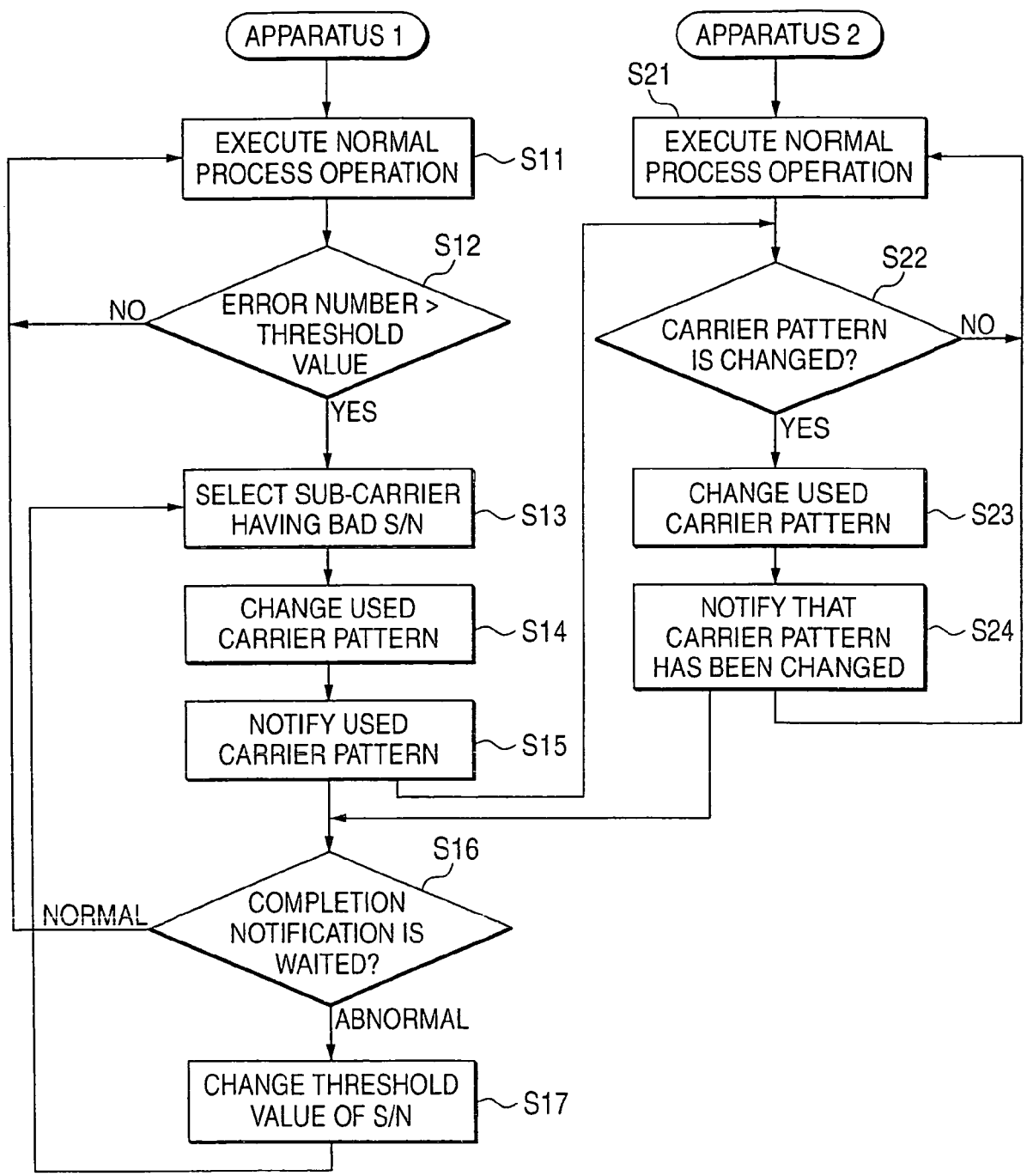
FIG. 22 is a flow chart for explaining operations of a control unit of a power-line carrier communication apparatus according to an embodiment mode 13 of the present invention.

FIG. 22 is a flow chart for describing operations of a control unit 122 employed in a power-line carrier communication apparatus according to an embodiment mode 13 of the present invention. In this embodiment mode 13, the following control method will now be explained. That is, in the case that an error happens to occur in reception data during the normal reception operation, while a position of a frequency to be transmitted is shifted so as to avoid an adverse influence of the noise, communication sequences between a power line carrier communication apparatus 1 (for instance, own apparatus) and another power-line carrier communication apparatus 2 (for example, communication-counter-party's apparatus) are made coincident with each other. It should be noted that both the power-line carrier communication apparatus 1 and the power-line carrier communication apparatus 2 own the arrangement of FIG. 3.

In FIG. 22, under initial conditions (steps S11 and S21), a communication between the power-carrier line communication apparatus 1 and the power-carrier line communication apparatus 2 is carried out by using a carrier pattern 1. Then, in such a case that a total number of errors is larger than, or equal to a certain threshold value (step S12) in the power-line carrier communication apparatus 1, a sub-carrier whose error number exceeds this certain threshold value is detected (step S13), and either a number or a position of the sub-carrier to be changed is provisionally set (step S14). It should be noted that a pattern of the carrier changed at this time is set as a carrier pattern 2. Thereafter, a content of the set carrier pattern 2 is transmitted to the power-line carrier communication apparatus 2 by way of the carrier pattern 1 which is presently used in the communication (step S15). Thereafter, the power-line carrier communication apparatus 1 changes the own carrier pattern into the carrier pattern 2. It should also be noted that such a carrier pattern is constituted by a single sub-carrier, or plural sets of sub-carriers.

In the power-line carrier communication apparatus 2 which has received the content of the carrier pattern 2 by way of the carrier pattern 1, a judgement is made as to whether or not the carrier pattern is changed (step S22). If the carrier pattern is not changed, then the process operation is returned to the normal process operation (step S21). To the contrary, when the carrier pattern is changed, the frequency position which is processed by the lapped orthogonal transformation by the reception unit 111 is changed into the carrier pattern 2 (step S23). Furthermore, such a fact that the carrier pattern has been changed is modulated by the carrier pattern 2, which is returned as a change completion notification to the power-line carrier communication apparatus 1 (step S24).

In the power-line carrier communication apparatus 1, a judgement is made as to whether or not the content of this change completion notification is correctly sent (step S16). Then, in the case that the change completion notification is correctly received, the process operation is advanced to the normal process operation (step S11). To the contrary, in the case that the change completion notification is not correctly received, a threshold value of an S/N ratio is changed (step S17), and then, the process operation is again advanced to the selection process operation of the carrier pattern (step S13). Then, the power-line carrier communication apparatus 1 again executes a sequential operation of changing the carrier pattern, and repeatedly executes this sequential operation until an error number is decreased.

In this case, the above-described sequential operation may be utilized not only when the normal communication is performed, but also when the setting operation is carried out during the initial install operation.

Figure 23A:
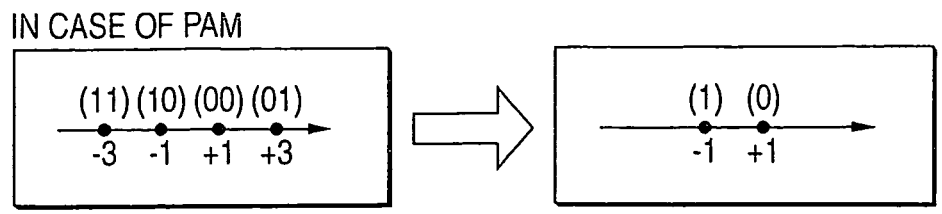
FIG. 23A is an explanatory diagram for explaining a change in signal point numbers of a signal point mapping device of the power-line carrier communication apparatus.
Figure 23B:
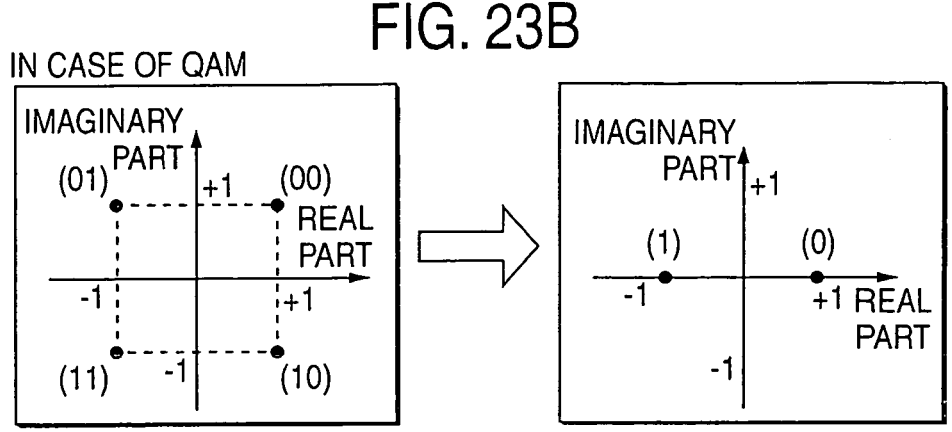
FIG. 23B is an explanatory diagram for explaining a change in signal point numbers of a signal point mapping device of the power-line carrier communication apparatus.

It should also be noted that in this embodiment mode 13, since the sub-carrier to be used is changed, a total number of reception errors is decreased. Alternatively, since the signal point arrangement of the signal point mapping device 102 is changed, a total number of errors may be reduced. For instance, as indicated in FIGS. 23A and 23B, a signal point arrangement of 4 values may be changed into two arranging methods, and matching characteristics during communications may be realized by a similar means to the sequential operation of this embodiment mode 13. In this case, FIGS. 23A and 23B are explanatory diagrams for explaining a change in signal point numbers of the signal point mapping device 102 of the power-line carrier communication apparatus.

As previously explained, in accordance with this embodiment mode 13, since the sub-carriers whose error rates are small are used in the communication with a top priority, as compared with the sub-carriers whose error rates are large, a total number of reception errors can be reduced.

Embodiment Mode 14

Figure 24:
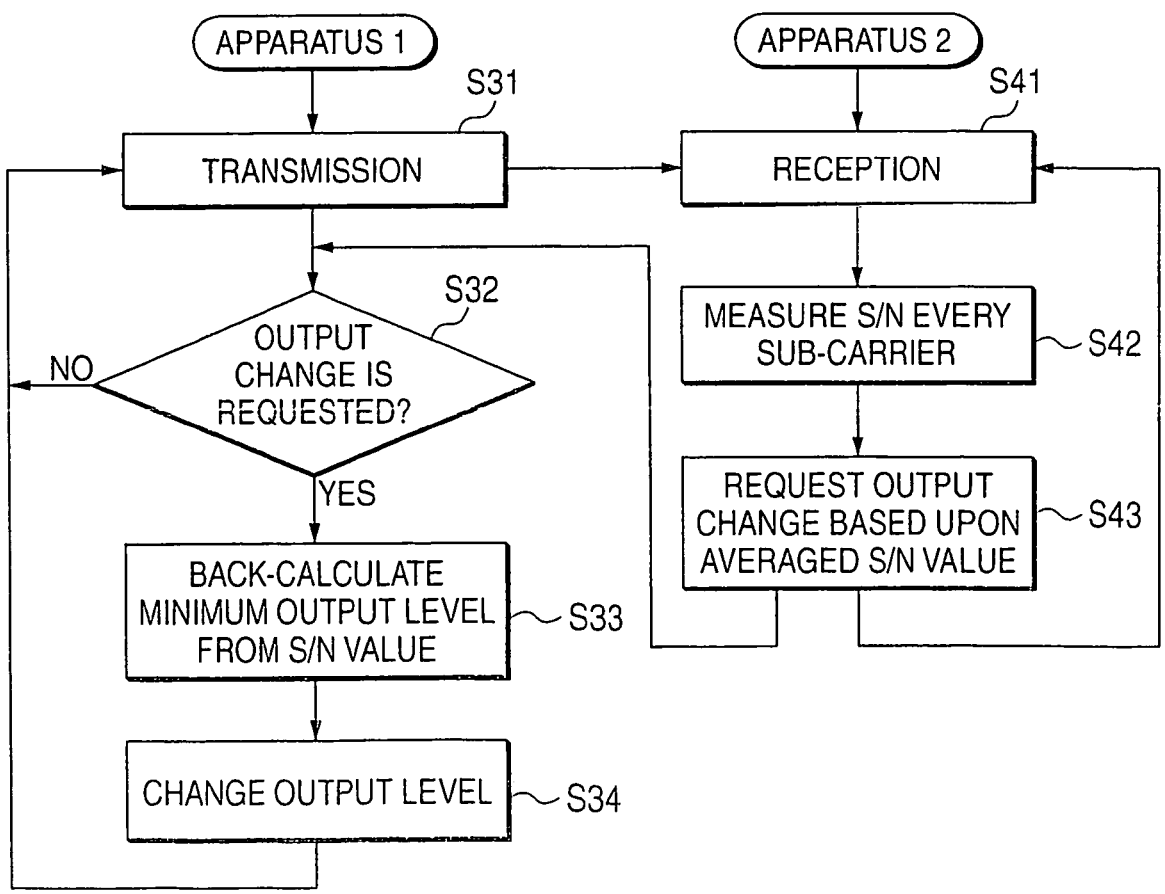
FIG. 24 is a flow chart for explaining operations of a power-line carrier communication apparatus according to an embodiment mode 14 of the present invention.
Figure 25:
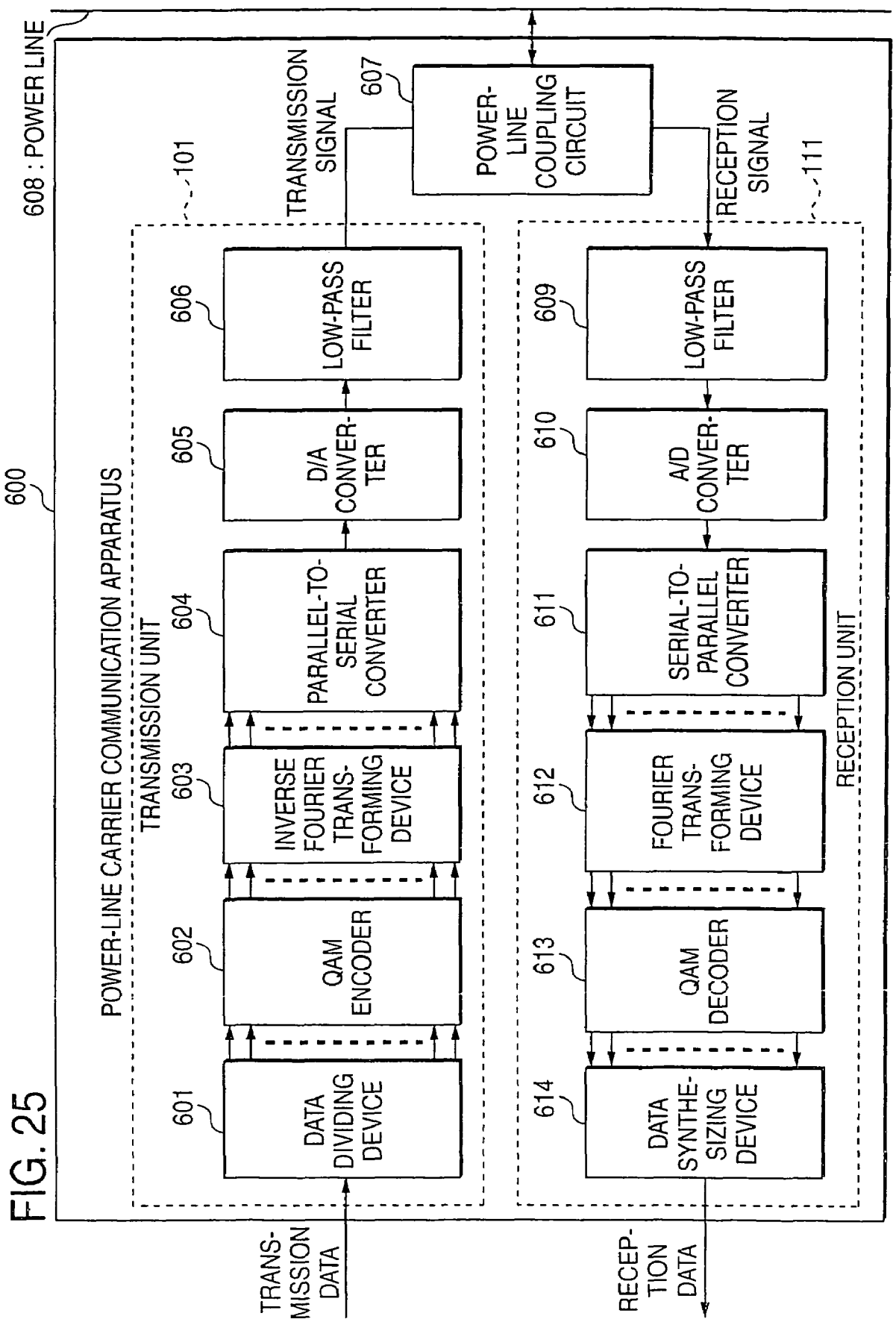
FIG. 25 is a block diagram for indicating the power-line carrier communication apparatus described in Japanese Laid-open Patent Application No. 2000-165304.
Figure 26:
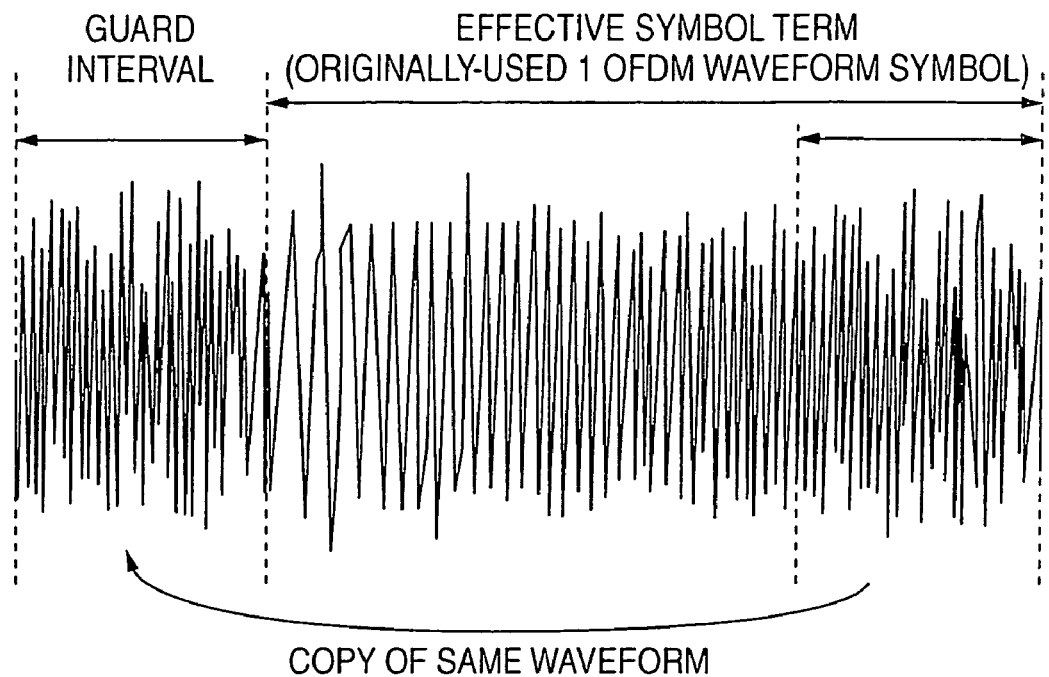
FIG. 26 is a graph for graphically indicating the system of the guard interval.
Figure 27:
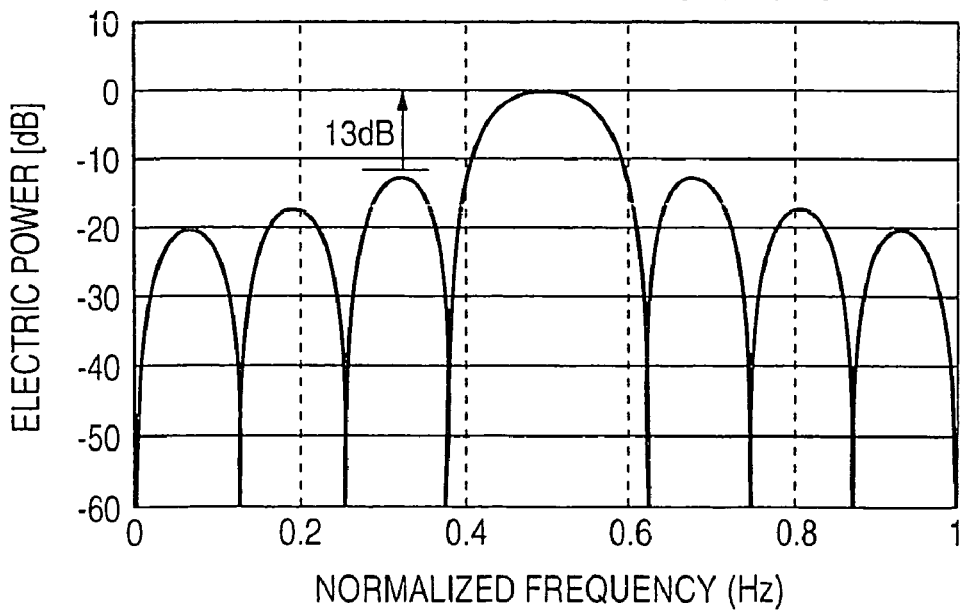
FIG. 27 is a graph for graphically showing the filter bank characteristic of the OFDM transmission system.

FIG. 24 is a flow chart for describing operations of a power-line carrier communication apparatus according to an embodiment mode 14 of the present invention. In this embodiment mode 14, such an operation is performed that a transmission output level of a power-line carrier communication apparatus 1 (for instance, own apparatus) is changed based upon a reception result of another power-line carrier communication apparatus 2 (for example, communication-counter-party's apparatus). It should be understood that the power-line carrier communication apparatus 1 and the power-line carrier communication apparatus 2 own the arrangement of FIG. 3.

In FIG. 24, under initial condition (step S31), the power-line carrier communication apparatus 1 transmits a signal at a certain output level. In the power-line carrier communication apparatus 2, the signal of the power-line carrier communication apparatus 1 is received (step S41), and an S/N ratio is measured every sub-carrier (step S42). Next, the power-line carrier communication apparatus 2 issues an output level changing request to the power-line carrier communication apparatus 1 based upon an averaged S/N value (step S43).

The power-line carrier communication apparatus 1 which has received both this S/N ratio and the output level changing request judges as to whether or not the change request is present (step S32), back-calculates this S/N value so as to determine an output level (step S34), and again transmits the signal to the power-line carrier communication apparatus 2 at this determined output level.

Since this operation is carried out, in such a case that the noise level on the power line 110 is low and no communication error occurs, electric power required in the transmission can be reduced by lowering the output level.

As previously explained in accordance with this embodiment mode 14, since the output level can be lowered in such a case that the noise level on the power line is low and the communication error is not produced, the electric power required in the transmission ca be reduced.

Embodiment Mode 15

Figure 28:
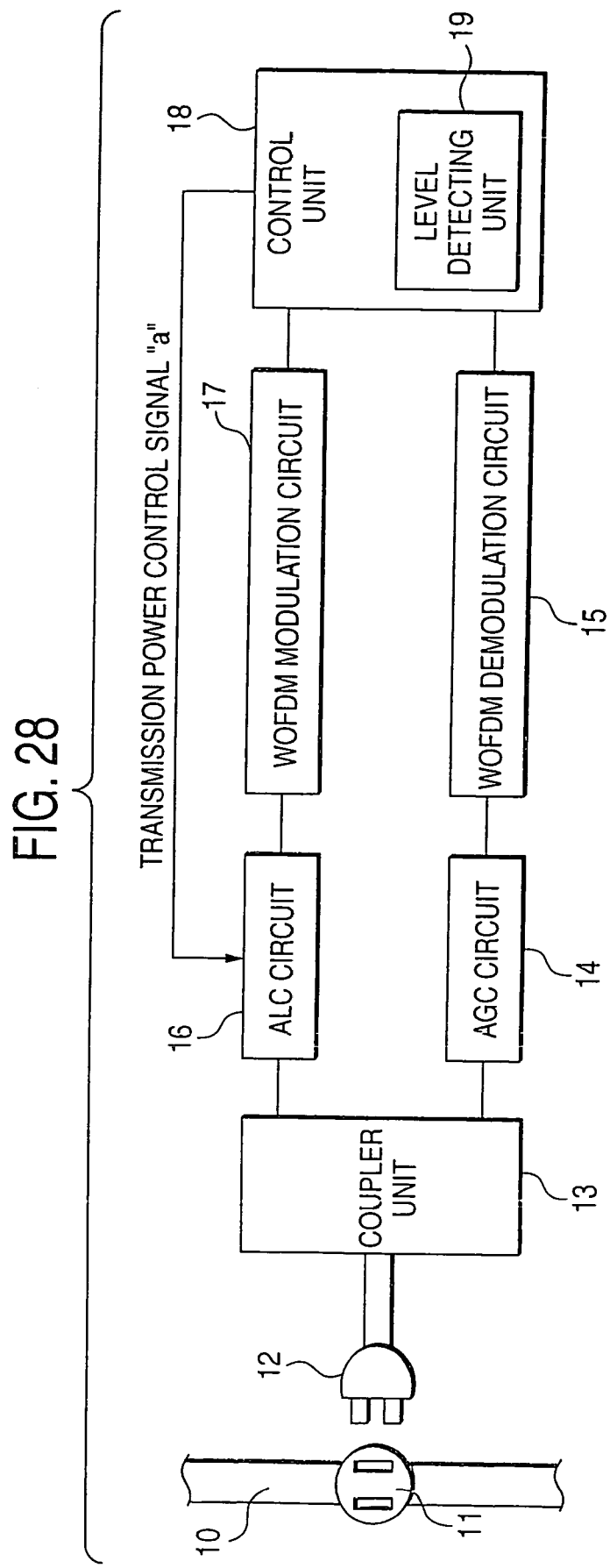
FIG. 28 is a block diagram for indicating a power-line communication apparatus according to an embodiment mode 1 of the present invention.

FIG. 28 is a block diagram for representing a power-line communication apparatus according to an embodiment mode 15 of the present invention.

In FIG. 28, reference numeral 10 shows a power line, reference numeral 11 represents a plug socket used to be connected to the power line 10, and reference numeral 12 indicates a plug used to be coupled to the plug socket 11, and also reference numeral 13 denotes a coupler unit which is coupled via the plug 12 and the plug socket 11 to the power line 10 so as to perform a communication operation. Also, reference numeral 14 indicates an AGC (Automatic Gain Control) circuit for amplifying a WOFDM (Waveletbase-Orthogonal Frequency Division Multiplex) modulation signal at a constant level. This WOFDM implies such an orthogonal frequency division multiplexing system by employing the wavelet function. Reference numeral 15 shows a WOFDM modulation circuit for modulating the WOFDM modulation signal which has been amplified by the AGC circuit 14, reference numeral 16 shows an ALC (Automatic Level Control) circuit which amplifies a WOFDM modulation signal derived from a WOFDM modulation circuit 17 (will be discussed later) up to a necessary level. Reference numeral 17 denotes a WOFDM modulation circuit for WOFDM-modulating data to output a WOFDM modulation signal, and also reference numeral 18 shows a control unit which controls the entire circuits including the ALC circuit 16, and also contains a reception signal level detecting circuit 19 for detecting a reception signal level.

Operations of the power-line communication apparatus with employment of the above-described arrangement will now be described.

Various sorts of household appliances are connected to the power line 10. As a result, both a noise characteristic and an impedance characteristic of the power line 10 are unstable. Under such an environment, a power line communication signal (WOFDM modulation signal) is supplied from the plug 12 via the coupler unit 13 to the AGC circuit 14 so as to be amplified to a sufficiently high level at which this WOFDM modulation signal may be demodulated. Then, the amplified WOFDM modulation signal is wavelet-transformed by the WOFDM demodulating circuit 15 to be demodulated. The reception signal level detecting circuit 19 detects a reception signal level from the demodulated result, and a necessary transmission power control signal "a" is supplied from the control unit 18 to the ALC circuit 16.

Figure 29:
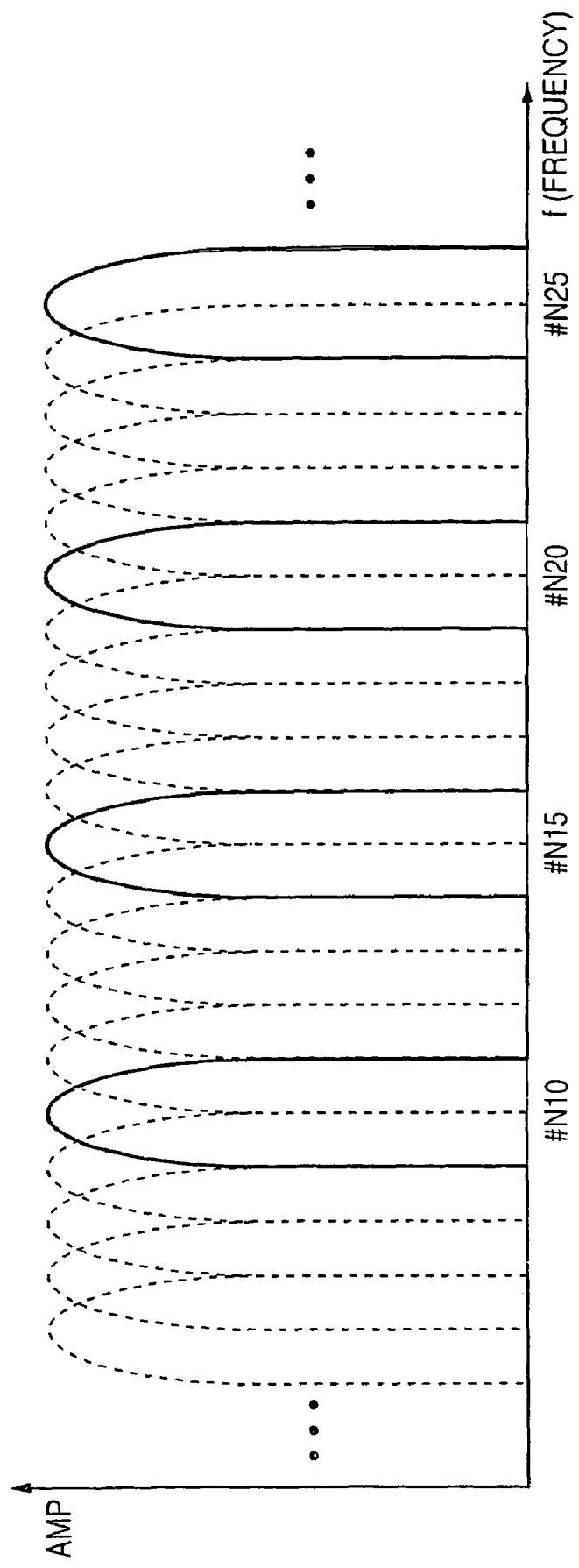
FIG. 29 is a graph for graphically indicating a spectrum of the WOFDM system in which a plurality of sub-carriers are arranged.

In this case, a validity characteristic of the transmission power control by the WOFDM system is represented with reference to FIG. 29. FIG. 29 is a graph for graphically indicating a spectrum of the WOFDM system in which a plurality of sub-carriers are arranged.

In FIG. 29, an abscissa shows a frequency and an ordinate indicates an amplitude. While the transmission condition of the power line 10 is unstable, an attenuation amount in a high-frequency range normally becomes large. As a consequence, since transmission power is increased in the high frequency range, effective power control operation is available. Apparently, an arbitrary sub-carrier may be controlled under conditions of the power line 10, not only within the high frequency range.

As previously explained, in accordance with this embodiment mode 14, since the power line communication apparatus is provided with the AGC circuit 14 for amplifying the inputted WOFDM modulation signal to the constant level; the WOFDM demodulation circuit 15 for demodulating the amplified WOFDM signal; the WOFDM modulation circuit 17 for WOFDM-modulating the data to output the WOFDM modulation signal; the ALC circuit 16 for amplifying the WOFDM modulation signal derived from the WOFDM modulation circuit 17 up to the necessary level; and the control unit 18 for controlling the entire circuits involving the ALC circuit 16 and having the reception signal level detecting circuit 19 for detecting the reception signal level, the transmission output level of the WOFDM modulation signal in the ALC circuit 16 can be controlled in response to the reception signal level. As a result, even when the transmission characteristic is changed, this power line communication apparatus can be sufficiently operated even under this changed transmission characteristic, and can firmly transmit the data in high speeds.

Also, if the control unit 18 controls the ALC circuit 16 in such a manner that the transmission output level of the WOFDM modulation signal derived from the WOFDM modulation circuit 17 is increased in the case that a reception signal level detected by the reception signal level detecting circuit 19 is a shortage of the reception signal level, whereas if the control unit 18 controls the ALC circuit 16 in such a manner that the transmission output level of the WOFDM modulation signal derived from the WOFDM modulation circuit 17 is decreased in the case that a reception signal level detected by the reception signal level detecting circuit 19 is an excessively high, then the transmission output level of the WOFDM modulation signal may be controlled in response to the reception signal level. As a consequence, this power line communication apparatus can be sufficiently operated even under this changed transmission characteristic, and can firmly transmit the data in high speeds.

Furthermore, if the control unit 18 controls the ALC circuit 16 in such a manner that the transmission output level of the WOFDM modulation signal derived from the WOFDM modulation circuit 17 is set to a minimum transmission output level in the beginning, whereas if the control unit 18 controls the ALC circuit 16 in such a manner that when no response is sent from the communication counter party's apparatus, the transmission output level of the WOFDM modulation signal derived from the WOFDM modulation circuit 17 is sequentially increased in a stepwise manner, then the data communication can be carried out by the necessary minimum transmission power with respect to variations in the transmission characteristics. As a result, both the power consumption and the spurious radiation can be reduced.

Furthermore, if the control unit 18 controls the ALC circuit 16 in such a manner that the transmission output level of the WOFDM modulation signal derived from the WOFDM modulation circuit 17 is set to a maximum transmission output level in the beginning, whereas if the control unit 18 controls the ALC circuit 16 in such a manner that the transmission output level is decreased in response to a detected reception signal level, then the firm communication can be established from the beginning stage. As a consequence, the rapid communication can be firmly established.

Furthermore, if the control unit 18 controls the ALC circuit 16 in such a manner that the transmission output level of the WOFDM modulation signal derived from the WOFDM modulation circuit 17 is set to an intermediate transmission output level in the beginning, whereas if the control unit 18 controls the ALC circuit 16 in such a manner that the transmission output level is increased/decreased in response to a detected reception signal level, then the power-line communication apparatus can be properly operated in response to the variations of the transmission characteristic in such an intermediate level at which possibility of establishing the communication is large.

In addition, if the control unit 18 controls the ALC circuit 16 in such a way that the condition of the reception signal is judged based upon the transmission quality such as the packet error rate and thus the transmission output level of the WOFDM modulation signal derived from the WOFDM modulation circuit 17 becomes a proper level in response to the judgement result, then the transmission level is changed by considering not only the attenuation caused by the transmission path, but also the adverse influence caused by the noise produced from other electric appliances, so that precision of the data communication can be increased.

Moreover, if the control unit 18 executes the control operation of the transmission output level in the ALC circuit 16 every packet, then the power-line communication apparatus can be quickly operated in response to the condition variation of the power line.

Furthermore, if the control unit 18 executes the control operation of the transmission output level in the ALC circuit 16 at arbitrary timing, then the communication rate under noise environment having the impulse characteristic can be improved.

Furthermore, if the control unit 18 executes the control operation of the transmission output level in the ALC circuit 16 with respect to only necessary sub-carriers, then the average electric power of the transmission operation can be suppressed.

Embodiment Mode 16

Figure 30:
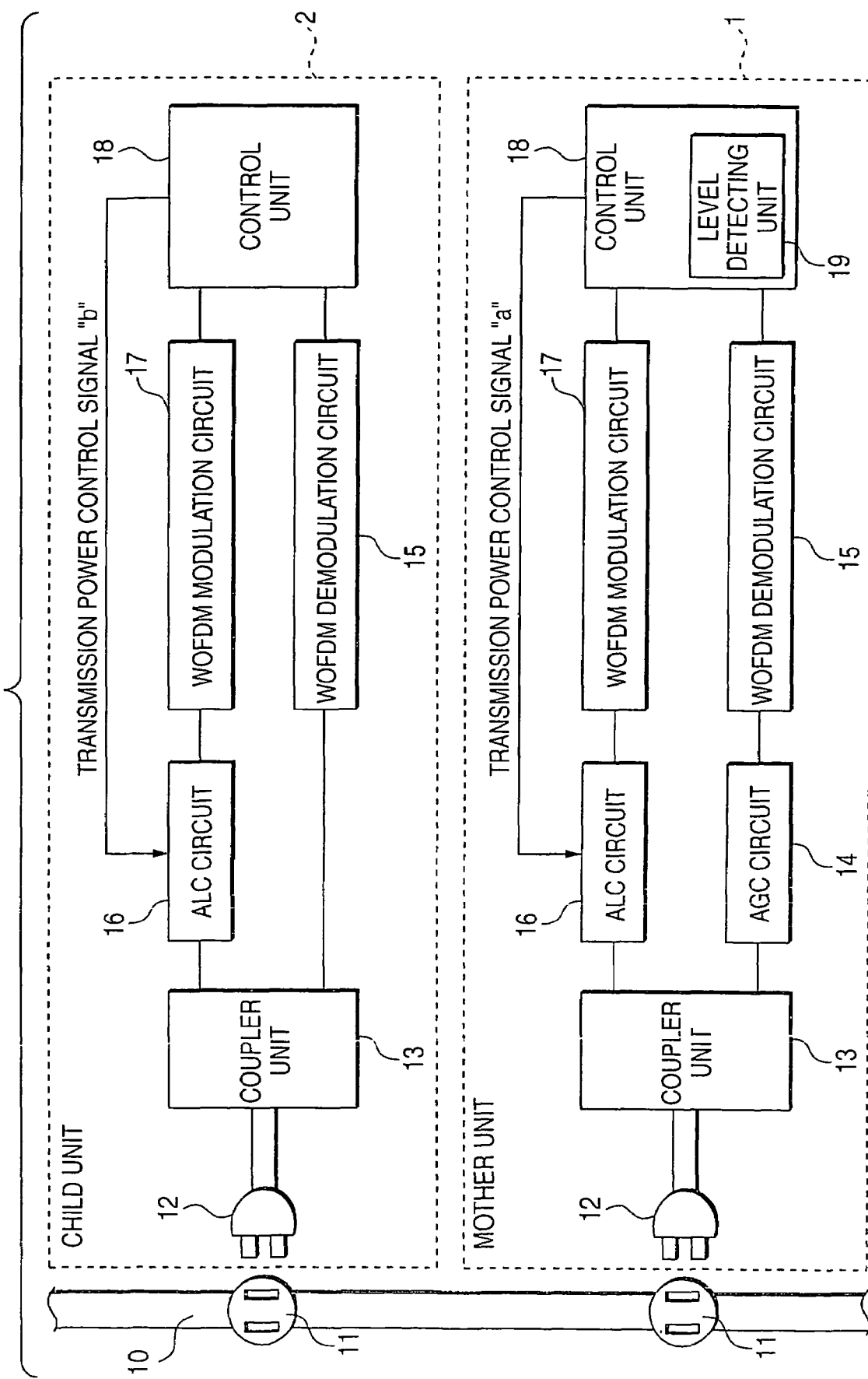
FIG. 30 is a block diagram for representing a power-line communication system according to an embodiment mode 2 of the present invention.
Figure 31A:
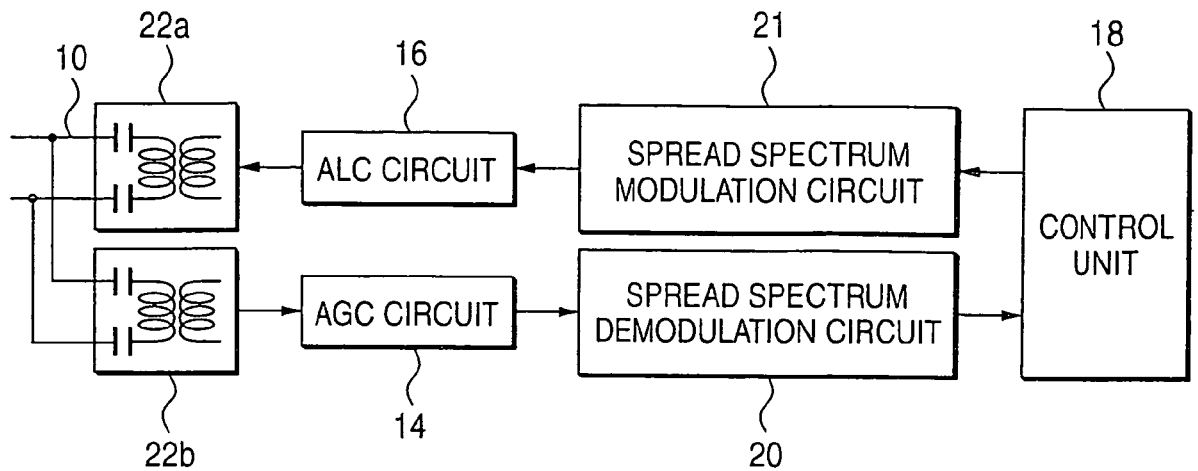
FIG. 31A is a block diagram for showing a spread spectrum power-line communication apparatus functioning as the power-line communication apparatus disclosed in the publication.
Figure 31B:
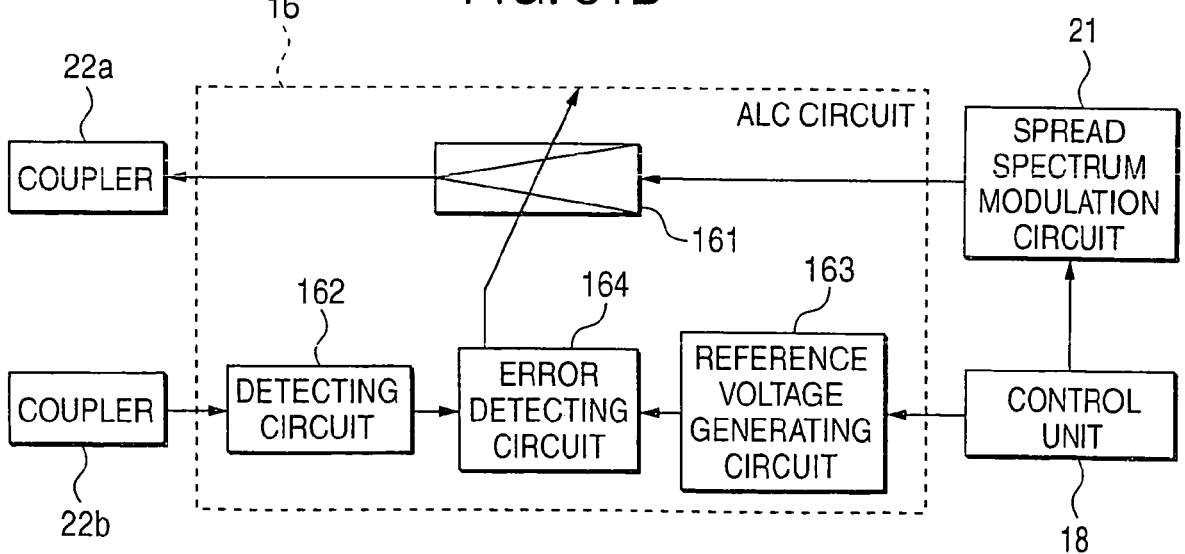
FIG. 31B is a block diagram for indicating an ALC circuit which constitutes the spread spectrum power-line communication apparatus of FIG. 31A.

FIG. 30 is a block diagram for representing a power-line communication system according to an embodiment mode 16 of the present invention.

In FIG. 30, since a power line 10, a plug socket 11, a plug 12, a coupler unit 13, an AGC circuit 14, a WOFDM demodulation circuit 15, an ALC circuit 16, a WOFDM modulation circuit 17, a control unit 18, and also a reception signal level detecting circuit 19 are similar to those of FIG. 28, the same reference numerals shown in FIG. 28 are employed as those for denoting these circuits, and therefore, explanations thereof are omitted. In this drawing, reference numeral 1 indicates a mother unit, and reference numeral 2 represents a child unit which is communicated with the mother unit 1 via the power line 10.

Operations of the power-line communication system with employment of such an arrangement will now be explained.

As shown in FIG. 30, in this embodiment mode 16, for the sake of simple circuits, while the reception signal level detecting circuit 19 is not mounted on both the AGC circuit 14 and the control unit 18 in the counter appliance (in this case, child unit 2 with respect to mother unit 1), a transmission power control signal "a" is transmitted from the mother unit 1. Then, the child unit 2 of the power line control system executes a transmission power control operation of the own child unit 2 by receiving this transmission power control signal "a" based upon another transmission power control signal "b" outputted from the control unit 18. As a consequence, the power line communication system can be properly operated by employing the simple circuit with respect to the variation of the transmission characteristic.

As previously explained, while the AGC circuit 14 and the reception signal level detecting circuit 19 are not mounted on the child unit 2, the necessary transmission power instructed from the mother unit 1 is transmitted. In the case that a telephone call is issued from the child unit 2, a communication link may be established only one time under ideal condition. In the case that a telephone call is issued from the mother unit 1, such a telephone call is required plural times in order to properly set the transmission power level in the child unit 2. As previously described, although the telephone calls are required to be issued plural times from the mother unit 1, the circuit can be made simpler.

As previously described, in accordance with this embodiment mode 16, in the power-line communication system having the mother unit 1 and the child unit 2 for communicating via the power line 10 with the mother unit 1, this mother unit 1 is provided with the AGC circuit 14 for amplifying the inputted WOFDM modulation signal to the constant level; the WOFDM demodulation circuit 15 for demodulating the amplified WOFDM signal; the WOFDM modulation circuit 17 for WOFDM-modulating the data to output the WOFDM modulation signal; the ALC circuit 16 for amplifying the WOFDM modulation signal derived from the WOFDM modulation circuit 17 up to the necessary level; and the control unit 18 for controlling the entire circuits involving the ALC circuit 16 and having the reception signal level detecting circuit 19 for detecting the reception signal level. The child unit 2 is similarly provided with: the WOFDM demodulation circuit 15 for demodulating the inputted WOFDM modulation signal; the WOFDM modulation circuit 17 for WOFDM-modulating the data to output the WOFDM modulation signal; the ALC circuit 16 for amplifying the WOFDM modulation signal derived from the WOFDM modulation circuit 17 up to the necessary level; and the control unit 18 for controlling the entire circuits involving the ALC circuit 16. Since the mother unit 1 can transmit the transmission power control signal "a" in response to the reception signal level to the child unit 2, even when the child unit 2 is constructed of the simple circuit arrangement, such a power-line communication system capable of accepting the variations of the transmission characteristic can be realized.

Also, even in such a case that the control unit 18 of the mother unit 1 controls the ALC circuit 16 in such a manner that the transmission output level of the WOFDM modulation signal derived from the WOFDM modulation circuit 17 becomes maximum, when no response is issued from the child unit 2, if the control unit 18 of the mother unit 1 instructs the ALC circuit 16 so as to stop the transmission, then the child unit 2 under abnormal condition can be protected.

Embodiment Mode 17

Figure 32:
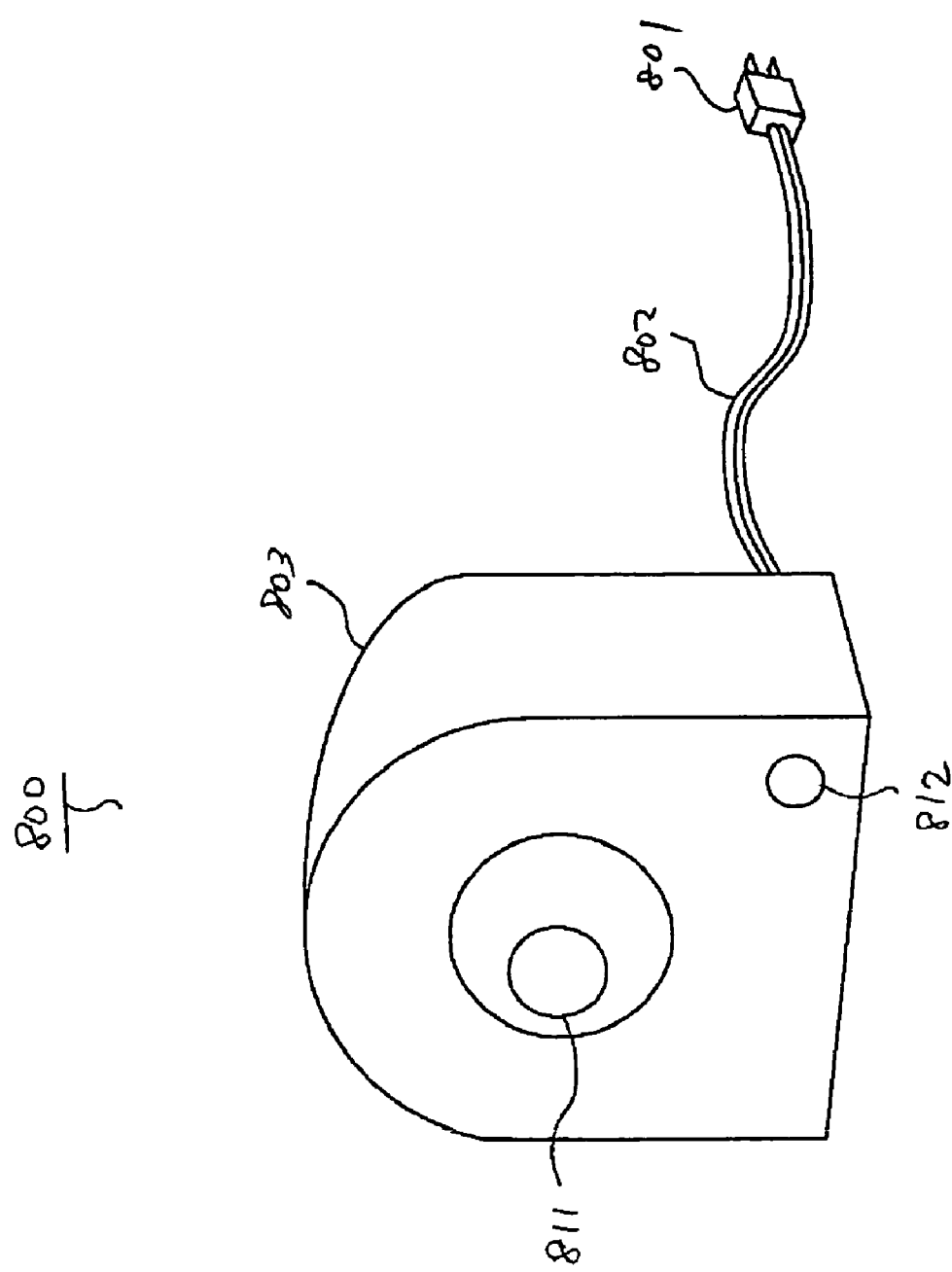
FIG. 32 is a perspective view for showing a camera according to an embodiment mode 17 of the present invention.

FIG. 32 is a perspective view for showing a camera 800 according to an embodiment mode 17 of the present invention. The camera 800 indicated in FIG. 32 corresponds to an example of a power-line carrier transmitting apparatus. The power-line carrier transmitting apparatus corresponds to an apparatus having only a transmission function within the power-line communication apparatus explained in the embodiment mode 1 through the embodiment mode 16. As shown in FIG. 32, the camera 800 is freely connectable with a network via a power line. The camera 800 shown in FIG. 32 will be referred to as a "network camera" in the below-mentioned description. As the network, there are a LAN (Local Area Network) such as Ethernet and a WAN (Wide Area Network) such as the Internet. The network camera 800 owns a housing 803. A lens 811 and an indicator 812 are provided on the housing 803. The indicator 812 is constructed of an LED (Light Emitting Diode).

Figure 33:
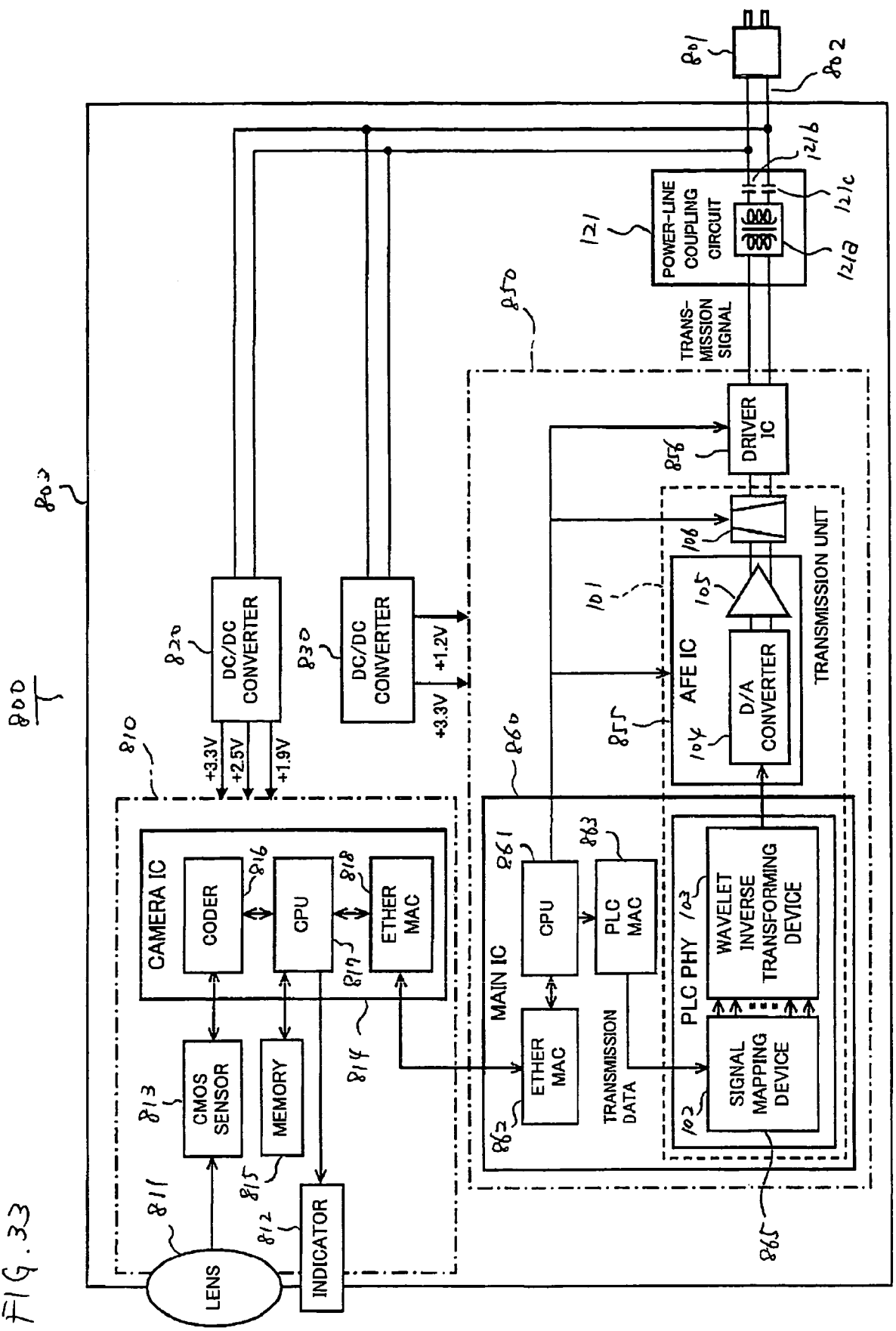
FIG. 33 is a block diagram for indicating an example of hardware of the network camera to which the power-line carrier transmitting apparatus has been applied.

FIG. 33 is a block diagram for indicating an example of hardware of the network camera 800 to which the power-line carrier transmitting apparatus has been applied. As indicated in FIG. 33, a PLC (Power Line Communication) module 850 (indicated by dot/dash line), an imaging unit 810 (represented by dot/dash line), DC/DC converters 820 and 830, and also a power-line coupling unit 121 are provided in the housing 803 of the network cameral 800. A plug 801 is provided with the housing 803. The plug 801 is freely connectable with a receptacle of the power line. A commercial AC voltage is being applied to the power line. A voltage value and a frequency of a commercial AC power supply are, for example, 120 VAC, 60 Hz. It should be understood that the voltage value and the frequency of the communication AC power supply may be arbitrarily selected, for example, may be properly changed into 100 VAC/60 Hz, or 230 VAC/50 Hz.

As represented in FIG. 33, the plug 801 is connected via the power-line coupling circuit 121 and the PLC module 850 to the imaging unit 810. The plug 801 is also connected to the DC/DC converters 820 and 830. The DC/DC converter 830 converts an AC voltage into DC voltages, and then, supplies various sorts of DC voltages (for example, +3.3 V and +1.2 V) to the PLC module 850. The DC/DC converter 820 converts an AC voltage into DC voltages, and then, supplies various sorts of DC voltages (for example, +1.9 V, +2.5 V and +3.3 V) to the imaging unit 810. The power-line coupling circuit 121 is constituted by employing a coil transformer 121a, and coupling-purpose capacitors 121b and 121c.

As indicated in a lower portion of FIG. 33, the PLC module 850 contains a driver IC (Integrated Circuit) 856, a band-pass filter 106, an AFE (Analog Front End) IC 855, and a main IC 860. The AFE IC 855 contains a transmission-purpose amplifier 105, and a D/A converter 104. The main IC 860 is arranged by a CPU (Central Processing Unit) 861, a PLC MAC (Power Line Communication·Media Access Control layer) block 863, a PLC PHY (Power line Communication·Physical layer) block 865, and an Ethernet MAC 862. Furthermore, the PLC PHY block 865 contains a signal mapping device 102, and a wavelet inverse transforming device 103.

The signal mapping device 102, the wavelet inverse transforming device 103, the D/A converter 104, the transmission-purpose amplifier 105, and the band-pass filter 106, which are shown in FIG. 33, constitute a transmission unit 101 (indicated by broken line). This transmission unit 101 is identical to the transmission unit of the embodiment mode 1. It should also be understood that the transmission unit which is applicable to the power-line carrier transmitting apparatus is not especially limited only to the transmission unit 101 of the embodiment mode 1, but any one of the transmission units of the embodiment modes 2 to 16 may be applied.

As represented in an upper portion of FIG. 33, the imaging unit 810 contains the lens 811, the indicator 812, a CMOS (Complementary Metal Oxide Semiconductor) sensor 813, a camera IC 814, and a memory 815. The camera IC 814 is arranged by a coder 816, a CPU 817, and an Ethernet MAC 818.

In the above-described arrangement of the imaging unit 810, when the lens 811 collects light, the CMOS sensor 813 detects the light, and outputs the detected light as a signal to the coder 816. The coder 816 produces image data from the inputted signal, and compresses the produced image data by employing such a compressing system as the JPEG (Joint Photographic Experts Group) system. It should also be noted that the compressing system is not especially limited only to the above-explained JPEG system, but may be arbitrarily selected. Any one of a reversible coding system and a non-reversible coding system may be applied, for instance, an MPEG (Moving Picture Experts Group) system may be applied. The CPU 817 outputs compressed image data from the Ethernet MAC 818 to the main IC 860.

The CPU 861 of the main IC 860 outputs the image data inputted to the Ethernet MAC 862 as transmission data via the PLC MAC block 863 to the PLC PHY block 865. It should also be noted that since operations from the signal mapping device (Mapper) 102 up to the power-line coupling circuit 121 are the same as the operations of the embodiment mode 1, explanations thereof are omitted. When a transmission signal is outputted from the power-line coupling circuit 121, the transmission signal is outputted via the plug 801 to a power line (not shown).

It should also be understood that although the above-explained embodiment mode 17 has exemplified the network camera as one example of the power-line transmitting apparatus, the present invention is not limited only to the network camera. Also, in this embodiment mode 17, the image data has been described as one example of the transmission data. However, the present invention is not limited only to the image data. For example, as the transmission data, voice data and text data may be alternatively employed. Furthermore, combination data made of both the voice data and the image data may be alternatively employed.

Embodiment Mode 18

Figure 34:
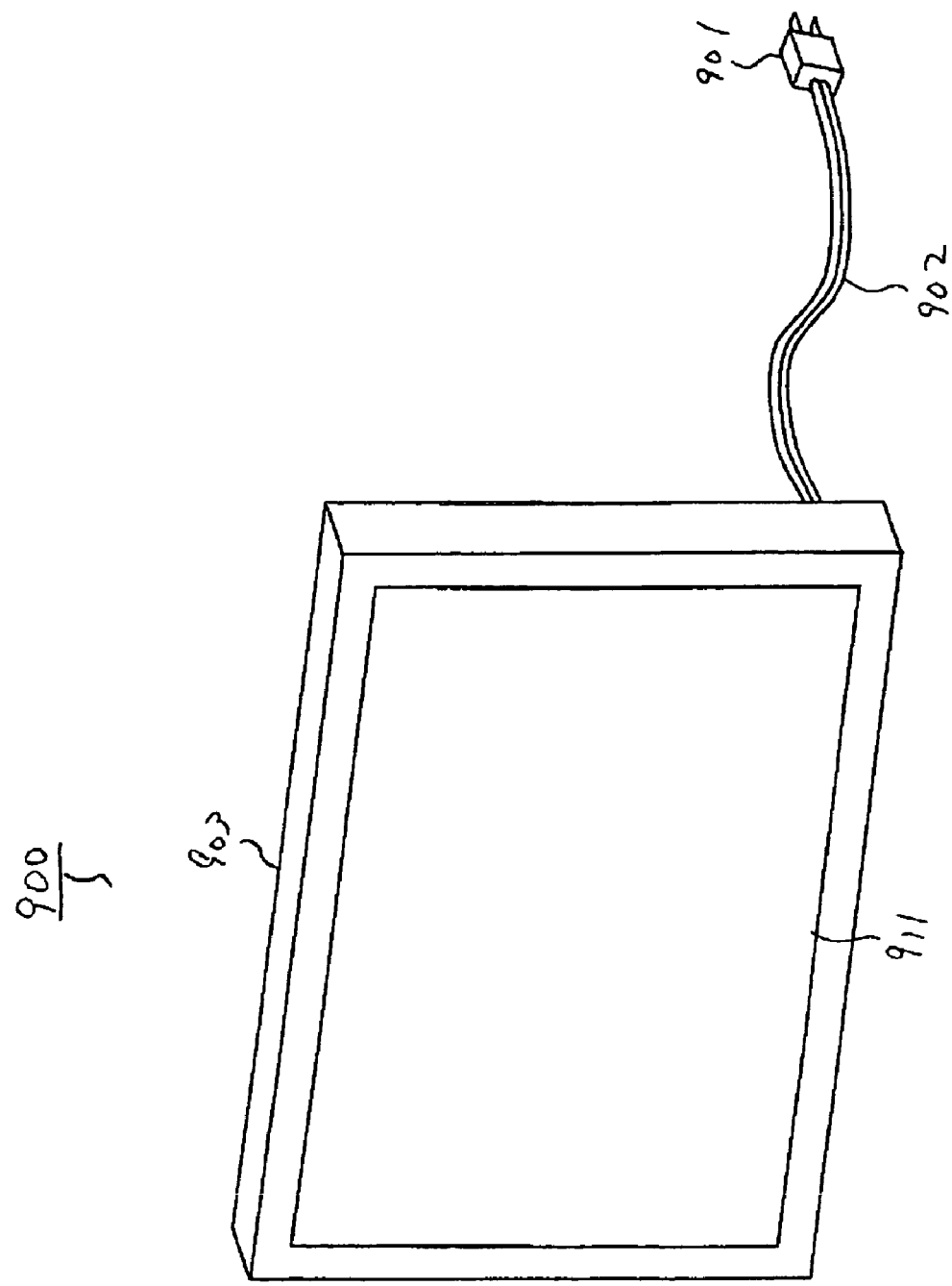
FIG. 34 is a perspective view for showing a display 900 according to an embodiment mode 18 of the present invention.

FIG. 34 is a perspective view for showing a display 900 according to an embodiment mode 18 of the present invention. The display 900 indicated in FIG. 34 corresponds to an example of a power-line carrier receiving apparatus. The power-line carrier receiving apparatus corresponds to an apparatus having only a reception function within the power-line communication apparatus explained in the embodiment mode 1 through the embodiment mode 16. As shown in FIG. 34, the display 900 is freely connectable with a network via a power line. As the network, there are a LAN such as Ethernet and a WAN such as the Internet. The display 900 has a housing 903, and a screen 911 is provided on the housing 903.

Figure 35:
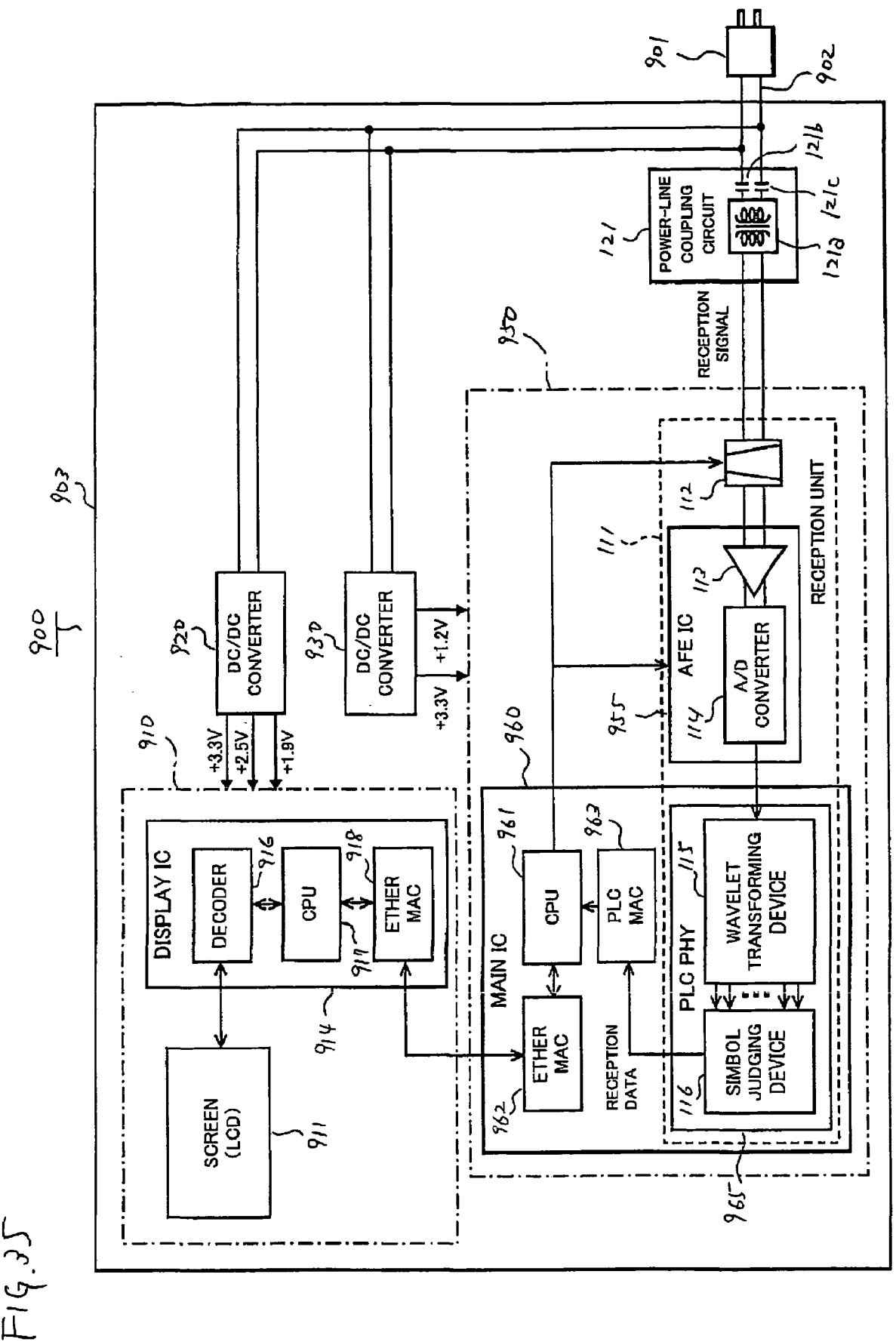
FIG. 35 is a block diagram for indicating an example of hardware of the display to which the power-line carrier receiving apparatus has been applied.

FIG. 35 is a block diagram for indicating an example of hardware of the display 900 to which the power-line carrier receiving apparatus has been applied. As indicated in FIG. 35, a PLC (Power Line Communication) module 950 (indicated by dot/dash line), an image output unit 910 (represented by dot/dash line), DC/DC converters 920 and 930, and also a power-line coupling unit 121 are provided in the housing 903 of the display 900. A plug 901 is provided in the housing 903. The plug 901 is freely connectable with a receptacle of the power line. A commercial AC voltage is being applied to the power line. It should be understood that the voltage value and the frequency of the communication AC power supply may be arbitrarily selected similar to those of the embodiment mode 17.

As indicated in FIG. 35, the plug 901 is connected via the power-line coupling circuit 121 and the PLC module 950 to the image output unit 910. Also, the plug 901 is connected to DC/DC converters 920 and 930. The DC/DC converter 930 converts the AC voltage into DC voltages, and then, outputs various sorts of DC voltages (for example, +3.3 V and +1.2 V) to the PLC module 950. The DC/DC converter 920 converts the AC voltage into DC voltages, and then, outputs various sorts of DC voltages (for example, +1.9 V, +2.5 V, and +3.3 V) to the image output unit 910. The power-line coupling circuit 121 is arranged by coil transformer 121*a*, and coupling-purpose capacitors 121*b* and 121*c*.

As indicated in a lower portion of FIG. 35, the PLC module 950 contains a band-pass filter 112, an AFE IC 955, and a main IC 960. The AFE IC 955 contains an amplification degree controller 113, and an A/D converter 114. The main IC 960 is arranged by a CPU 961, a PLC MAC block 963, a PLC PHY block 965, and an Ethernet MAC 962. Furthermore, the PLC PHY block 965 contains a symbol judging device 116, and a wavelet transforming device 115.

The symbol judging device 116, the wavelet transforming device 115, the A/D converter 114, the amplification degree controller 113, and the band-pass filter 112 constitute a reception unit 111 (indicated by broken line). This reception unit 111 is identical to the reception unit of the embodiment mode 1. It should also be understood that the reception unit which is applicable to the power-line carrier receiving apparatus is not especially limited only to the reception unit 111 of the embodiment mode 1, but any one of the reception units of the embodiment modes 2 to 16 may be applied.

As shown in an upper portion of FIG. 35, the image output unit 910 contains the screen 911 and the display IC 914. The display IC 914 is constructed by employing a decoder 916, a CPU 917, and an Ethernet MAC 918. Although the screen 911 is constructed of liquid crystal, the screen 911 need not be made of liquid crystal. Therefore, various sorts of screens, for instance, a CRT (Cathode-Ray Tube), a plasma display, an SED (Surface-Conduction Electron-Emitter Display), and the like may be applied as the screen 911 of the present invention.

In the display 900 with employment of the above-explained arrangement, when commercial AC power to which a reception signal has been superimposed is entered to the plug 901, the power-line coupling circuit 121 separates the reception signal from the entered commercial AC power. The separated reception signal is entered via the band-pass filter 112, the amplification degree controller 113, the A/D converter 114, the wavelet transforming device 115, and the symbol judging device 116 to the PLC MAC block 963 as reception data. It should also be noted that operations from the power-line coupling circuit 121 up to the symbol judging device 116 are identical to those of the embodiment mode 1, explanations thereof are omitted.

The PLC MAC block 963 outputs the reception data via the CPU 961 and the Ethernet MAC 962 to the image output unit 910. The reception data is inputted via the Ethernet MAC 918 and the CPU 917 to the decoder 916. In this case, it is so assumed that the reception data corresponds to compressed image data. The decoder 916 expands the inputted image data by employing such a compressing system as the JPEG system, and then, displays the expanded image data on the screen 911. It should also be noted that the compressing system is not especially limited only to the above-explained JPEG system, but may be arbitrarily selected. Any one of a reversible coding system and a non-reversible coding system may be applied, for instance, an MPEG system may be applied.

It should also be noted that in the above-explained embodiment mode 18, the display 900 has been described as one example of the power receiving apparatus, but the power receiving apparatus is not limited only to such a display 900. For example, a voice output apparatus which outputs voice (for example, speaker) may be employed. Alternatively, an image/voice output apparatus for outputting an image in combination with voice (for instance, display equipped with speaker) may be employed. As a consequence, the reception data is not limited only to the image data. Therefore, for example, voice data may be employed, and combination data made of voice data and image data may be employed. Furthermore, the reception data may be alternatively realized not by image data, but by text data.

What is claimed is:

1. A power-line transmission apparatus comprising:
a transmission unit;
a power line coupling unit for superimposing a signal derived from said transmission unit with respect to a power line as a power-line communication signal; and
a control unit for controlling respective structural elements of said transmission unit, by which a transmission operation is carried out by employing a plurality of sub-carriers; wherein
said transmission unit includes a signal point mapping device for producing a plurality of bit streams from inputted transmission data so as to map said bit streams to signal points of the respective sub-carriers, a wavelet inverse transforming device for modulating the respective sub-carriers by wavelet waveforms which are orthogonal to each other based upon signal point data of the respective sub-carriers mapped by said signal point mapping device so as to produce temporal waveform series data, and a D/A converter for converting the temporal waveform series data produced by said wavelet inverse transforming device into an analog temporal waveform series signal.

2. The power-line transmission apparatus as claimed in claim 1, wherein said wavelet inverse transforming device owns a lapped orthogonal transforming function of an all reconstruction, or lapped orthogonal transforming function of a quasi-complete reconstruction, otherwise a generalized lapped orthogonal transforming function.

3. The power-line transmission apparatus as claimed in claim 1, wherein said wavelet inverse transforming device owns a modulated lapped transforming function, or an extended modulated lapped transforming function.

4. The power-line transmission apparatus as claimed in claim 1, wherein said wavelet inverse transforming device is arranged by a poly-phase filter bank circuit.

5. The power-line transmission apparatus as claimed in claim 1, wherein said wavelet inverse transforming device is arranged by a filter bank circuit having a lattice structure.

6. The power-line transmission apparatus as claimed in claim 1, wherein said wavelet inverse transforming device owns a plurality of filter coefficient patterns having different filter lengths in correspondence with overlapped coefficients, and select a proper filter coefficient pattern from said plural filter coefficient patterns in response to the power-line communication signal transmitted from said transmission unit and a reception condition such as a variation of a transmission path and a reception level.

7. The power-line transmission apparatus as claimed in claim 5, wherein said wavelet inverse transforming device owns a plurality of plane rotation angle parameters in correspondence with overlapped coefficients, and select a proper plane rotation angle parameter from said plural plane rotation angle parameters in response to the power-line communication single transmitted from said transmission unit and a reception condition such as a variation of a transmission path and a reception level.

8. The power-line transmission apparatus as claimed in claim 1, wherein said control unit outputs a selection signal for selecting a sub-carrier used to map/modulate data with respect to said signal point mapping device; and
said signal point mapping device maps data with respect to the selected sub-carrier based upon said selection signal, and maps zero as to data with respect to the sub-carrier which is not selected.

9. The power-line transmission apparatus as claimed in claim 8, wherein said control unit predicts a noise condition on a power line by a ratio of signal power to noise power by employing a judgment result made by said symbol judging device so as to detect a frequency band where relatively large noise is present under steady state; and said control unit controls in such a manner that as to a sub-carrier appeared in the frequency band where large noise is present under steady state, said selection signal is not outputted with respect to said signal point mapping device.

10. The power-line transmission apparatus as claimed in claim 8, wherein as to signal point mapping by said signal point mapping device and the control of said selection signal to the sub-carrier, said control unit increase a total number of signal points mapped by said signal point mapping device to obtain multi-values in the case that a communication speed has a top priority, whereas said control unit decreases a total number of signal points mapped by the signal points mapping device to obtain a binary value in the case that reliability of a data transmission has a top priority.

11. The power-line transmission apparatus as claimed in claim 8, wherein as to signal point mapping by said signal point mapping device and the control of said selection signal to the respective sub-carrier, said control unit investigates error rates of the respective sub-carrier, and performs a control operation in such a manner that the respective sub-carriers are used in data communications from such a sub-carrier with a top priority, whose error rate is small.

12. A camera comprising:
a lens for collecting light;
an image data generator for generating an image data based on the light collected by said lens;
the power-line transmission apparatus as claimed in claim 1; and
wherein said power line coupling unit of the power-line transmission apparatus derives the image data through said transmission unit, and the derived image data is superimposed with respect to the power line as the power-line communication signal by said power line coupling unit.

13. A power-line reception apparatus comprising:
a reception unit;
a power line coupling unit for extracting only a power line communication signal from a power line; and
a control unit for controlling respective structural elements of said reception unit, by which a reception operation is carried out by employing a plurality of sub-carriers; wherein
said reception unit includes an A/D converter for digitally converting the power-line communication signal extracted from the power line by said power-line coupling unit to obtain sampling-series waveform data, a waveform transforming device for wavelet-transforming the sampling-series waveform data obtained be said A/D converter into signal point data of respective sub-carriers, and a symbol judging device for judging bit streams mapped by a signal point mapping device of another power-line transmission apparatus by inverse-mapping a plurality of said signal point data outputted from said wavelet transforming device and for synthesizing the judged bit streams with each other as a reception data series.

14. The power-line reception apparatus as claimed in claim 13, wherein said wavelet transforming device owns a lapped orthogonal transforming function of an all reconstruction, or lapped orthogonal transforming function of a quasi-complete reconstruction, otherwise a generalized lapped orthogonal transforming function.

15. The power-line reception apparatus as claimed in claim 13, wherein said wavelet transforming device owns a modulated lapped transforming function, or an extended modulated lapped transforming function.

16. The power-line reception apparatus as claimed in claim 13, wherein said wavelet transforming device is arranged by a poly-phase filter bank circuit.

17. The power-line reception apparatus as claimed in claim 13, wherein said wavelet transforming device is arranged by a filter bank circuit having a lattice structure.

18. The power-line reception apparatus as claimed in claim 13, wherein said wavelet transforming device owns a plurality of filter coefficient patterns having different filter lengths in correspondence with overlapped coefficients, and select a proper filter coefficient pattern from said plural filter coefficient patterns in response to the power-line communication signal transmitted from said transmission unit and a reception condition such as a variation of a transmission path and a reception level.

19. The power-line reception apparatus as claimed in claim 17, wherein said wavelet transforming device owns a plurality of plane rotation angle parameters in correspondence with overlapped coefficients, and select a proper plane rotation angle parameter from said plural plane rotation angle parameters in response to the power-line communication single transmitted from said transmission unit and a reception condition such as a variation of a transmission path and a reception level.

20. A display comprising:
a screen for showing the image;
the power-line reception apparatus as claimed in claim 13; and
wherein said power line coupling unit of the power-line reception apparatus extracts only a power line communication signal including an image data from the power line, said symbol judging device synthesizes the judged bit streams with each other as the reception data series indicating the image data, and said screen shows the image indicated by the reception data series.

* * * * *